US012241010B2

(12) United States Patent
Lee et al.

(10) Patent No.: US 12,241,010 B2
(45) Date of Patent: Mar. 4, 2025

(54) PEROVSKITE COLOR CONVERTER AND METHOD OF MANUFACTURING THE SAME

(71) Applicants: SEOUL NATIONAL UNIVERSITY R&DB FOUNDATION, Seoul (KR); KOREA ADVANCED INSTITUTE OF SCIENCE AND TECHNOLOGY, Daejeon (KR)

(72) Inventors: Tae-Woo Lee, Seoul (KR); Byeong-Soo Bae, Daejeon (KR); Young-Hoon Kim, Seoul (KR); Jun-Ho Jang, Daejeon (KR)

(73) Assignees: SEOUL NATIONAL UNIVERSITY R&DB FOUNDATION (KR); KOREA ADVANCED INSTITUTE OF SCIENCE AND TECHNOLOGY (KR)

(*) Notice: Subject to any disclaimer, the term of this patent is extended or adjusted under 35 U.S.C. 154(b) by 350 days.

(21) Appl. No.: 17/520,622

(22) Filed: Nov. 5, 2021

(65) Prior Publication Data

US 2022/0145174 A1    May 12, 2022

(30) Foreign Application Priority Data

Nov. 5, 2020 (KR) .................. 10-2020-0147070
Nov. 5, 2021 (KR) .................. 10-2021-0151371

(51) Int. Cl.
*C09K 11/66* (2006.01)
*B82Y 20/00* (2011.01)
(Continued)

(52) U.S. Cl.
CPC ............ *C09K 11/665* (2013.01); *C08G 77/20* (2013.01); *C08G 77/38* (2013.01); *C08K 9/06* (2013.01);
(Continued)

(58) Field of Classification Search
CPC ..... C09K 11/665; C09K 11/025; B82Y 20/00; B82Y 40/00; C08G 77/20; C08G 77/28
See application file for complete search history.

(56) References Cited

U.S. PATENT DOCUMENTS

2017/0067139 A1* 3/2017 Miyamura .............. C22C 38/44
2017/0121598 A1* 5/2017 Min ..................... C09K 11/883
(Continued)

FOREIGN PATENT DOCUMENTS

KR     20130046881 A    5/2013
KR     20190055393 A    5/2019

OTHER PUBLICATIONS

Kim, Yun Hyeok et al., "Two-Step-Enhanced Stability of Quantum Dots via Silica and Siloxane Encapsulation for the Long-Term Operation of Light-Emitting Diodes", ACS Applied Materials Interfaces 2019, 11, 25, 22801 22808.
(Continued)

*Primary Examiner* — C Melissa Koslow
(74) *Attorney, Agent, or Firm* — Renaissance IP Law Group LLP

(57) ABSTRACT

Disclosed are a perovskite color converter and a method for manufacturing the same. In order to maintain strong physical properties, the siloxane resin is synthesized in two steps. The silane precursor performs siloxane bond through a non-aqueous sol-gel reaction to form a siloxane resin, and a bond between methacrylate group, and a bond between methacrylate group and an organic ligand are formed through a secondary cross-linking reaction.

22 Claims, 27 Drawing Sheets

(51) Int. Cl.
*B82Y 40/00* (2011.01)
*C08G 77/20* (2006.01)
*C08G 77/38* (2006.01)
*C08K 9/06* (2006.01)
*C09K 11/02* (2006.01)

(52) U.S. Cl.
CPC ............ *C09K 11/025* (2013.01); *B82Y 20/00* (2013.01); *B82Y 40/00* (2013.01); *C08K 2201/011* (2013.01)

(56) References Cited

U.S. PATENT DOCUMENTS

2017/0358757 A1* 12/2017 Lee .................. C01G 21/006
2018/0187070 A1* 7/2018 Chou ................ C09K 11/883

OTHER PUBLICATIONS

Kim, Yun Hyeok et al., "Supporting Information Two-Step-Enhanced Stability of Quantum Dots via Silica and Siloxane Encapsulation for the Long-Term Operation of Light-Emitting Diodes", Wearable Platform Materials Technology Center, pp. S1-S13.

* cited by examiner

[Perovskite Color Converter]

PEROVSKITE COLOR CONVERTER AND METHOD OF MANUFACTURING THE SAME

TECHNICAL FIELD

The present inventive concept is related to color converter, more particularly to perovskite color converter in which perovskite nanoparticles are chemically dispersed in a siloxane resin with stability, and to a method of manufacturing the color converter.

BACKGROUND ART

The perovskite crystal structure is a mixed form of a face-centered cubic structure and a body-centered cubic structure, and when it is composed of an oxide, a piezoelectric effect is generated. Recently, inorganic or organic-inorganic hybrid perovskite materials incorporating halogen elements have been developed and used as light-emitting materials that generate light or photoelectric materials that absorb light to produce electricity.

Metal halide perovskite materials are in the spotlight academically and industrially because manufacturing cost is low, manufacturing process thereof and manufacturing process of device using the metal halide perovskite materials are simple, control of their optical and electrical properties are very easy through composition control, and their charge mobility is high. In particular, the metal halide perovskite material has high photoluminescence quantum efficiency, has high color purity, and has very excellent properties as a light-emitting material because color control is simple.

A material having a conventional perovskite structure ($ABX_3$) is an inorganic metal oxide.

These inorganic metal oxides are generally oxides, and cations of metals (alkali metals, alkaline earth metals, transition metals and lanthanides) such as Ti, Sr, Ca, Cs, Ba, Y, Gd, La, Fe, and Mn having different sizes are located at the A and B sites, oxygen anions are located at the X site. Metal cations at the B site are bonded in the form of a corner-sharing octahedron at the edge of 6-fold coordination with oxygen anions at the X site. Examples thereof include $SrFeO_3$, $LaMnO_3$, $CaFeO_3$, or the like.

In contrast, in the metal halide perovskite structure, an organic ammonium ($RNH_3$) cation, an organic phosphonium ($RPH_3$) cation or an alkali metal cation is located at the A site in the $ABX_3$ structure, and a halide anion ($Cl^-$, $Br^-$, $I^-$) is positioned to form at the X site of a perovskite structure, so the composition is completely different from the inorganic metal oxide perovskite material.

In addition, according to the difference of these constituent materials, the properties of the material also vary. Inorganic metal oxide perovskite typically exhibits properties such as superconductivity, ferroelectricity, and colossal magnetoresistance. For example, yttrium barium copper oxide has superconducting or insulating properties according to oxygen contents.

On the other hand, metal halide perovskite is mainly used as a light-emitting material or photosensitive material because it has high light absorption, high photoluminescence quantum efficiency, and high color purity (less than 20 nm at half bandwidth) caused by the crystal structure.

Among metal halide perovskite materials, even organic-inorganic hybrid perovskite (that is, organometallic halide perovskite) in which organic ammonium has a smaller band gap than the central metal and halogen crystal structure ($BX_6$ octahedral lattice) is used as light-emitting material, light emission is generated from organic ammonium and light with high color purity cannot be generated, so that the half bandwidth of the emission spectrum becomes wider than 100 nm, making it unsuitable as a light emitting layer.

Therefore, it is not very suitable for the high color purity light-emitting materials emphasized in this patent. Therefore, in order to make a high purity light-emitting material, it is important that organic ammonium does not contain a chromophore and that light emission occurs in an inorganic lattice composed of a central metal-halogen element. That is, this patent is focused on the development of a light-emitting material that emits light from an inorganic lattice, having high purity, and having high efficiency. For example, Korean Publication Patent No. 10-2001-0015084 (2001.02.26) discloses an electroluminescent device using a dye-containing organic-inorganic hybrid material as a light emitting layer by forming a thin film rather than particles, but this is not light emission at the perovskite lattice structure.

A typical composition is $CsPbX_3$ (X is a halogen element) or $MAPbX_3$ (MA is methylammonium). In addition, there is $FAPbX_3$ (FA is formamidinium). In addition, it is possible to fabricate a two-dimensional material using the perovskite crystal structure.

However, perovskite crystals having nano size are not uniformly dispersed in a solvent and have a property of agglomeration with each other. This can be largely interpreted for two reasons.

The first is that the perovskite crystal used for the light-emission operation or the photoelectric operation is due to the ionic bond. Since the ionic bond has an aspect in which electric charges are exposed on the surface, individual nanoparticles are not separated but agglomerated by electrostatic force occurs.

The second is the Ostwald ripening effect. This is a phenomenon in which particles having a relatively small size are agglomerated toward a larger particle when the size of the particles is varied.

Due to the above-mentioned theories, the perovskite nanoparticles are not dispersed individually but aggregated with each other. Agglomerated particles interfere with the light-emitting operation and become an important cause of deteriorating the efficiency.

To solve this problem, organic ligands or surfactants are introduced during the synthesis of perovskite nanoparticles. Organic ligands bound to the surface of nanoparticles interfere with aggregation between nanoparticles and play a major role in maintaining a state separated from each other in a solvent. As the organic ligand to be used, a ligand having a chemical structure including an unsaturated hydrocarbon may be used. Representative compounds are oleylamine or oleic acid.

In order to use the perovskite nanoparticles having organic ligands as a phosphor (or a color converter), it is necessary to convert the perovskite nanoparticles dispersed in a solvent into a film. That is, the separated nanoparticles are needed to be dispersed in the polymer film. In addition, if it is intended to be used as an active-type display that emits light by an applied external electric field, the perovskite nanoparticles are needed to be formed as a single light-emitting layer. In particular, when perovskite nanoparticles are used in a passive-type display that absorbs an external light source to form a specific color, the perovskite nanoparticles are needed to be to evenly distributed in the polymer resin to provide functionality such as large-area coating, LED encapsulation film application, or patterning. For dispersion in the polymer resin, it is necessary to introduce a polymer resin having good compatibility with the organic ligand of the perovskite nanoparticles. These color-changing materials can emit various visible and infrared light through color conversion by placing ultraviolet or blue LEDs or organic LEDs (OLED) on the top or periphery of the light source. Therefore, it can be used in various types of display and lighting devices.

For this purpose, silicone-based resins are generally being studied, and when a conventional resin for quantum dots is used, there is a problem in that light efficiency is rapidly degraded. This is because the elements constituting the nanoparticles are separated (or moved) from the crystal structure according to the continuous inflow and outflow of energy during continuous light-emission in a humidity and temperature environment. Since oxide-based perovskite crystals are formed through covalent bonding, elements are not separated, but halide-based perovskite crystals are formed through ionic bonding, so elements are separated. In addition, when the surface of the perovskite nanoparticles is exposed to water, decomposition of the nanoparticles occurs and the luminescent properties disappear.

Therefore, development of a resin capable of preventing the separation (or movement) of elements from the halide-based perovskite crystal and maintaining strong physical properties in a humidity and temperature environment, and development of a color converter including perovskite crystals chemically encapsulated in combination with a specific functional group in the resin are an urgent situation.

DISCLOSURE

Technical Problem

The present inventive concept is directed to providing a perovskite color converter having excellent reliability.

The present inventive concept is directed to providing method of manufacturing a perovskite color converter.

Technical Solution

One aspect of the present inventive concept provides a perovskite color converter comprises a siloxane resin having a siloxane bond by a sol-gel reaction between silane precursors and cross-linked through a cross-linking reaction, a perovskite nanoparticles that perform a light-emitting operation, and as organic ligands surrounding the perovskite nanoparticle, wherein the organic ligands are chemically cross-linked with siloxane resin, and the perovskite nanoparticles are dispersed in the cross-linked siloxane resin.

The other aspect of the present inventive concept provides a manufacturing method of a perovskite color converter comprises forming a first dispersion in which perovskite nanoparticles and silane precursor are mixed, forming a second dispersion in which a siloxane resin having a siloxane bond is formed through a non-aqueous sol-gel reaction in the first dispersion, and inducing a crosslinking reaction in the second dispersion to form a cross-linked siloxane resin, and chemically bonding organic ligands of the perovskite nanoparticles with the cross-linked siloxane resin.

Advantageous Effects

According to the present inventive concept, the perovskite nanoparticles having organic ligands are uniformly dispersed in the precursor solution before the synthesis step of the siloxane resin. This is due to the hydrophobic interaction between the silane precursor solution and the organic ligand. In addition, even when the siloxane resin is synthesized, a meaningful chemical bond is not formed between the siloxane resin and the organic ligand, and uniform dispersion is maintained in the synthesized siloxane resin. Finally, the organic ligand containing unsaturated hydrocarbon bonds in the dense network structure is cross-linked with siloxane resin by the induced cross-linking reaction. Therefore, the perovskite nanoparticles bonded to the cross-linked siloxane resin are firmly bonded to the resin, thereby preventing the elements from being separated from the crystal structure. In addition, the cross-linked siloxane resin exhibits excellent resistance to penetration of moisture, which deteriorates physical properties. In addition, it is possible to form a pattern using a photolithography process of commercial semiconductor process due to the UV curable feature.

MODES OF THE INVENTIVE CONCEPT

Figure 1:
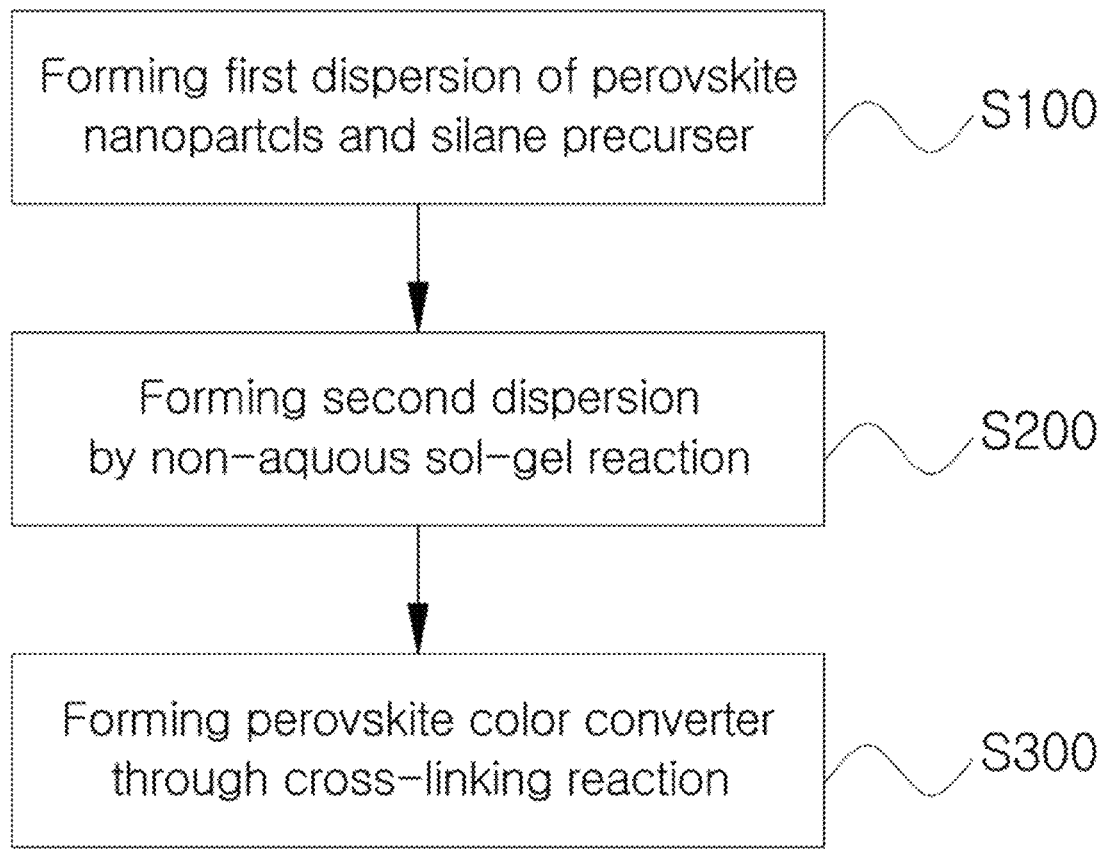
FIG. 1 is a flowchart for explaining a method of manufacturing a perovskite color converter according to a preferred embodiment of the present inventive concept.

Hereinafter, embodiments of the present inventive concept will be described in detail with reference to the accompanying drawings.

While the present inventive concept is susceptible to various modifications and alternative forms, specific embodiments thereof are shown by way of example in the drawings and will herein be described in detail. However, it should be understood that there is no intent to limit the inventive concept to the particular forms disclosed but rather the inventive concept is to cover all modifications, equivalents, and alternatives falling within the spirit and scope of the inventive concept defined by the appended claims.

When an element such as a layer, a region, and a substrate is referred to as being disposed "on" another element, it should be understood that the element may be directly formed on the other element or an intervening element may be interposed therebetween.

It should be understood that, although the terms "first," "second," etc. may be used herein to describe various elements, components, areas, layers, and/or regions, these elements, components, areas, layers, and/or regions are not limited by these terms.

In the present inventive concept, the perovskite is preferably a material of which the composition formula of the crystal structure is $ABX_3$ (A is Cs, MA or FA, B is Pb, X is Cl, Br or I), but is not limited thereto, and has a two-dimensional structure composition is also possible. For example, it may have a compositional formula of $A_2BX_4$, and if it is a perovskite crystal capable of performing a light-emitting operation, it corresponds to the perovskite of the present inventive concept.

Also preferably, the perovskite is $ABX_3$ (3D, three-dimension), $A_4BX_6$ (0D, zero-dimension), $AB_2X_5$(2D, two-dimension), $A_2BX_4$ (2D, two-dimension), $A_2BX_6$ (0D, zero-dimension), $A_2B+B^{3+}X_6$ (3D, three-dimension), $A_3B_2X_9$ (2D, two-dimension) or $A_{n-1}B_nX_{3n+1}$ (quasi-2D, quasi two-dimension) (n is an integer between 2 and 6). A is an organic ammonium ion, an organic amidinium ion, an organic guanidium ion, an organic phosphonium ion or an alkali metal ion, or a combination or derivative thereof, and B is a transition metal, rare earth metal, alkaline earth metal, organic material, inorganic material or ammonium, or derivative or a combination of two or more thereof, and X may be a halogen ion or a combination of different halogen ions.

The organic ammonium (A) may be methylammonium, ethylammonium, formamidinium, acetamidinium, guanidinium, tert-butylammonium, dimethylammonium, ethane-1,2-diammonium, imidazolium, n-propylammonium, isopropylammonium, pyrrolidinium, $(CH(NH_2))^+$, $C_xH_{2x+1}(CNH_3)^+$, $(CH_3NH_3)_n^+$, $((C_xH_{2x+1})NH_3)_n(CH_3NH_3)_n^+$, $R(NH_2)_2^+$ (where R is an alkyl group), $(C_nH_{2n+1}NH_3)_n^+$, $(CF_3NH_3)^+$, $(CF_3NH_3)_n^+$, $((C_xF_{2x+1})NH_3)_n(CF_3NH_3)_n^+$, $((C_xF_{2x+1})_nNH_3)_2^+$ or $(C_nF_{2n+1}NH_3)_n^+$ (wherein n and x are independently integers from 1 to 100).

Also preferably, A may be $CH(NH_2)_2$, $C_xH_{2x+1}(CNH_3)$, $(CH_3NH_3)_n$, $((C_xH_{2x+1})_nNH_3)_n(CH_3NH_3)_n$, $R(NH_2)_2$ (R=alkyl), $(C_nH_{2n+1}NH_3)_n$, $CF_3NH_3$, $(CF_3NH_3)_n$, $((C_xF_{2x+1})_nNH_3)_n(CF_3NH_3)_n$, $((C_xF_{2x+1})_nNH_3)_n$, $(C_nF_{2n+1}NH_3)_n$ (n and x are independently integers from 1 to 100), Na, K, Rb, Cs, Fr, or a combination or derivative thereof.

B may be Pb, Mn, Cu, Ga, Ge, In, Al, Sb, Bi, Po, Sn, Eu, Yb, Ni, Co, Fe, Cr, Pd, Cd, Ca, Sr, organic ammonium, inorganic ammonium, an organic cation, or a combination or derivative thereof.

X may be Cl, Br, I, or a combination thereof.

In addition, the perovskite nanocrystals refer to nanoparticles of a single crystal or polycrystalline structure formed according to the compositional formula of the crystal structure, and refer to a state in which organic ligands are excluded.

Perovskite nanoparticles refer to an aspect in which perovskite nanocrystals and organic ligands (including surfactants) are bound to each other. Therefore, the perovskite nanoparticles of the present inventive concept may include inorganic perovskite in which a metal is located at site A of the compositional formula of the crystal structure, and organic-inorganic hybrid perovskite in which an organic material is located at site A of the compositional formula of the crystal structure. That is, the scope of the present inventive concept includes an aspect in which perovskite nanoparticles performing a light-emitting operation are bound to an organic ligand for dispersing the perovskite nanocrystals.

The exciton Bohr's diameter may be obtained by the value for the effective mass of the metal halide perovskite and the following Equation 1.

$$r = a_0 \varepsilon_r \frac{m_0}{\mu} \quad \text{[Equation 1]}$$

Where r is the exciton Bohr's radius, $a_0$ is the Bohr's diameter of hydrogen (0.053 nm), $\varepsilon_r$ is the dielectric constant, $\mu = m_e \times m_h/(m_e+m_h)$, $m_e$ is the effective electron mass and $m_h$ may be an effective hole mass. Here, the Bohr's diameter represents twice the Bohr's radius. The $m_0$ represents the mass of free electrons, which is $9.109 \times 10^{-31}$ kg.

In addition, ITO/PEDOT:PSS/perovskite film/electron injection layer/cathode structure device is manufactured and the capacitance C of the perovskite thin film at 1000 Hz is measured through impedance spectroscopy. Afterwards, $\varepsilon_r$ is measured by using $C = \varepsilon_r \varepsilon_0 A/d$ (where A is the device area, d is the thickness), and the exciton Bohr's diameter of $MAPbBr_3$ is calculated as 12.4 nm using the reduced effective mass value ($\mu = 0.117 m_o$) in Energy & Environmental Science, 2016, 9, 962. However, the value measured at 1000 Hz may be overestimated compared to the value measured at the frequency of excitons. Therefore, $\varepsilon_r$ must be at least smaller than 12.4 nm.

The dielectric constant should be measured at room temperature and measured using a pure metal halide perovskite thin film without a ligand, and may vary depending on the material. Generally, it may have a value of 7 to 30, more preferably between 7 and 20. If a value less than 7 is obtained, it is possible that it is due to a measurement error. In the case of $MAPbBr_3$, it seems that it may vary depending on the crystal size or the quality of the thin film, but a value between 7 and 20 is preferable. Also, if a different value is obtained depending on the quality of the thin film, the measured value using the thin film which has the largest grain size should be preferable.

$$E_b = 13.6 \frac{\mu}{\varepsilon_r^2} \quad \text{[Equation 2]}$$

Here, $E_b$ is the exciton binding energy and $\mu$ is the electron-hole pair mass reduced to $m_e \times m_h/(m_e+m_h)$ ($m_e$ is the effective electron mass and $m_h$ is the effective hole mass). For the $MAPbBr_3$ material, the exciton binding energy (25 meV) was experimentally derived at 2K, which is a cryogenic temperature (e.g., the Magneto-Optics method, see M. Baranowski and P. Plochocka, Adv. Energy. Mater. 2020, 10, 1903659), and the dielectric constant 8.08 ($\mu = 0.12$ applied) is derived by using the exciton binding energy. Since the dielectric constant tends to increase toward room temperature, the exciton Bohr's diameter may have a slightly larger value than 7.12 nm at room temperature. Therefore, the exciton Bohr's diameter of $MAPbBr_3$ will be measured in the range larger than 7 nm and smaller than 12.4 nm.

As another method of experimentally determining the exciton Bohr's diameter, the value at the point where the photoluminescence peak wavelength starts to change rapidly depending on the size of the nanoparticles is the closest value to the exciton Bohr's diameter. Alternatively, it can be seemed as the particle size at the point where the full width at half maximum (FWHM) of the photoluminescence spectrum starts to increase. The quantum confinement effect begins to appear below the exciton Bohr's diameter, and particles having the particle size below exciton Bohr's diameter are called quantum dots. If the particle size becomes in the quantum dot range and there is uniformity of the particle size, the photoluminescence peak shifts to the blue color as this size decreases and the color changes according to the size change. In addition, when the photoluminescence spectra of all particles are collected, the full width at half maximum increases. The size of the particles is most preferably measured with a transmission electron microscope. When measured by the light scattering method, the particle size error is large. When the particles are agglomerated, it is difficult to analyze the size of one particle, and the size of particles is overestimated as the aggregated particles.

The quantum confinement effect refers to a phenomenon observed when the energy band is affected by changes in the atomic structure of particles, and the exciton Bohr's diameter is the size (size of semiconductor particles) at which the quantum confinement effect occurs. That is, when the particle size of the semiconductor is in a quantum dot range that is less than or equal to the exciton Bohr's diameter, the quantum confinement effect is appeared as the particle size decreases, and accordingly, the "bandgap" and the corresponding "emission wavelength (The photoluminescence (PL) spectrum) may change. Therefore, in order to obtain the substantial value of the exciton Bohr's diameter, it is necessary to find the range where the quantum confinement effect starts, that is, the point at which the emission wavelength changes according to the size of the semiconductor particle.

However, even when the particle size is larger than the exciton Bohr's diameter, the band gap and emission wavelength of the semiconductor particle may be changed since electron-hole interaction in the semiconductor is changed. However, since the amount of change is very insignificant, it is usually called "weak confinement regime". On the other hand, the quantum confinement regime, in which the band gap varies greatly depending on the size of the quantum dot particle, is referred to as the "strong confinement regime". Therefore, in order to obtain the exciton Bohr's diameter, it is necessary to find the boundary between the weak confinement regime and the strong confinement regime. Therefore, in case the particle size obtained by experimentally using the point where the PL peak or FWHM changes rapidly (the point where the straight line drawn along the slope meets when it has two sharply different slopes) and the value obtained by the above formula have a slight error range (about 10%), it can be said that the exciton Bohr's diameter obtained by the equation is a physically meaningful value.

When determining the exciton Bohr's diameter used to determine whether quantum dots are or not, at least one of change in the wavelength (PL Peak) where the maximum value of the photoluminescence spectrum is located, the half width at half maximum (FWHM), and change of Valence Band Maximum (VBM) of material (measured by Ultraviolet Photoelectron Spectroscopy) should be measured, and the exciton Bohr's diameter is determined based on whether the measured value and the theoretical calculated value are consistent with each other. Below this exciton Bohr's diameter, as the particle size decreases, the change of the wavelength at which the maximum value of photoluminescence intensity is located increases (moves toward blue color), and the full width at half maximum becomes large (more spread out), and the VBM also changes in the downward direction.

In this case, the exciton Bohr's diameter of the nanoparticles (about 10 nm based on $MAPbBr_3$, about 7 nm based on $CsPbBr_3$) may be equal to or greater than 7 nm and less than or equal to 30 nm. For example, the exciton Bohr's diameter of the nanoparticles may be 7 nm, 7.5 nm, 8 nm, 8.3 nm, 8.5 nm, 8.7 nm, 9 nm, 9.3 nm, 9.5 nm, 9.7 nm, 10 nm, 10.3 nm, 10.5 nm, 10.7 nm, 11 nm, 11.3 nm, 11.5 nm, 11.7 nm, 12 nm, 12.3 nm, 12.5 nm, 12.7 nm, 13 nm, 13.3 nm, 13.5 nm, 13.7 nm, 14 nm, 14.3 nm, 14.5 nm, 14.7 nm, 15 nm, 15.3 nm, 15.5 nm, 15.7 nm, 16 nm, 16.5 nm 17 nm, 17.5 nm, 18 nm, 18.5 nm, 19 nm, 19.5 nm, 20 nm, 21 nm, 22 nm, 23 nm, 24 nm, 25 nm, 26 nm, 27 nm, 28 nm, 29 nm, 30 nm. Among the two numbers selected from above, the smaller value may be set as a lower limit and a larger value may be set as an upper limit, and may be specifically 7 to 25 nm, more preferably 10 nm or more and 20 nm or less.

The size of the nanocrystal particles may be 7 nm to 900 nm or less. More specifically, it may be 7 nm to 30 nm. For example, the size of the nanocrystal particles may be 7 nm, 8 nm, 9 nm, 10 nm, 11 nm, 12 nm, 13 nm, 14 nm, 15 nm, 16 nm, 17 nm, 18 nm, 19 nm, 20 nm, 25 nm, or 30 nm, it may be preferably 10 nm to 30 nm. On the other hand, the size of the nanocrystal particles means a size that does not take into account the length of the ligand to be described later, that is, the size of the remaining portion except for the ligand.

For example, when the nanocrystal particles are spherical, the diameter of the nanocrystal particles may be 10 nm to 30 nm.

The band gap energy of the nanocrystal particles having a size of 7 nm to 900 nm according to the present inventive concept is determined by the structure of the perovskite crystal. This is different from the existing inorganic quantum dot light-emitting material, which is not a perovskite material, which depends on the particle size according to the quantum confinement effect.

However, if the nanocrystal particles have a size of less than the Bohr's diameter, that is, for example, less than 7 nm, the band gap is changed by the particle size. Furthermore, since it is difficult to control the distribution of the particle size having a small size of less than 7 nm, there is a disadvantage in that it is difficult to realize high color purity. The Bohr's diameter may vary depending on the structure of the material, but since it is generally more than 7 nm, the emission wavelength is changed in the case of less than 7 nm even if it has the same perovskite structure. However, the change of the emission wavelength depending on the particle size has a disadvantage in mass production because it requires more fine control during the synthesis and processing of the particles.

In addition, if the nanocrystal particles have a size exceeding 900 nm, the exciton binding energy is reduced and the excitons cannot perform light emission due to thermal ionization and delocalization of charge carriers at room temperature, so that the luminous efficiency may be reduced.

In addition, the band gap energy of these nanocrystal particles may be 1 eV to 5 eV. Specifically, the band gap energy of the nanocrystal particles may be 1 eV to 3 eV.

Therefore, since the energy band gap is determined according to the constituent material or crystal structure of the nanocrystal particle, light having a wavelength of, for example, 200 nm to 1300 nm can be emitted by controlling the constituent material of the nanocrystal particles.

In addition, the perovskite color converter is made of perovskite nanoparticles and siloxane resin, and refers to a material or film that absorbs light and converts it into a specific color. The organic ligands of the perovskite nanoparticles are cross-linked with the methacrylate group of the siloxane resin, and the evenly dispersed perovskite nanoparticles are chemically bound to the siloxane resin.

Embodiment

FIG. 1 is a flowchart for explaining a method of manufacturing a perovskite color converter according to a preferred embodiment of the present inventive concept. First, a first dispersion in which pre-fabricated perovskite nanoparticles are dispersed in a silane precursor is formed (S100).

A silane precursor and perovskite nanoparticles are used to prepare the first dispersion. In the silane precursor, the perovskite nanoparticles do not aggregate with each other and remain dispersed. This is due to the hydrophobic interaction between the silane precursor and the organic ligand. In addition, a meaningful bond is not formed between the silane precursor and the organic ligand of the perovskite nanoparticles. The meaningful bonding means that the perovskite nanoparticles and the silane precursor are chemically bonded to change the physical properties of the perovskite nanoparticles.

Silane precursors that can be used are organic alkoxysilanes or organic silanediols.

The organic alkoxysilane may be tetraethoxysilane, tetramethoxysilane, (3-methacryloxypropyl)trimethoxysilane, (3-methacryloxypropyl)triethoxysilane, (2-(3,4-epoxycyclohexyl)ethyl)trimethoxysilane, (2-(3,4-epoxycyclohexyl)ethyl)triethoxysilane, vinyltrimethoxysilane, vinyltriethoxysilane, (3-aminopropyl)trimethoxysilane, (3-aminopropyl)triethoxysilane, (3-mercaptopropyl)trimethoxysilane, (3-mercaptopropyl)triethoxysilane, (3-chloropropyl)trimethoxysilane, (3-chloropropyl)triethoxysilane, methyltrimethoxysilane, methyltriethoxysilane, trimethoxysilane, triethoxysilane, phenyltrimethoxysilane, phenyltriethoxysilane, dimethoxyvinylmethylsilane, diethoxyvinylmethylsilane, (3-methacryloxypropyl)methyldimethoxysilane, (3-methacryloxypropyl)methyldiethoxysilane, (2-(3,4-epoxycyclohexyl)ethyl)methyldimethoxysilane, (2-(3,4-epoxycyclohexyl)ethyl)diethoxysilane, (3-aminopropyl)methyldimethoxysilane, (3-aminopropyl)methyldiethoxysilane, (3-mercaptopropyl)methyldimethoxysilane, (3-mercaptopropyl)triethoxysilane, (3-chloropropyl)methyldimethoxysilane, (3-chloropropyl)methyldiethoxysilane, diphenyldimethoxysilane, diphenyldiethoxysilane, (3-methacryloxypropyl)dimethylmethoxysilane), (3-methacryloxypropyl)dimethylethoxysilane, (2-(3,4-epoxycyclohexyl)ethyl)dimethylmethoxysilane, (2-(3,4-epoxycyclohexyl)ethyl)dimethylethoxysilane, vinyldimethylmethoxysilane, vinyldimethylethoxysilane, (3-aminopropyl)dimethylmethoxysilane, (3-aminopropyl)dimethylethoxysilane, (3-mercaptopropyl)dimethylmethoxysilane, (3-mercaptopropyl)dimethyltriethoxysilane, (3-chloropropyl)dimethylmethoxysilane, (3-chloropropyl)dimethylethoxysilane, methyltriethoxysilane, trimethoxysilane, triethoxysilane, phenyltrimethoxysilane or phenyltriethoxysilane, and mixtures thereof may also be used.

The organic silanediol may include diphenylsilanediol, diisobutylsilanediol, 1,4-bis(hydroxyldimethylsilyl)benzene, or 4-vinylphenylsilanediol, and a mixture thereof is also used as the organic silanediol.

Then, a second dispersion is formed by stirring the first dispersion (S200). The silane precursor in the second dispersion forms a siloxane resin by a non-aqueous sol-gel reaction.

Figure 2:
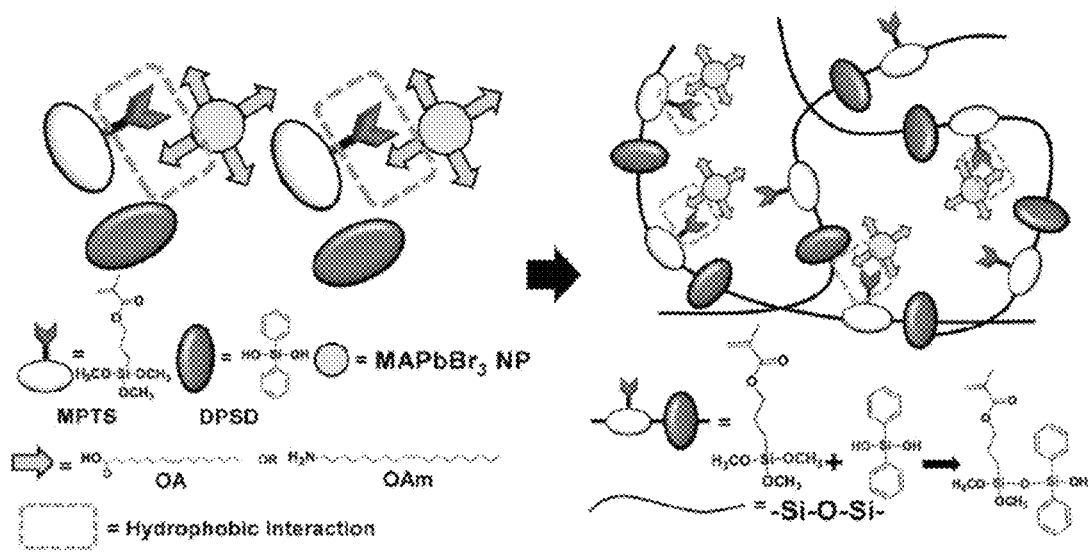
FIG. 2 is a schematic diagram for preparing a second dispersion according to a preferred embodiment of the present inventive concept.

FIG. 2 is a schematic diagram for preparing a second dispersion according to a preferred embodiment of the present inventive concept.

Referring to FIG. 2, (3-methacryloxypropyl)trimethoxysilane, (MPTS) and diphenylsilanediol (DPSD) are used as silane precursors. Perovskite nanoparticles are dispersed in a non-polar solvent. The organic ligand used in the perovskite nanoparticles may be an organic ligand comprising an unsaturated hydrocarbon. For example, it may be a ligand of carboxylic acid and amine series.

In addition, the organic ligand may be a phosphonic acid-based ligand.

In addition, the organic ligand may be an organic ammonium-based ligand.

The carboxylic acid ligand may have an alkyl-X structure. In this case, the halogen element corresponding to X may include Cl, Br, or I. In addition, the alkyl structure may have an acyclic alkyl having a structure of $C_nH_{2n+1}$, a primary alcohol having a structure such as $C_nH_{2n+1}OH$, a secondary alcohol, a tertiary alcohol, alkylamine having a structure of alkyl-N (ex. hexadecyl amine, 9-octadecenylamine 1-amino-9-octadecene ($C_{19}H_{37}N$)), p-substituted aniline, phenyl ammonium or fluorine ammonium. But, it is not limited to thereto.

In addition, the organic ligand carboxylic acid may have 4,4'-azobis(4-cyanopaleric acid), acetic acid, 5-aminosalicylic acid, acrylic acid, L-aspentic acid, 6-bromohexanoic acid, bromoacetic acid, dichloro acetic acid, ethylenediaminetetraacetic acid, isobutyric acid, itaconic acid, maleic acid, r-maleimidobutyric acid, L-malic acid, 4-nitrobenzoic acid, 1-pyrenecarboxylic acid or oleic acid. In addition, the carboxylic acid surfactant may be dihydrolipoic acid (DHLA) containing a —SH (thiol) group or an amphiphilic (zwitterionic) ligand containing this functional group. The carboxylic acid organic ligand may form a carboxylic acid ligand or an oleate ligand on the surface of the perovskite nanocrystal particles upon synthesis.

The amine ligand may be ethylamine ($C_2H_7N$), propylamine ($C_3H_9N$), butylamine ($C_4H_{11}N$), pentylamine ($C_5H_{13}N$), hexylamine ($C_6H_{15}N$), octylamine ($C_8H_{19}N$), decylamine ($C_{10}H_{23}N$), hexadecylamine ($C_{16}H_{35}N$), octadecylamine ($C_{18}H_{39}N$) or oleylamine ($C_{18}H_{35}NH_2$), but is not limited to thereto. In addition, the amine ligand may have N,N-diisopropylethylamine, ethylene diamine, hexamethylenetetraamine, methylamine, N,N,N,N-tetramethylenethylenediamine, triethyl amine, diethanolamine, 2,2-(ethylenedioxyl) bis-(ethylamine), 2-methyl-1,5-pentanediamine, 3-methoxytriphenyl-amine, 1,4-phenylenediamine, N,N,N,N-pentamethyl diethylenetriamine, triethylenetetramine, rhodamine, diethylamine, or the like. The amine organic ligand may form an amine ligand or ammonium ligands on the surface of the perovskite nanocrystal particles when the particles are synthesized.

The phosphonic acid organic ligand may have n-hexylphosphonic acid, n-octylphosphonic acid, n-decylphosphonic acid, n-dodecylphosphonic acid, n-tetradecylphosphonic acid, n-hexadecylphosphonic acid, n-octadecylphosphonic acid, benzylphosphonic acid or benzhydrylphosphonic acid. The phosphonic acid surfactant may form a phosphonic acid ligand on the surface of the particle when synthesizing the perovskite nanocrystal particles.

The organic ammonium organic ligand may form an organic ammonium ligand on the surface of the particle when synthesizing the perovskite nanocrystal particles.

The organic ammonium ligand may include an alkyl halide.

The alkyl structure of the alkyl halide may be an acyclic alkyl having a structure of $C_nH_{2n+1}$, a primary alcohol, a secondary alcohol, a tertiary alcohol, an alkylamine, a p-substituted aniline, phenyl ammonium, or ammonium fluoride.

The organic ammonium surfactant comprising the alkyl structure may include an alkyl ammonium halide. For example, it can contain halides while containing alkyl ammonium such as octylammonium (C8), dodecylammonium (C12) or octadecylammonium (C18). In other words, octylammonium bromide (OAB), didodecyldimethyl ammonium bromide (DDAB), dioctyldimethyl ammonium bromide (DOAB), methyltriotcyl ammonium bromide (TrOAB), tetraoctyl ammonium bromide (TeOAB), didecyldimethyl ammonium bromide (DDeAB) or ditetradecyldimethyl ammonium bromide (DTAB) may be included as alkyl ammonium halide. Alternatively, the organic ammonium surfactant can contain oleylammonium.

The organic ammonium ligand may include an amphiphilic (zwitterionic) ligand. For example, it may be a ligand including lecithin, sulfobetaines, phosphocholines, and γ-amino acids. A specific example of the sulfobetaines may be 3-(N,N-dimethyloctadecylammonio)propanesulfonate, but is not limited thereto.

The organic ligand including the unsaturated hydrocarbon may be a monomer including a double bond in the carbon chain of the organic ligand. The organic ligand having an unsaturated hydrocarbon may be an organic ligand of a carboxylic acid-based, an amine-based or phosphonic acid, but is not limited to thereto.

The carboxylic acid having the unsaturated hydrocarbon may have a structure of $R(C=C)R_1(COOH)$. Here, R and $R_1$ may be an organic group including a benzene or an alkyl group, or a mixed organic group thereof, but is not limited thereto. R and $R_1$ may be the same or different groups.

Examples of the carboxylic acid having the unsaturated hydrocarbon may include oleic acid, 9-heptadecenoic acid, palmitoleic acid, 9-pentadecenoic acid, 9-tetradecenoic acid, 9-tridecenoic acid, 9-dodecenoic acid, 9-undecenoic acid, 2-undecenoic acid, 2-decenoic acid, 2-nonenoic acid, 2-octenoic acid, 2-heptenoic acid, 2-hexenoic acid, 2-pentenoic acid, 2-butenoic acid, acrylic acid, 8-heptadecenoic acid, 7-heptadecenoic acid, 6-heptadecenoic acid, 5-heptadecenoic acid, 4-heptadecenoic acid, 3-heptadecenoic acid or 2-heptadecenoic acid, but is not limited thereto.

Organic ligands containing the unsaturated hydrocarbons can be oleates.

The amine having the unsaturated hydrocarbon may have a structure of $R(C=C)R_1(NH_2)$. Here, R and $R_1$ may be an organic group including a benzene or an alkyl group, or a mixed organic group thereof, but is not limited thereto. R and $R_1$ may be the same or different groups.

The amine having the unsaturated hydrocarbon may include oleylamine, 9-heptadecenamine, 9-hexadecenamine, 9-pentadecenamine, 9-tetradecenamine, 9-tridecenamine, 9-dodecenamine, 9-undecenamine, 2-undecenamine, 2-decenamine, 2-nonenamine, 2-octenamine, 2-heptenamine, 2-hexenamine, 2-pentenamine, 2-butenamine (2-butenamine), acrylic amine, 8-heptadecenacrylicamine, 7-heptadecenacrylicamine, 6-heptadecenacrylicamine, 5-heptadecenacrylicamine, 4-heptadecenacrylicamine, 3-heptadecenacrylicamine, or 2-heptadecenacrylicamine, but is not limited thereto.

The phosphonic acid having the unsaturated hydrocarbon may have a structure of $R(C=C)R_1(OP(OH)_2)$. Here, R and $R_1$ may be an organic group including a benzene or an alkyl group, or a mixed organic group thereof, but is not limited thereto. R and $R_1$ may be the same or different groups.

The fluorocarbon having the unsaturated hydrocarbon may include $R(C=C)R_1(CF_3)$, $(R(C=C)R_1)(R_2(C=C)R_3)(CF_2)$, $(R(C=C)R_1)R_2(CF_2)$, $(R(C=C)R_1)(R_2(C=C)R_3)(R_4(C=C)R_5)(CF)$, $(R(C=C)R_1)(R_2)(R_3(C=C)R_4)(CF)$, or $(R(C=C)R_1)R_2R_3(CF)$. Here, R, $R_1$, $R_2$, $R_3$, $R_4$, and $R_5$ may be an organic group including at least one hydrogen atom, an organic group including at least one fluorine atom, phenyl or an alkyl group including a fluorine atom, or a mixed organic group thereof, but is not limited thereto. R, $R_1$, $R_2$, $R_3$, $R_4$, and $R_5$ may be the same or different groups.

When an organic ligand that does not have an unsaturated carbon bond or that is not crosslinkable with a siloxane resin is used, a meaningful chemical bond between the perovskite nanoparticles and the siloxane resin is not formed, so the elements constituting the perovskite (especially, halide ions) are separated from the crystal structure (or migrated), so that the protective effect by siloxane resin on the perovskite nanoparticles does not occur. This effect is confirmed with reference to FIGS. 12 and 16.

Figure 12:
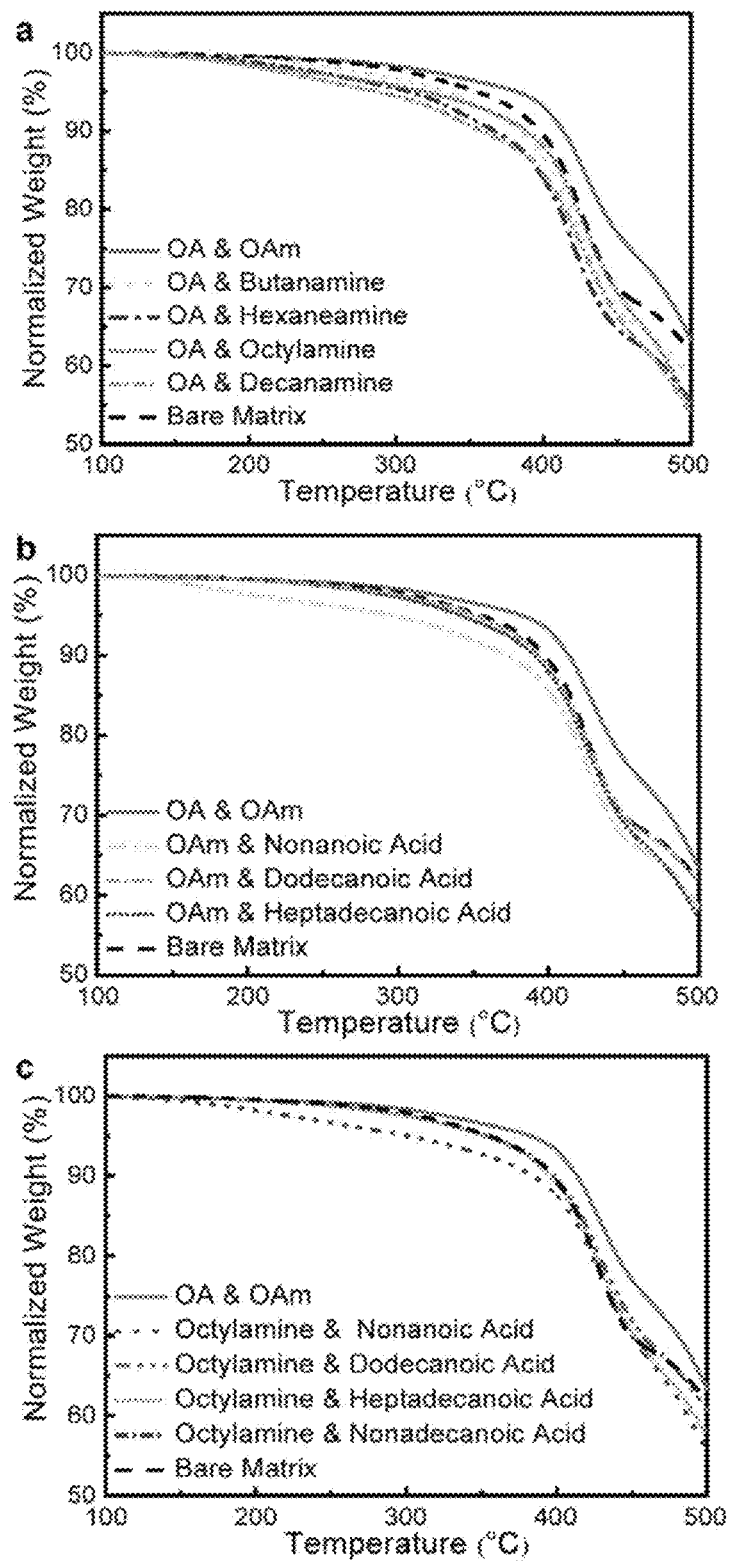
FIG. 12 is a graph comparing thermogravimetric analysis (TGA) of a perovskite color converter in which organic ligands do not have a carbon double bond.

According to FIG. 12, only the perovskite color converter using oleic acid and oleylamine having carbon double bonds as organic ligands increases the decomposition temperature at which the weight is reduced by 5%, and perovskite using organic ligands that do not have carbon double bond is confirmed that the decomposition temperature is reduced compared to the existing siloxane material. It is confirmed that perovskite nanoparticles using oleylamine or oleic acid form cross link with the siloxane resin and protective effect by siloxane resin on the perovskite nanoparticles appears.

Figure 16:
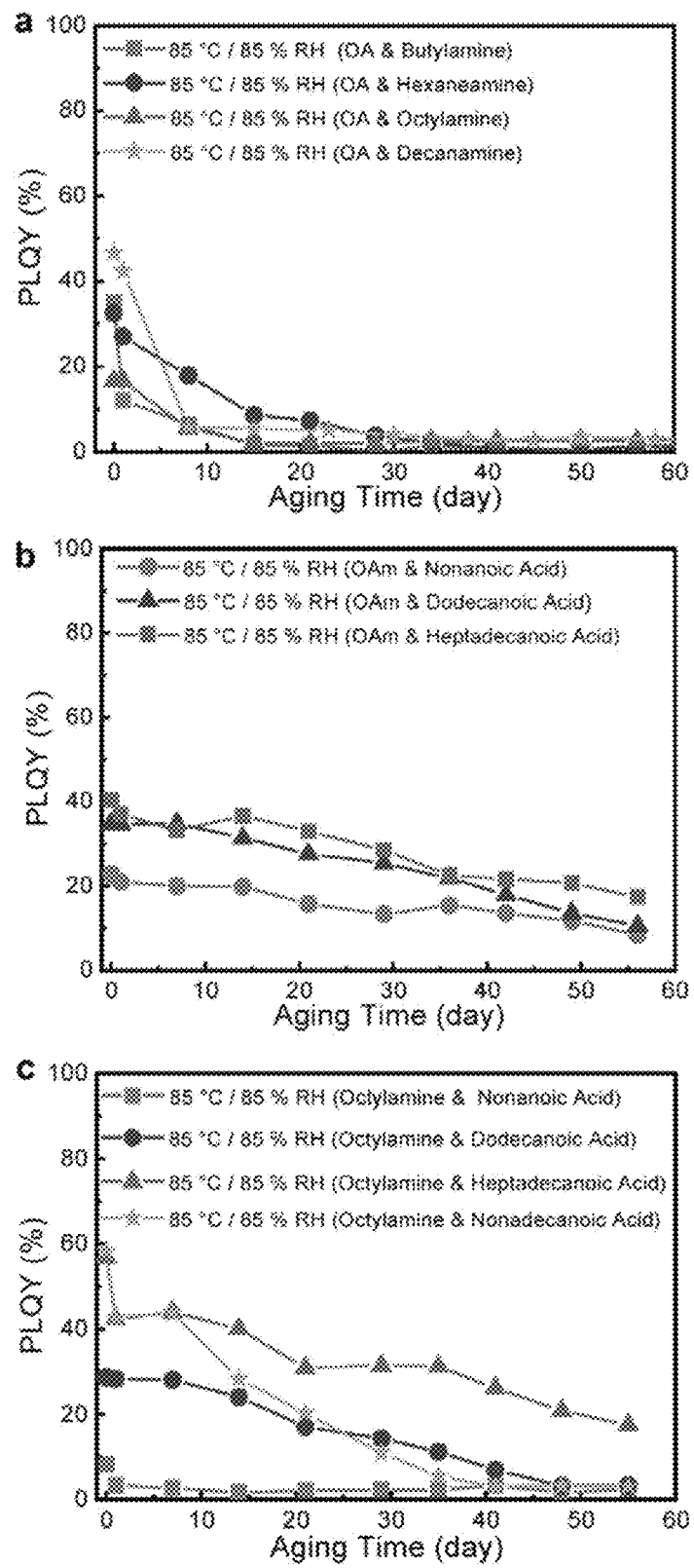
FIG. 16 is graph comparing the 85-85 reliability results of perovskite color converter that does not have a carbon double bond.

According to FIG. 16, it is confirmed that the quantum efficiency is greatly reduced in the 85° C.-85% RH (hereafter, 85-85) environment when the organic ligand in the perovskite nanoparticles does not have a carbon double bond. This means that chemical crosslinking between perovskite nanoparticles and siloxane resin is a very important factor in the reliability of perovskite color converter, and both carboxylic acid and amine ligands should contain carbon double bonds to achieve excellent stability.

Stirring of the first dispersion forms a second dispersion. A basic catalyst is mixed into the first dispersion prior to performing stirring. Barium hydroxide ($Ba(OH)_2$) is used as the basic catalyst, and the basic catalyst induces a non-aqueous sol-gel reaction between MPTS and DPSD.

In the first dispersion, the methacrylate group at the end of MPTS and the phenyl group of DPSD form a hydrophobic interaction with the organic ligand so that the perovskite nanoparticles are evenly dispersed in the silane precursor. In addition, a non-aqueous sol-gel reaction occurs by a basic catalyst through a stirring process, and MPTS and DPSD by the sol-gel reaction form a first compound according to the following reaction formula.

[Reaction Formula 1]

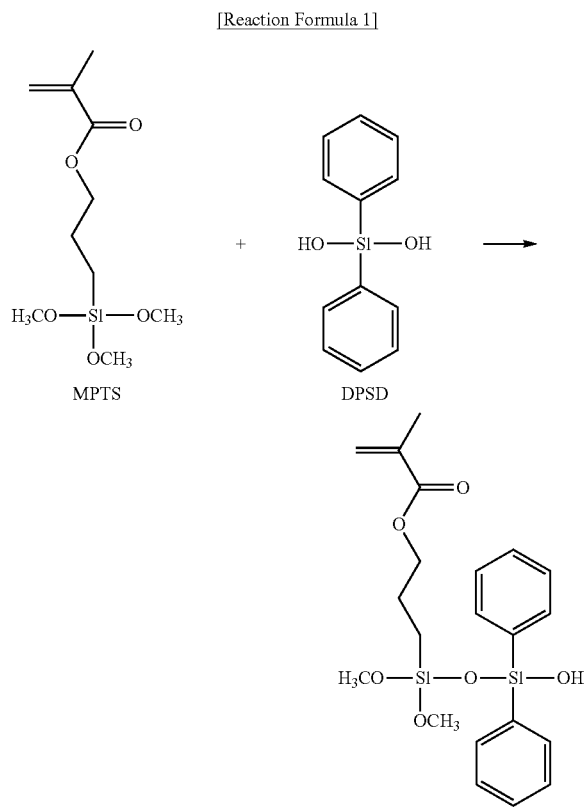

In reaction formula 1, the methoxy group of MPTS is combined with the hydroxyl group of DPSD to form a siloxane structure of Si O Si. This is a non-aqueous sol-gel reaction. The formed siloxane resin has a network structure, and the perovskite nanoparticles are uniformly dispersed in the siloxane resin due to the hydrophobic interaction between the organic ligand and the methacrylate group.

In particular, DPSD is used for non-aqueous sol-gel reactions. If water is used for the sol-gel reaction (hydrolytic sol-gel reaction), the perovskite nanoparticles dispersed in the siloxane resin are decomposed due to moisture remaining in the compound, and the luminescent properties are rapidly deteriorated.

The formed second dispersion has a siloxane resin having a network structure in which MPTS and DPSD are formed by a non-aqueous sol-gel reaction, and perovskite nanoparticles evenly dispersed in the siloxane resin. However, a meaningful bond is not formed between the siloxane resin synthesized in the second dispersion and the perovskite nanoparticles.

Polymer series including at least one of epoxy, silicone, acrylic polymer, glass, carbonate-based polymer, polyimide, colorless polyimide, urethane-based polymer, hydrogel, and mixtures thereof may be additionally mixed to the second dispersion formed.

The silicone-based polymer may include at least one silicon-carbon bond.

The silicone-based polymer may be an organic siloxane solvent or polyorganosiloxane.

The silicone-based polymer may include the following Chemical Formula 1, Chemical Formula 2, Chemical Formula 3, Chemical Formula 4, or a combination thereof.

[Chemical Formula 1]

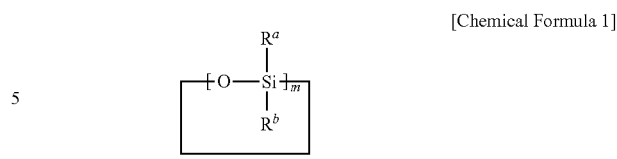

In Chemical Formula 1, $R^a$ and $R^b$ may each independently represent hydrogen, an alkyl group having 1 to 20 carbon atoms, an alkenyl group having 2 to 20 carbon atoms, an alkynyl group having 2 to 20 carbon atoms, or an aryl group having 6 to 25 carbon atoms, and m is integer of 3 to 6.

[Chemical Formula 2]

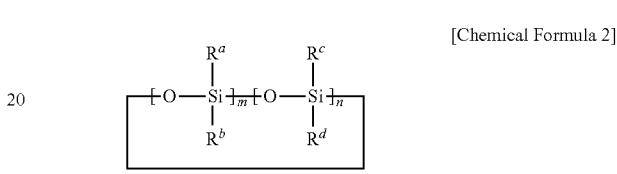

In Chemical Formula 2, $R^a$ to $R^d$ may be independently hydrogen, an alkyl group having 1 to 20 carbon atoms, an alkenyl group having 2 to 20 carbon atoms, an alkynyl group having 2 to 20 carbon atoms, or an aryl group having 6 to 25 carbon atoms, m and n may independently be an integer from 3 to 10.

[Chemical Formula 3]

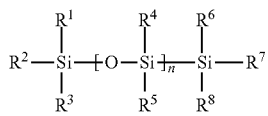

In Chemical Formula 3, $R^1$ to $R^7$ may be independently hydrogen, an alkyl group having 1 to 20 carbon atoms, an alkenyl group having 2 to 20 carbon atoms, an alkynyl group having 2 to 20 carbon atoms, or an aryl group having 6 to 25 carbon atoms, and n is an integer of 3 to 100.

[Chemical Formula 4]

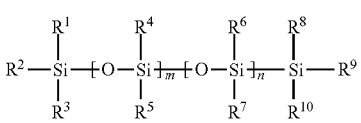

In Chemical Formula 4, $R^1$ to $R^{10}$ are independently hydrogen, an alkyl group having 1 to 20 carbon atoms, an alkenyl group having 2 to 20 carbon atoms, an alkynyl group having 2 to 20 carbon atoms, or an aryl group having 6 to 25 carbon atoms, and m and n are independently integers of 3 to 10.

The silicon-based polymer remains among the perovskite light-emitting particles, and may be physically or chemically bonded to the surface of the particles.

In addition, the silicone-based polymer may chemically react with an organic ligand on the surface of the perovskite light-emitting particle to form polyorganosiloxane.

The chemical reaction may be a ring-opening reaction of the silicone-based polymer.

The polyorganosiloxane may be polydimethylsiloxane (PDMS).

The viscosity of the silicone-based polymer may be 0.5 to 2000 cps at 25° C. For example, the viscosity of the silicone-based polymer may be 0.1, 0.2, 0.3, 0.4, 0.5, 0.55, 0.6, 0.7, 0.8, 0.9, 1, 2, 3, 4, 5, 6, 7, 8, 9, 10, 15, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1760, 1770, 1780, 1790, 1800, 1810, 1820, 1830, 1840, 1850, 1860, 1870, 1880, 1890, 1900, 1910, 1920, 1930, 1940, 1950, 1960, 1970, 1980, 1990, or 2000 (unit cps), and the smaller value of the two numbers selected from the above numbers can be determined as the lower limit and the larger value of the two numbers may determined as the upper limit, more specifically the viscosity of the silicone-based polymer may be 0.55 to 300 cps, but the present inventive concept is not limited thereto.

The refractive index of the organic siloxane solvent may be 1.2 to 1.7. For example, the refractive index of the organic solvent may be 1.20, 1.25, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, It may be 1.66, 1.67, 1.68, 1.69, or 1.70, and a smaller value among two numbers selected from the above numbers may be set as the lower limit value and a larger value may be set as the upper limit value, and more specifically, it may be 1.36 to 1.52, but limited thereto.

Then, a perovskite color converter is formed by inducing cross-linking in the second dispersion to form (S300).

The perovskite color converter includes perovskite nanoparticles and cross-linked siloxane resin. The luminescence operation is performed on the perovskite nanoparticles, and the stable dispersion and maintenance of the luminescent properties of the perovskite nanoparticles are realized by the cross-linked siloxane resin. In addition, the perovskite color converter may be provided as the form of a film.

Figure 3:
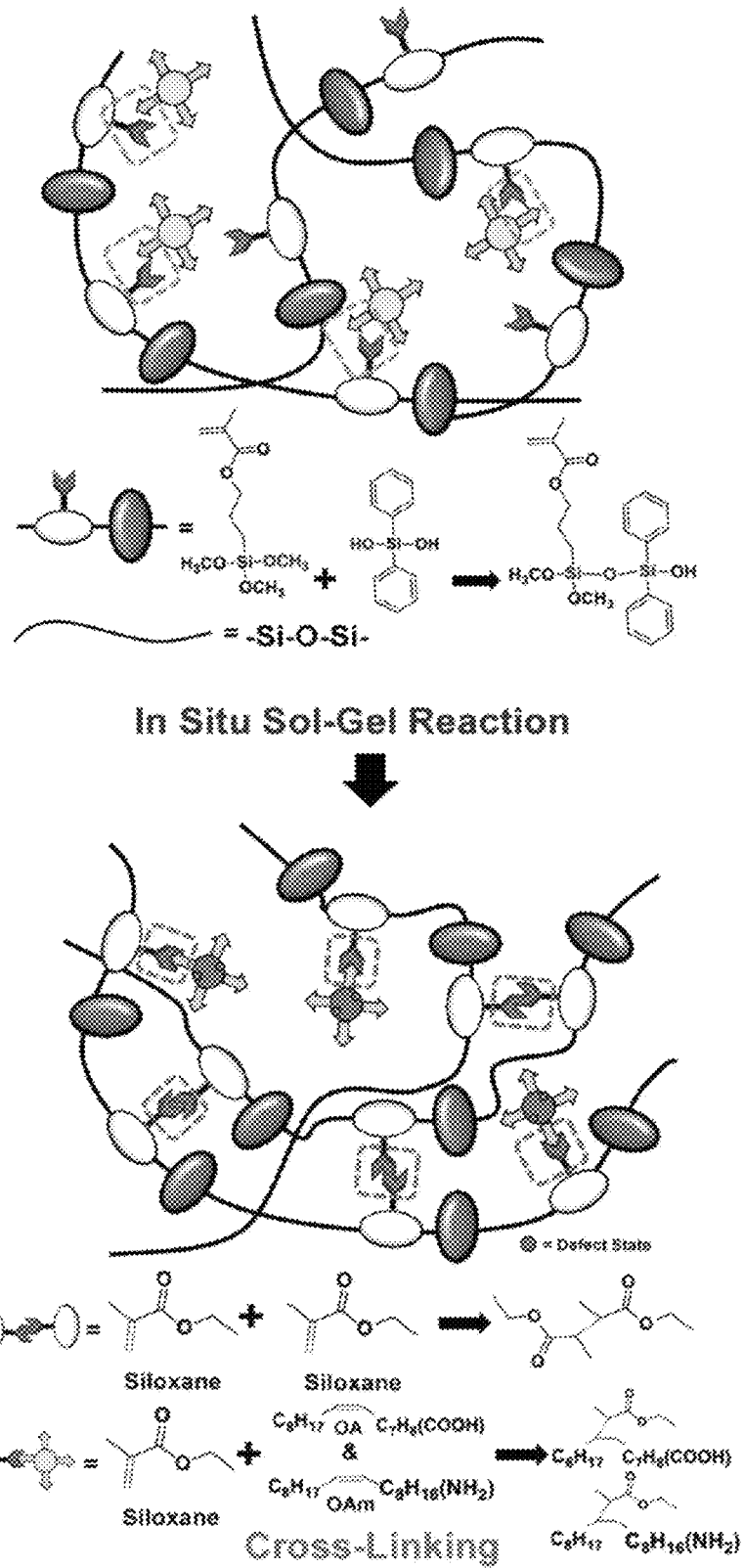
FIG. 3 is a schematic diagram for explaining a process of forming a perovskite color converter from a second dispersion according to a preferred embodiment of the present inventive concept.

FIG. 3 is a schematic diagram for explaining a process of forming a perovskite color converter from a second dispersion according to a preferred embodiment of the present inventive concept.

Referring to FIG. 3, the cross-linking reaction has two aspects, the first cross-linking is a cross-linking reaction among the siloxane resins in the second dispersion, and the second cross-linking is the cross-linking reaction between the siloxane resin and organic ligands of the perovskite nanoparticles.

Methacrylate group at the end of MPTS forms crosslink with each other, and methacrylate group at the end of MPTS forms crosslink with organic ligands. Therefore, the cross-linked siloxane resin of the perovskite color converter forms a denser network structure than the siloxane resin in the second dispersion.

The first cross-linking in which the cross-linking reaction between the siloxane resins occurs is according to reaction formula 2 below.

[Reaction Formula 2]

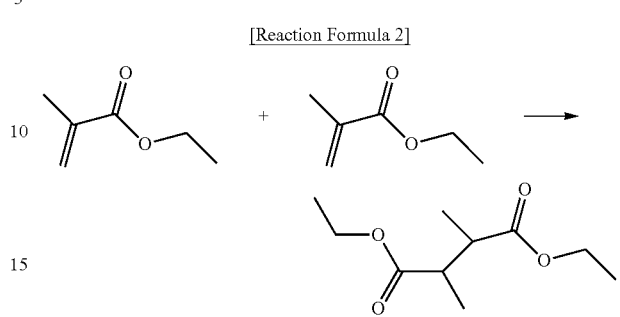

That is, the double bond of methacrylate group is changed to a single bond through crosslinking reaction. A network structure is formed due to the first cross-linking between the MPTSs of the first compound according to the reaction formula 1.

The second cross-linking is between the methacrylate group of MPTS and the organic ligand. It is according to reaction formula 3a or 3b below.

[Reaction Formula 3a]

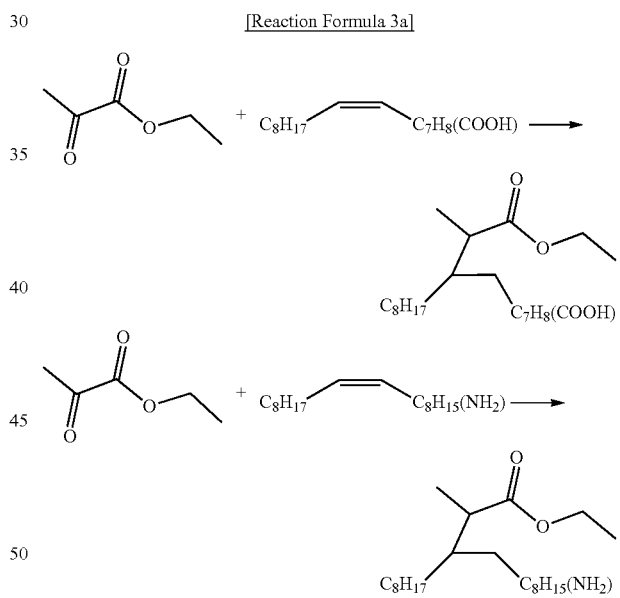

Even if unsaturated hydrocarbon ligands such as oleylamine and oleic acid are injected during the reaction, since they are actually attached to the perovskite as the form of ammonium ($NH_3^+$) and oleate ($COO^-$), reaction formula 3a can be interpreted as the following reaction formula 3b.

[Reaction Formula 3b]

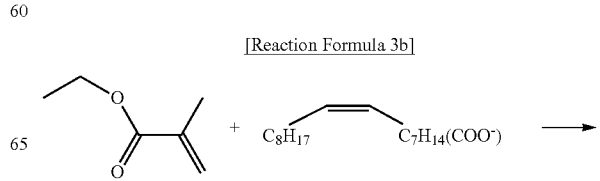

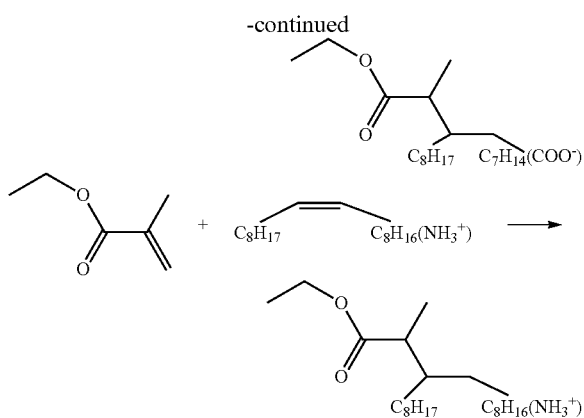

The second cross-linking is a bonding between the double bond of methacrylate group and the double bond of oleylamine and oleic acid. Through the second cross-linking, the perovskite nanoparticles are fixed in the cross-linked siloxane resin, and can maintain strong physical properties against the external environment such as humidity, temperature, and acidic and basic conditions.

Ultraviolet light is used for crosslinking and a photocatalyst is added to the second dispersion. The photocatalyst absorbs ultraviolet light to induce a crosslinking reaction. Various types of cross-links formed by the cross-linking reaction induce the siloxane resin to have a dense network structure. For example, 2,2-dimethoxy-2-phenylacetophenone (BDK) may be used as the photocatalyst, and BDK absorbs ultraviolet light having a wavelength of approximately 365 nm or less, so that the BDK induces to form radicals. The radical formed breaks the double bond between carbons in the methacrylate group or organic ligand.

In addition to BDK, a phenone-based photocatalyst may be used, and 2-hydroxy-2-methyl-1-phenylpropanone, 1-hydroxy-cyclohexylphenylketone, benzophenone, isopropylthioxanthone, 2-ethylhexyl-4-N,N-dimethylamino)benzoate or ethyl-4-(dimethylamino)benzoate may be used as a phenone-based photocatalyst, but is not limited thereto.

In addition, an oxime series may be used as the photocatalyst, and 4'-hydroxyacetophenone oxime may be used, but is not limited thereto.

Through the above-described process, the perovskite color converter includes a cross-linked siloxane resin and perovskite nanoparticles chemically bonded to the cross-linked siloxane resin.

The cross-linked siloxane resin has a siloxane bond by non-aqueous sol-gel reaction of MPTS and DPSD, and a single bond between carbons of methacrylate groups of MPTS. In addition, the cross-linked siloxane resin forms a single carbon-carbon bond with the carbons of the organic ligand of the perovskite nanoparticles.

In the present inventive concept, the perovskite nanoparticles can maintain dispersion even before the siloxane resin is synthesized. This is due to the hydrophobic interaction between the organic ligand of the perovskite nanoparticles and the silane precursor MPTS. A non-aqueous sol-gel reaction is performed in the process of synthesizing the siloxane resin through stirring. Due to the sol-gel reaction without water intervention, the perovskite nanoparticles can maintain excellent stability and luminous efficiency, and remain evenly dispersed. Then, a dense network structure is formed through cross-linking, so that strong physical properties against external temperature and humidity are maintained.

On the other hand, the size of the organic-inorganic perovskite nanocrystals produced may be 7 nm to 30 nm in the range of more than the Bohr's diameter beyond the quantum confinement effect. For example, the size of the perovskite nanocrystals may be 7 nm, 8 nm, 9 nm, 10 nm, 11 nm, 12 nm, 13 nm, 14 nm, 15 nm, 16 nm, 17 nm, 18 nm, 19 nm, 20 nm, 22 nm, 25 nm, 27 nm or 30 nm. If the Bohr's diameter may be 10 nm, and nanocrystal particles have a size less than 10 nm, the band gap changes depending on the particle size. Accordingly, there may be disadvantages in that it is difficult to control the size, the color purity and spectrum are affected by the size, and the efficiency is rather reduced due to defects on the surface of the nanocrystal.

The perovskite color converter of the present inventive concept is manufactured by UV curing. It has the same characteristics as a kind of negative type photoresist. That is, the portion exposed to ultraviolet light is cured, and the portion not exposed to ultraviolet light remains uncured. Using selective curing, various types of patterns can be formed using a photolithography process, which is a semiconductor process.

The second dispersion of the present inventive concept is coated on various substrates and plastic films to form a uniform film.

The coating may be spin coating, bar coating, or screen printing processes.

After coating of second dispersion, ultraviolet irradiation is performed using a photomask.

Here, the difference from the conventional photolithography process is that a soft baking process is not performed. Since a general photoresist contains a solvent in addition to the polymer resin, it is necessary to evaporate the solvent through soft baking, but the second dispersion of the present inventive concept does not comprise solvent, so that the soft baking process does not be needed.

After UV irradiation using a photomask, the pattern is developed using a developer.

The developer used is a mixture of a ketone-type solvent and an alcohol-type solvent.

Ketone solvents include acetone, acetophenone, 2-butanone, 2-Hexanone, cyclophentanone, ethyl isopropyl ketone, 2-hexanone, isophorone, beta-isophorone, mesityl oxide, methyl isobutyl ketone, methyl isopropyl ketone, 2-methyl-2-pentanone, 2-pentanone, 3-pentanone, or a solvent consisting of a mixture thereof, but is not limited thereto.

The alcohol type may be methanol, ethanol, isopropyl alcohol, or a solvent derived from a mixture thereof, but is not limited thereto.

After the developing process, a final pattern is formed through a baking process for evaporating the developer. At this time, the temperature of the baking process is set based on a solvent having a high boiling point among ketone and alcohol solvents.

Figure 37:
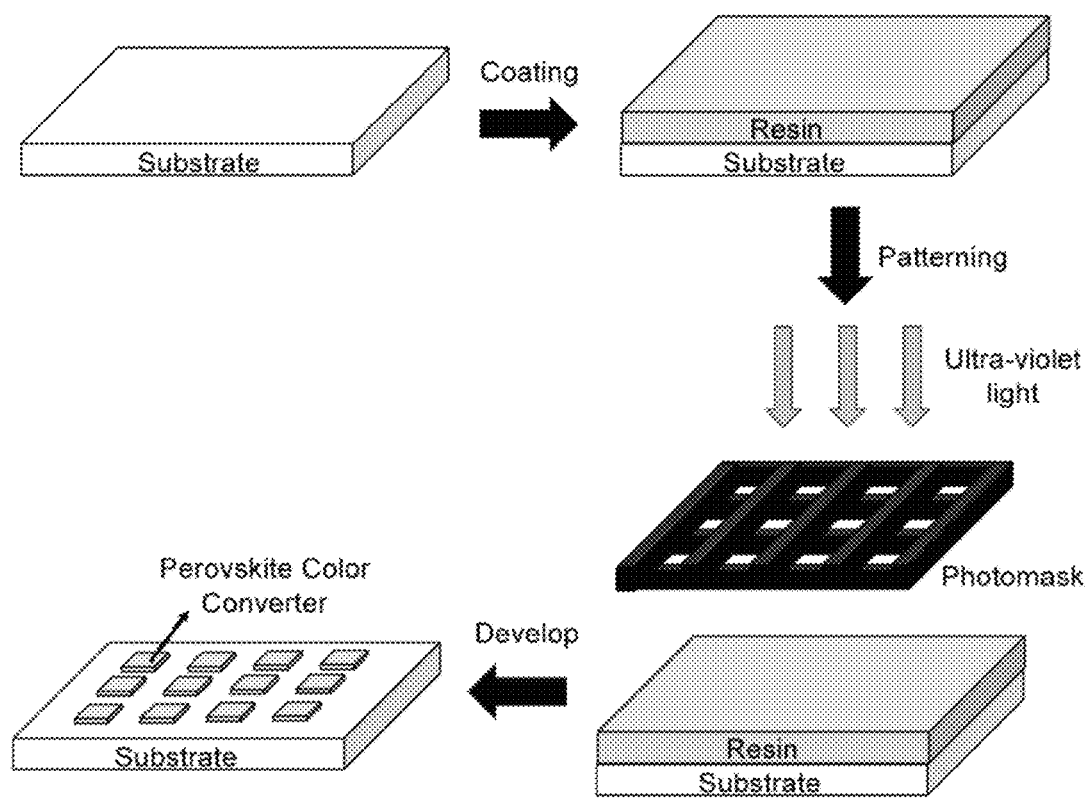
FIG. 37 is a schematic diagram of a photopatterning process using ultraviolet curing of the perovskite color converter according to Preparation Example 3 of the present inventive concept.

FIG. 37 is a schematic diagram of the patterning formation process of the perovskite color converter of the present inventive concept.

Referring to FIG. 37, if UV curing is performed using a photomask, optical patterning of the perovskite color converter of the present inventive concept is possible. At this time, the coated resin corresponds to the second dispersion of the present inventive concept, and the chemical cross-linking reaction by light irradiation follows the reaction formula 2 and 3.

Manufacturing Example 1: Synthesis of Perovskite Nanoparticles

Methylammonium bromide (MABr) 0.1 mmol and lead bromide (PbBr$_2$) 0.1 mmol are dissolved in 10 ml of dimethylformamide (DMF) to form a first precursor solution. Thereafter, 2 ml of oleic acid and 160 ul of oleylamine are dissolved in the first precursor solution to form a second precursor solution.

The second precursor solution dissolved in oleic acid and oleylamine is dropped dropwise into 20 ml of toluene under vigorous stirring. When the second precursor solution is added to toluene, the toluene solution exhibits a color of a mixture of yellow and green.

The toluene solution is mixed with 2 to 3 vol % of ethyl acetate, and centrifuged at a speed of 7,000 rpm for 5 minutes. Unreacted particles are removed through centrifugation, and the synthesized perovskite nanoparticles are precipitated at the bottom of the vessel. Perovskite nanoparticles are obtained and dispersed in a hexane or toluene solution.

Through the above process, perovskite nanoparticles having the composition formula $MAPbBr_3$ are prepared, and oleic acid and oleylamine are bonded to the surface of the perovskite nanoparticles as organic ligands to synthesize perovskite nanoparticles.

Preparation Example 2a: Preparation of the First Dispersion

MPTS and DPSD as a silane precursor are mixed in a molar ratio of 1:1, and the perovskite nanoparticles of Preparation Example 1 are also mixed with the silane precursor. Through this, the first dispersion is prepared.

The molar ratio of MPTS and DPSD in the silane precursor should be noted by those skilled in the art. If DPSD has a higher molar ratio than MPTS, unreacted DPSD is present in the subsequent non-aqueous sol-gel reaction, and unexpected side reactions may occur due to the presence of hydroxyl groups in unreacted DPSD. Accordingly, the molar ratio of MPTS and DPSD in the silane precursor is preferably 1:0.7 to 1:1.5. For example, the molar ratio of MPTS and DPSD in the silane precursor may be 1:0.7, 1:0.75, 1:0.8, 1:0.85, 1:0.9, 1:0.95, 1:1, 1:1.05, 1:1.1, 1:1.15, 1:1.20, 1:1.25, 1:1.30, 1:1.35, 1:1.40, 1:1.45, or 1:1.50. If the molar ratio of MPTS and DPSD is less than 1:0.7 (referring to the molar ratio of DPSD less than 0.7), the amount of MPTS that does not participate in the non-aqueous sol-gel reaction becomes excessive, and unreacted MPTS (a state in which no siloxane bond is formed) in the subsequent sol-gel condensation reaction is formed in excess and the degree of condensation of the siloxane resin is greatly reduced. Accordingly, the physical properties of the crosslinked siloxane resin are not sufficiently secured, the dispersion degree of the perovskite nanoparticles is inhibited due to unreacted MPTS, and the luminous efficiency of the perovskite nanoparticles is reduced in humidity and temperature environments.

If the molar ratio of MPTS and DPSD exceeds 1:1.5, the amount of DPSD that does not participate in the non-aqueous sol-gel reaction becomes excessive, and unreacted DPSD (a state in which no siloxane bond is formed) in the subsequent sol-gel condensation reaction is formed in excess, so that the degree of condensation of the siloxane resin, the dispersion degree of the perovskite nanoparticles and the optical properties of the siloxane resin is deteriorated. Furthermore, decomposition of perovskite nanoparticles occurs due to the hydroxyl group of DPSD, and the chemical crosslinking density between methacrylate group and the organic ligand of perovskite nanoparticles is low or crosslinking is disturbed due to a small amount of MPTS, so that the luminous efficiency of perovskite nanoparticles is decreased under the humidity and temperature environment.

Preparation Example 2b: Preparation of the Second Dispersion

For the preparation of the second dispersion, the first dispersion is stirred at 80° C. for several minutes. For the non-aqueous sol-gel reaction, barium hydroxide is added as a basic catalyst, and stirring is performed for several hours in an environment purging nitrogen gas. At this time, if nitrogen gas is not purged, by-products (methanol) generated during the sol-gel reaction remain in excess, thereby decomposing of perovskite nanoparticles or esterification (reverse reaction of sol-gel reaction) may induce to decomposition of the siloxane bond. Therefore, it difficult to manufacture a siloxane resin and maintain the luminous efficiency of the perovskite nanoparticles. Through this, a second dispersion is prepared.

At this time, a meaningful bond between the perovskite nanoparticles and the siloxane resin is not formed, but a uniform dispersion is formed by hydrophobic interaction, but encapsulation of the perovskite nanoparticles by the siloxane molecules is achieved.

The preparation of the perovskite color converter using the organic ligand not having an unsaturated hydrocarbon is the same as the preparation of the second dispersion except for the use of perovskite nanoparticles including the organic ligand not having an unsaturated hydrocarbon.

Preparation Example 3: Preparation of Perovskite Color Converter

In the second dispersion, BDK is added as a photocatalyst at 0.2 wt % of the weight of the synthesized siloxane resin, and ultraviolet light is irradiated. The wavelength of the irradiated ultraviolet light is 365 nm. A perovskite color converter is manufactured through irradiation of ultraviolet light for several minutes. At this time, a meaningful chemical cross-linkage is formed between the perovskite nanoparticles and the siloxane resin, and chemical encapsulation is performed at the molecular level.

When the metal halide perovskite light-emitter further includes a plurality of organic ligands surrounding the metal halide perovskite nanocrystals, preferably, the wavelength converter is formed of metal halide perovskite encapsulated by encapsulating resin in a matrix resin. The encapsulated particles may be in a dispersed form.

The metal halide perovskite may have a structure encapsulated by the first dispersion medium, and the encapsulated metal halide perovskite may have a structure dispersed in the second dispersion medium. In addition, preferably, the first dispersion medium may be characterized in that it has good compatibility with the organic ligand and uniformly disperses the metal halide perovskite. Also preferably, the dispersion medium may be a polymer. Preferably, the polymer may be characterized in that it has a polar group in at least one of a backbone or a side chain. The polar group may be adsorbed on the surface of the metal halide perovskite to serve to increase the dispersibility of the metal halide perovskite.

The perovskite color converter according to Preparation Example 3 of the present inventive concept is additionally encapsulated using an additional polymer resin through an additional process.

The additional process means mechanical processing or chemical treatment.

The mechanical processing means grinding, fragmentation, or milling, but is not limited thereto.

The chemical processing means chemical decomposition, swelling, or esterification, but is not limited thereto.

For the chemical decomposition, mechanical or magnetic stirring is performed at a constant temperature using a solvent such as ketone or alcohol.

The constant temperature means a temperature from room temperature to the boiling point of the solvent used. The temperature between room temperature and the boiling point of the used solvent is not limited to one.

At this time, a meaningful bond may or may not be formed between the siloxane resin in the perovskite color converter and the polymer resin for additional encapsulation. Even if meaningful bonds are not formed, molecular encapsulation can be formed.

Figure 38:
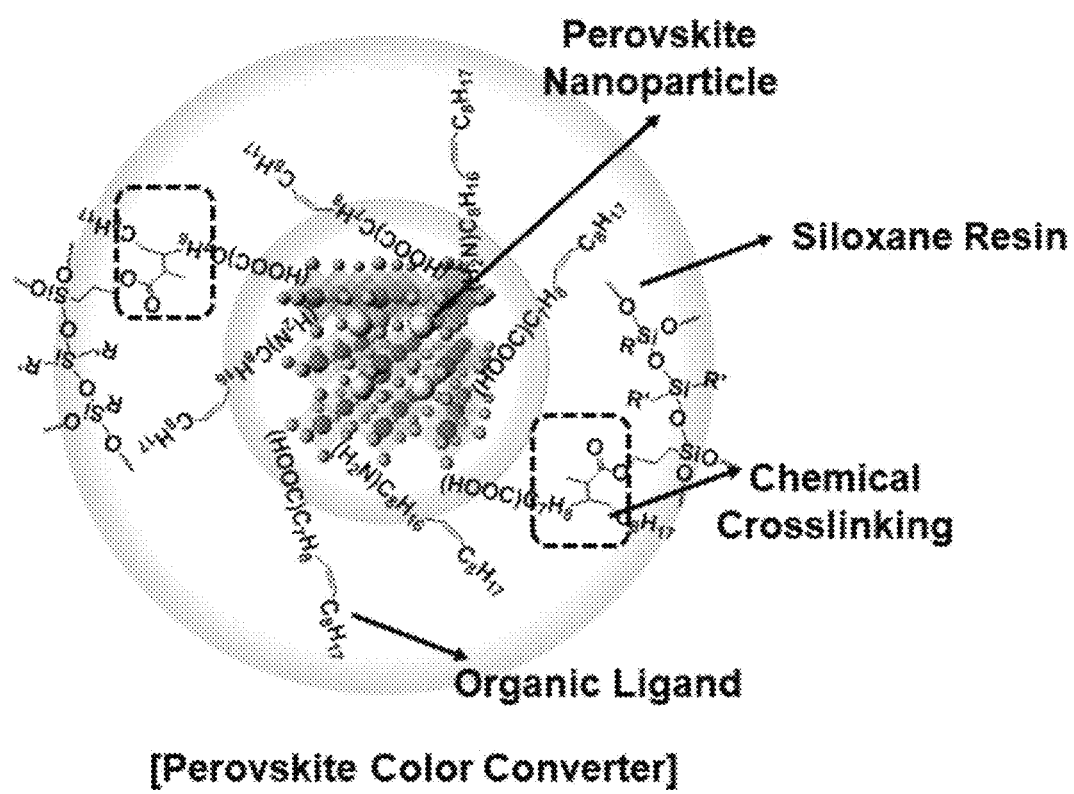
FIG. 38 is a schematic diagram of perovskite nanoparticles encapsulated by siloxane resin in a perovskite color converter according to Preparation Example 3 of the present inventive concept.

FIG. 38 is a schematic diagram of perovskite nanoparticles encapsulated by siloxane resin in a perovskite color converter according to Preparation Example 3 of the present inventive concept.

Referring to FIG. 38, the perovskite nanoparticles are encapsulated by a siloxane resin, in which a chemical bond between the perovskite nanoparticles and the siloxane resin is formed.

In addition, dispersion and encapsulation can be formed by using a polymer resin as a main chain in addition to the perovskite color converter according to Preparation Example 3 of the present inventive concept.

Preparation Example 4: Synthesis of Perovskite Nanoparticles Having a Size Equal to or Larger than Exciton Bohr's Diameter The metal halide perovskite $CH_3NH_3PbBr_3$ is prepared by mixing $CH_3NH_3Br$ and $PbBr_2$ in a ratio of 1:1 by 0.4 mmol each. Thereafter, a first solution is prepared by dissolving the metal halide perovskite $CH_3NH_3PbBr_3$ in dimethylformamide (DMF) that is a polar solvent. Then, a second solution is prepared by mixing 20 ul of hexylamine as an amine ligand surfactant and 50 ul of oleic acid as a carboxylic acid surfactant. Perovskite light-emitting particles are synthesized by slowly dropping the first solution dropwise onto the second solution being stirred with a magnetic bar. Thereafter, for purification, the solution containing the synthesized perovskite light-emitting particles is centrifuged at 7,000 rpm, 30 min conditions, and a precipitate is obtained and dissolved in a toluene solvent to prepare a mixed solution of perovskite light-emitting particles. At this time, the absorbance of the mixed solution measured with a UV-vis spectrophotometer is 0.5. The mixed solution is spin-coated on a glass substrate to form a perovskite thin film. At this time, the size distribution of the formed perovskite light-emitting particles is 10 to 30 nm.

Preparation Example 5: Synthesis of Perovskite Nanoparticles with Exciton Bohr's Diameter or More The metal halide perovskite $CH_3NH_3PbBr_3$ is prepared by mixing $CH_3NH_3Br$ and $PbBr_2$ in a ratio of 1:1 by 0.4 mmol each. Thereafter, a first solution is prepared by dissolving the metal halide perovskite $CH_3NH_3PbBr_3$ in a polar solvent dimethylformamide (DMF). Then, a second solution is prepared by mixing 20 ul of hexylamine as an amine ligand surfactant and 20 ul of oleic acid as a carboxylic acid surfactant. Perovskite light-emitting particles are synthesized by slowly dropping the first solution dropwise onto the second solution being stirred with a magnetic bar. Thereafter, the solution containing the synthesized perovskite light-emitting particles for purification is centrifuged at 7,000 rpm, 30 min conditions, and a precipitate is obtained and dissolved in a toluene solvent to prepare a mixed solution of perovskite luminescent particles. At this time, the absorbance of the mixed solution measured with a UV-vis spectrophotometer is 0.5. The mixed solution is spin-coated on a glass substrate to form a perovskite thin film. At this time, the size distribution of the formed perovskite light emitting particles is 30 to 100 nm.

Preparation Example 6: Synthesis of Perovskite Nanoparticles with Less than Exciton Bohr's Diameter The metal halide perovskite $CH_3NH_3PbBr_3$ is prepared by mixing $CH_3NH_3Br$ and $PbBr_2$ in a ratio of 1:1 by 0.4 mmol each. Thereafter, a first solution is prepared by dissolving the metal halide perovskite $CH_3NH_3PbBr_3$ in a polar solvent dimethylformamide (DMF). Then, a second solution is prepared by mixing 20 ul of hexylamine as an amine ligand surfactant and 300 ul of oleic acid as a carboxylic acid surfactant. Perovskite light-emitting particles are synthesized by slowly dropping the first solution dropwise onto the second solution being stirred with a magnetic bar. Thereafter, the solution containing the synthesized perovskite light-emitting particles for purification is centrifuged at 7,000 rpm, 30 min conditions, and a precipitate is obtained and dissolved in a toluene solvent to prepare a mixed solution of perovskite light-emitting particles. At this time, the absorbance of the mixed solution measured with a UV-vis spectrophotometer is 0.5. The mixed solution is spin-coated on a glass substrate to form a perovskite thin film. At this time, the size distribution of the formed perovskite light-emitting particles is 5 to 9.9 nm.

Preparation Example 7: Synthesis of Perovskite Nanoparticles with Less than Exciton Bohr's Diameter The metal halide perovskite $CH_3NH_3PbBr_3$ is prepared by mixing $CH_3NH_3Br$ and $PbBr_2$ in a ratio of 1:1 by 0.4 mmol each. Thereafter, a first solution is prepared by dissolving the metal halide perovskite $CH_3NH_3PbBr_3$ in a polar solvent dimethylformamide (DMF). Then, a second solution is prepared by mixing 20 ul of hexylamine as an amine ligand surfactant and 500 ul of oleic acid as a carboxylic acid surfactant. Perovskite light-emitting particles are synthesized by slowly dropping the first solution dropwise onto the second solution being stirred with a magnetic bar. Thereafter, the solution containing the synthesized perovskite light-emitting particles for purification is centrifuged at 7,000 rpm, 30 min conditions, and a precipitate is obtained and dissolved in a toluene solvent to prepare a mixed solution of perovskite light-emitting particles. At this time, the absorbance of the mixed solution measured with a UV-vis spectrophotometer is 0.5. The mixed solution is spin-coated on a glass substrate to form a perovskite thin film. At this time, the size distribution of the formed perovskite light-emitting particles is 1 to 4.9 nm.

Preparation Example 8: Formation of a Pattern

The second dispersion in which the perovskite nanoparticles according to Preparation Example 2 are dispersed in a siloxane resin is coated on glass or silicon wafer (Si wafer)

by spin coating. At this time, spin coating is performed at 5000 rpm for 60 seconds. Thereafter, using a photomask on which a desired pattern is formed, UV light of 365 nm is irradiated. Thereafter, the development process is carried out using a solvent in which MEK (Methyl ethyl ketone) and ethanol are mixed in a weight ratio of 1:1 as a developer. Thereafter, it is washed with purified water (Di water) to form a final pattern.

Preparation Example 9: Formation of Encapsulated Perovskite Color Converter

First mixture is formed by mixing the dispersion generated through mechanical or chemical transformation of the perovskite color converter according to Preparation Example 3 to polydimethylsiloxane (PDMS) in a weight ratio of 1:1. The first mixture and acetone are mixed at a weight ratio of 1:10 to form second mixture. The third mixture 3 is formed by mechanically stirring the formed second mixture at a temperature of 50° C. for 4 hours. All of the acetone used is evaporated while the third mixture is being formed. The formed third mixture is left at a temperature of 30° C. for 48 hours to obtain a cured product to form an additionally encapsulated perovskite color converter.

Preparation 10: Preparation of Color Converter in which Polymer Resin is Changed Instead of using PDMS as the polymer resin in Preparation Example 8, bisphenol A diglycidyl ether is used. Fourth mixture is formed by mixing the perovskite color converter and the polymer resin in a weight ratio of 1:1. Thereafter, the fourth mixture and acetone are mixed in a weight ratio of 1:10 to form fifth mixture. Thereafter, mechanical stirring is performed under the same conditions as in Preparation Example 8. After that, 1-metylimidazol is added 2% by weight of mixture 4 as a catalyst for curing. After that, it is placed at a temperature of 120° C. for 5 hours to obtain a cured product.

When the main chain of the polymer has a polar group, the main chain of the polymer may include polyester, ethyl cellulose, polyvinylpridine, or combinations thereof, but is not limited thereto. When the polymer has a polar group in the side chain, the polar group may include an oxygen component, preferably the polar group is —OH, —COOH, —COH, —CO—, —O—, or combinations thereof, but is not limited thereto.

In addition, the polymer preferably has a number average molecular weight of about 300 g/mol to 100,000 g/mol. If the number average molecular weight of the polymer is less than 300 g/mol outside of the above range, the space between nanoparticles within nanoparticle-polymer bead may not be sufficient, so that the luminous efficiency may decrease, and if it exceeds 100,000 g/mol, the bead size becomes excessively large, and defects may occur in the film forming process. The polymer may be a thermosetting resin or a wax-based compound.

Specifically, the thermosetting resin may be a silicone-based resin, an epoxy resin, a petroleum resin, a phenol resin, a urea resin, a melamine resin, an unsaturated polyester resin, an amino resin, a butyl rubber, an isobutylene rubber, an acrylic rubber, a urethane rubber, or combinations thereof, but is not limited thereto.

The silicone-based resin may be a liquid siloxane polymer. The siloxane polymer may be dimethyl silicone oil, methylphenyl silicone oil, diphenyl silicone oil, polysiloxane, a copolymer of diphenyl siloxane (diphenyl siloxane copolymer), methyl hydrogen silicone oil, methyl hydroxyl silicone oil, fluoro silicone oil, polyoxyether copolymer, amino-modified silicone oil, epoxy-modified silicone oil, carboxyl-modified silicone oil, carbonyl-modified silicone oil, methacryl-modified silicone oil, mercapto-modified silicone oil, polyether-modified silicone oil, methylstyryl silicone oil, alkyl-modified silicone oil or fluoro-modified silicone oil, but is not limited thereto.

The epoxy resin may be bisphenol A, bisphenol F, bisphenol AD, bisphenol S, hydrogenated bisphenol A, or combinations thereof, but is not limited thereto. A catalyst or a curing agent may be additionally used in the thermosetting resin according to a thermal curing mechanism. Also preferably, the catalyst may be a platinum catalyst, and the curing agent may be an organic peroxide or an amine having a liquid aromatic ring at room temperature.

Also preferably, the organic peroxide is 2,4-dichlorobenzoyl peroxide, benzoyl peroxide, dicumyl peroxide, di-tert-butylperbenzoate or 2,5-bis(tert-butylperoxy)benzoate, but is not limited thereto.

The amine having a liquid aromatic ring at the above or room temperature is diethyltoluenediamine, 1-methyl-3,5-diethyl-2,4-diaminobenzene, 1-methyl-3,5-diethyl-2,6-diaminobenzene, 1,3,5-triethyl-2,6-diaminobenzene, 3,3-diethyl-4,4-diaminodimethylphenylmethane, 3,3,5,5-tetramethyl-4,4-diaminodiphenylmethane or combinations thereof, but is not limited thereto.

The wax-based compound may be in a solid state at room temperature, but may have a melting point of 40° C. to 150° C., and may be a resin having a molecular weight of 100 to 100,000. In addition, it is preferably petroleum wax, animal natural wax, vegetable natural wax, or synthetic wax, but is not limited thereto.

The second dispersion medium serves to disperse the encapsulated metal halide perovskites, and may preferably be a material having low oxygen and moisture permeability. Also preferably, the second dispersion medium may be a photocurable polymer compound. For example, the second dispersion medium may be an acrylic resin. The photocurable polymeric compound may be a photopolymerizable monomer, a photopolymerizable oligomer, or a combination thereof. The photopolymerizable monomer and the photopolymerizable oligomer include at least one of a carbon-carbon double bond and a triple bond, and are not particularly limited as long as they are polymerizable by light.

In particular, when the second dispersion medium is an acrylic resin, the photopolymerizable monomer and the photopolymerizable oligomer may be an acrylic monomer and an acrylic oligomer, respectively.

The acrylic oligomer may be an epoxy acrylic resin. The epoxy acrylic resin may be a resin in which an epoxide group of the epoxy resin is substituted with an acrylic group. Epoxy acrylate resin may have low moisture permeability and air permeability due to main chain characteristics like epoxy resin.

Also preferably, the epoxy acrylate resin is bisphenol A glycerolate diacrylate, bisphenol A ethoxylate diacrylate, bisphenol A glycerolate dimethacrylate, bisphenol A ethoxylate dimethacrylate, or combinations thereof, but is not limited thereto. The acrylic monomer may be an acrylic monomer containing an unsaturated group, an acrylic monomer containing an amino group, an acrylic monomer containing an epoxy group, an acrylic monomer containing a carboxylic acid group, or combinations thereof, but is not limited thereto.

The unsaturated group-containing acrylic monomer is methyl acrylate, methyl methacrylate, ethyl acrylate, ethyl methacrylate, n-propylaciylate, n-propylmethacrylate, i-propylacrylate, i-propylmethacrylate, n-butylacrylate, n-butyl methacrylate, i-butylacrylate, i-butylmethacrylate, sec-butylacrylate, sec-butylmethacrylate, t-butylacrylate, t-butylmethacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxy methacrylate, 3-hydroxybutyl acrylate, 3-hydroxybutyl methacrylate, 4-hydroxybutyl acrylate, 4-hydroxybutyl methacrylate, allyl acrylate, allyl methacrylate, benzyl acrylate, benzyl methacrylate, cyclohexyl acrylate, cyclohexyl methacrylate, phenyl acrylate, phenyl methacrylate, 2-methoxyehtyl acrylate, 2-methoxyethyl methacrylate, 2-phenoxyethyl acrylate, 2-phenoxyethyl methacrylate, methoxydiethyneglycol acrylate, methoxydiethyleneglycol methacylate, methoxytriethyleneglycol acrylate, methoxytriethyleneglycol methacrylate, methoxy propyleneglycol acrylate, methoxypropyleneglycol methacrylate, methoxydipropyleneglycol acrylate, methoxydipropyleneglycol methacrylate, isobornyl acrylate, isoboronyl methacrylate, dicyclopenta acrylate, dicyclopentadiethyl methacrylate, 2-hydroxy-3-phenoxypropyl acrylate, 2-hydroxy-3-phenoxypropyl methacrylate, glycerol monoacrylate, glycerol monomethacrylate, or a combination thereof, but is not limited thereto.

The amino group-containing acrylic monomer may be 2-aminoethyl acrylate, 2-aminoethyl methacrylate, 2-dimethylaminoethyl acrylate, 2-dimethylaminoethyl methacrylate, 2-aminopropyl acrylate, 2-aminopropyl methacrylate, 2-dimethylaminopropyl acrylate, 2-dimethylaminopropyl methacrylate, 3-aminopropyl acrylate, 3-aminopropyl methacrylate, 3-dimethylaminopropyl acrylate, 3-dimethylaminopropyl methacrylate, or a combination thereof, but is not limited thereto.

The epoxy group-containing acrylic monomer is glycidyl acrylate, glycidyl methacrylate, glycidyloxyethyl acrylate, glycidyloxyethyl methacrylate, glycidyloxypropyl acrylate, glycidyloxypropyl methacrylate, glycidyloxybutyl acrylate, glycidyloxybutyl methacrylate or combinations thereof, but is not limited thereto.

The carboxylic acid group-containing acrylic monomer is acrylic acid, methacrylic acid, acrylo oxyacetic acid, methacrylo oxyacetic acid, acrylo oxypropionic acid, methacrylo oxypropionic acid, acrylo oxybutyric acid, methacrylo oxybutric acid, or combinations thereof, but is not limited thereto no.

In addition, the photopolymerizable monomer may be a photoresist material. The photoresist material may be a silicone or epoxy material.

The photoresist material may be a commercial photoresist. The commercial photoresist materials are AZ 5214E PR, AZ 9260 PR, AZAD Promoter-K (HMDS), AZ nLOF 2000 Series, AZ LOR-28 PR, AZ 10xT PR, AZ 5206-E, AZ GXR-601 and AZ 04629 from AZ Electronics Materials; SU-8, 950 PMMA and 495 PMMA from MICROCHEM; S1800 from Micropossit; DNR-L300, DSAM, DPR, DNR-H200 and DPR-G from Dongjin Semichem; or CTPR-502 from Kotem, but is not limited thereto.

Also preferably, the second dispersion medium may further include a photoinitiator.

The type of the photoinitiator is not particularly limited and may be appropriately selected.

Preferably, the photoinitiator is a triazine-based compound, an acetophenone-based compound, a benzophenone-based compound, a thioxanthone-based compound, a benzoin-based compound, an oxime compounds, carbazole compounds, diketone compounds, sulfonium borate compounds, diazo compounds, nonimidazolium compounds, or combination thereof, but is not limited thereto.

Example of the triazine-based compound includes 2,4,6-trichloro-s-triazine, 2-phenyl-4,6-bis(trichloromethyl)-s-triazine, 2-(3',4'-dimethoxy styryl)-4,6-bis(trichloro methyl)-s-triazine, 2-(4'-methoxynaphtyl)-4,6-bis(trichloromethyl)-s-triazine, 2-(p-methoxyphenyl)-4,6-bis(trichloro methyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4, 6-bis(trichloromethyl)-s-triazine, 2,4-trichloro methyl (piperonyl)-6-triazine, or 2,4-(trichloro methyl (4'-methoxy styryl)-6-triazine, but is not limited thereto.

Example of the acetophenone-based compound may be 2,2-diethoxy acetophenone, 2,2'-dibutoxy acetophenone, 2-hydroxy-2-methyl propiophenone, pt-butyl trichloro acetophenone, pt-butyl dichloro acetophenone, 4-chloro acetophenone, 2,2'-dichloro-4-phenoxy acetophenone, 2-methyl-1-(4-(methylthio)phenyl)-2-mopholino propan-1-one, 2-benzyl-2-dimethyl amino-1-(4-morpholino phenyl)-butan-1-one, or the like.

Example of the benzophenone-based compound includes benzophenone, benzoylbenzoate, methyl benzoylbenzoate, 4-phenyl benzophenone, hydroxybeonzophenone, acrylated benzophenoneacrylate, 4,4'-bis(dimethylamino) benzophenone, 4,4'-dichlorobenzophenone, 3,3'-dimethyl-2-methoxybenzophenone or the like, but are not limited thereto.

Example of the thioxanthone-based compound includes thioxantone, 2-methyl thioxantone, isopropyl thioxantone, and 2,4-diethyl thioxanthone, 2,4-diisopropyl thioxantone, 2-chlorothioxantone, or the like, but are not limited thereto.

Examples of the benzoin-based compound include benzoin, benzoin methyl ether, benzoine ethyl ether, benzoine isopropyl ether, benzoin isobutyl ether, benzyl dimethyl ketal, or the like, but are not limited thereto.

Example of the oxime-based compound includes 2-(o-benzoyloxime)-1-[4-(phenylthio)phenyl]-1,2-octanedione, or 1-(o-acetyloxime)-1-[9-ethyl-6-(2-methylbenzoyl)-9H-carbazol-3-yl]ethenone, but is not limited thereto.

Meanwhile, the second dispersion medium may further include a crosslinking agent for crosslinking.

Preferably, the crosslinking agent is ethylene glycol di(metha)acrylate, polyethylene glycol di(metha)acrylate, trimethylolpropane di(metha)acrylate, trimethylolpropane tri(metha)acrylate, pentaerythritol tri(metha)acrylate, pentaerythritol tetra(metha)acrylate, 2-trisacrylo oxymethylethylpthalic acid, propylene glycol di(metha)acrylate, polypropylene glycol di(metha)acrylate, dipentaerythritol penta (metha)acrylate, dipentaerythritol hexa(metha)acrylate, or combinations thereof, but is not limited thereto.

In addition, when the metal halide perovskite-polymer composite is manufactured in the form of a film attached to a specific substrate, the second dispersion medium may further include a polymer binder. The polymer binder may serve to improve adhesion between the substrate and the metal halide perovskite-polymer composite.

The substrate serves as a support for the light-emitting device and may be a transparent material.

In addition, the substrate may be a flexible material or a hard material, preferably a flexible material.

The material of the substrate is glass, sapphire, quartz, silicon, polyethylene terephthalate (PET), polystyrene (PS), polyimide (PI), polyvinyl chloride (PVC), polyvinylpyrrolidone (PVP) or polyethylene (PE), but is not limited thereto.

The polymer binder may be an acrylic polymer binder, a cardo polymer binder, or a polymer of a combination thereof, but is not limited thereto.

The acrylic polymer binder may be a copolymer of a first unsaturated monomer containing a carboxyl group and a second unsaturated monomer copolymerizable therewith. The first unsaturated monomer may be a carboxylic acid vinyl ester compound such as acrylic acid, maleic acid, methacrylic acid, vinyl acetate, itaconic acid, 3-butenoic acid, fumaric acid, vinyl benzoate, or a combination thereof, but is not limited thereto.

The second unsaturated monomer may be an alkenyl aromatic compound, an unsaturated carboxylic acid ester compound, an unsaturated carboxylic acid amino alkyl ester compound, an unsaturated carboxylic acid glycidyl ester compound, a vinyl cyanide compound, a hydroxyalkyl acrylate, or a combination thereof, but is not limited thereto.

Also preferably, the second unsaturated monomer may be unsaturated amide compound such as styrene, α-methylstyrene, vinyltoluene, vinylbenzylmethylether, methylacrylate, ethylacrylate, butylacrylate, benzylacrylate, cyclohexylacrylate, phenylacrylate, 2-aminoethyl acrylate, 2-dimethylaminoethyl acrylate, N-phenylmaleimide, N-benzylmaleimide, N-alkylmaleimide, 2-dimethylaminoethyl methacrylate, acrylonitrile, glycidyl acrylic, or acrylamide. Furthermore, the second unsaturated monomer may be 2-hydroxy ethyl acrylate, 2-hydroxybutyl acrylate, or a combination thereof, but is not limited thereto.

The acrylic polymer binder is methacrylic acid/benzyl methacrylate copolymer, methacrylic acid/benzyl methacrylate/styrene copolymer, methacrylic acid/benzyl methacrylate/2-hydroxyethyl methacrylate copolymer, methacrylic acid/benzyl methacrylate/styrene/2-hydroxyethyl methacrylate copolymer or a combination thereof, but is not limited thereto.

The metal halide perovskite-polymer composite film may further include a light diffusing agent. The light diffusing agent may be a metal oxide particle, a metal particle, or a combination thereof, but is not limited thereto. The light diffusing agent may serve to increase the refractive index of the composition to increase the probability that light incident inside the composition meets the metal halide perovskite.

The light diffusing agent may include inorganic oxide particles such as alumina, silica, zirconia, titania or zinc oxide, or metal particles such as gold, silver, copper or platinum, but is not limited thereto. Furthermore, a dispersing agent may be added to increase the dispersibility of the light diffusing agent.

Hereinafter, a method for manufacturing a metal halide perovskite wavelength converter having a structure in which encapsulated particles of metal halide perovskite are dispersed in the matrix resin will be described. The curing of the first dispersion medium and the second dispersion medium may be characterized in that it is sequentially performed.

The method for manufacturing a metal halide perovskite wavelength converter having a structure in which encapsulated particles are dispersed according to an embodiment of the present inventive concept is characterized by using a curable emulsion composition.

As described above, the emulsion refers to a solution in which fine liquid droplets are uniformly dispersed in other types of immiscible droplets. In the present specification, fine droplets discontinuously present in the curable emulsion composition are defined as an 'inner phase', and a composition continuously present in the emulsion composition in addition to the inner phase is defined as an 'outer phase'. First, a solution capable of forming an inner phase is prepared.

Figure 39:
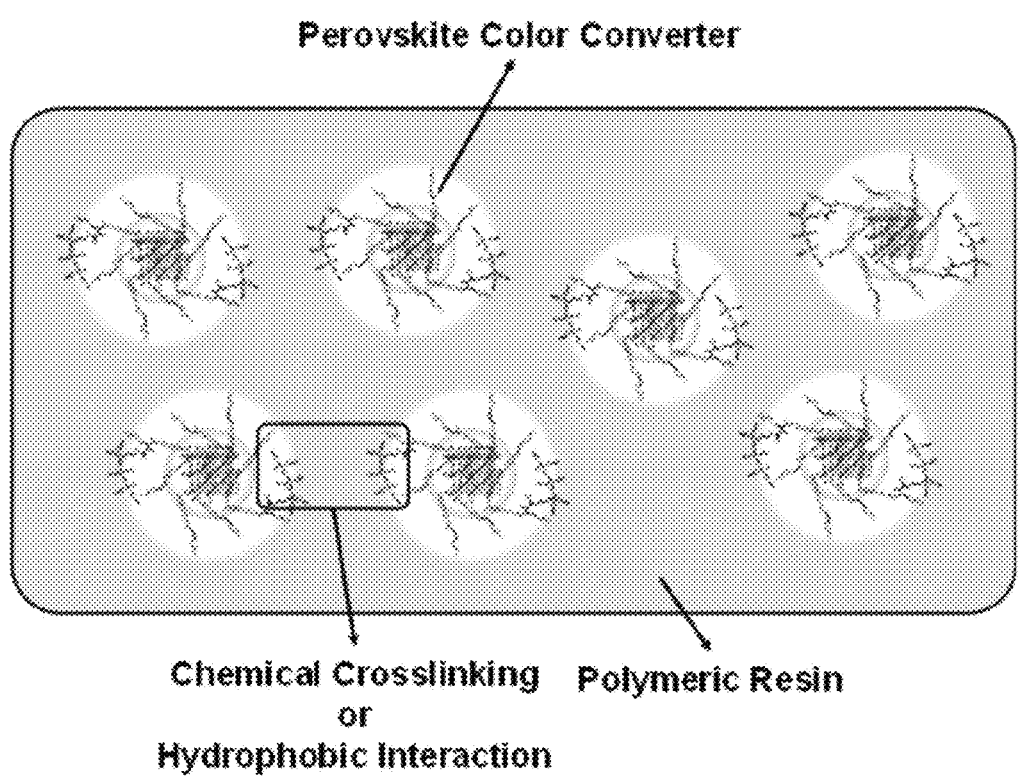
FIG. 39 is a schematic diagram for dispersion and encapsulation using a polymer resin as a main chain in addition to the perovskite color converter according to Preparation Example 8 of the present inventive concept.

FIG. 39 is a schematic diagram for dispersion and encapsulation using a polymer resin as a main chain in addition to the perovskite color converter according to Preparation Example 8 of the present inventive concept.

Referring to FIG. 39, dispersion and encapsulation using an additional polymer resin in the perovskite color converter are performed. In this case, dispersion or encapsulation may be performed according to chemical crosslinking or hydrophobic interaction between the polymer resin and the encapsulated siloxane resin.

Figure 40:
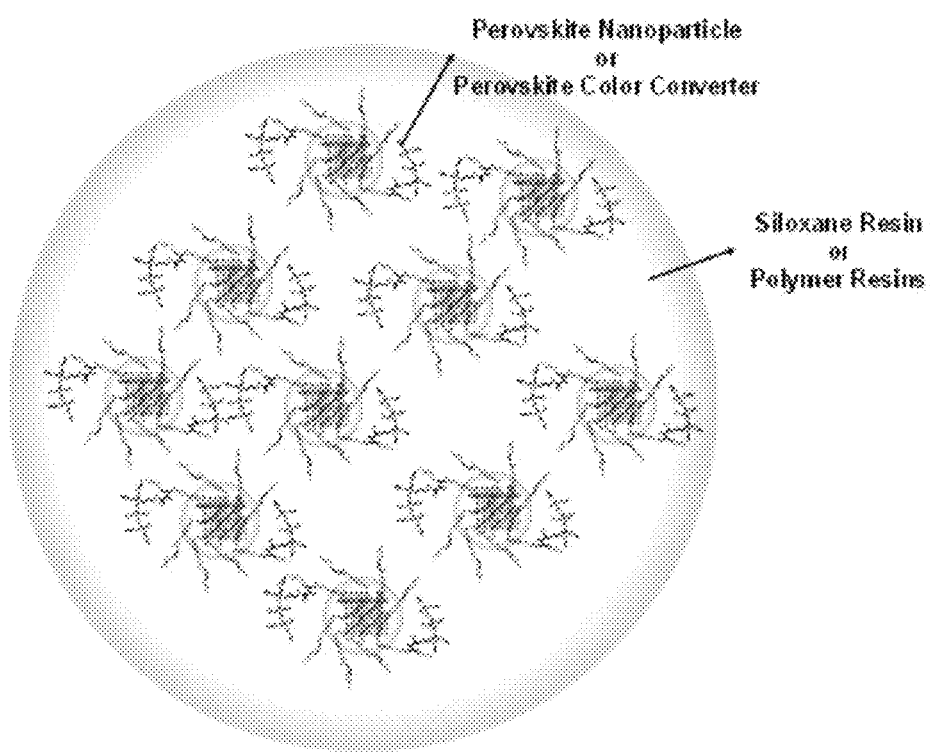
FIG. 40 is a schematic diagram of the perovskite nanoparticles according to Preparation Example 1 and the perovskite color converter according to Preparation Example 3 of the present inventive concept.

FIG. 40 is a schematic diagram of the perovskite nanoparticles according to Preparation Example 1 and the perovskite color converter according to Preparation Example 3 of the present inventive concept.

According to FIG. 40, the perovskite nanoparticles and the perovskite color converter may be additionally encapsulated in a polymer resin or siloxane resin. At this time, the number of perovskite nanoparticles is variable. In addition, when the perovskite color converter is used, a meaningful bond between the perovskite color converter and the polymer resin or siloxane resin may or may not be formed, but is not limited thereto.

The inner phase is for preparing particles in which the metal halide perovskite encapsulated by the first dispersion medium is encapsulated, and may include metal halide perovskite and a polymer.

The metal halide perovskite may be a material having a three-dimensional crystal structure, a two-dimensional crystal structure, a one-dimensional crystal structure or a zero-dimensional crystal structure.

Figure 4:
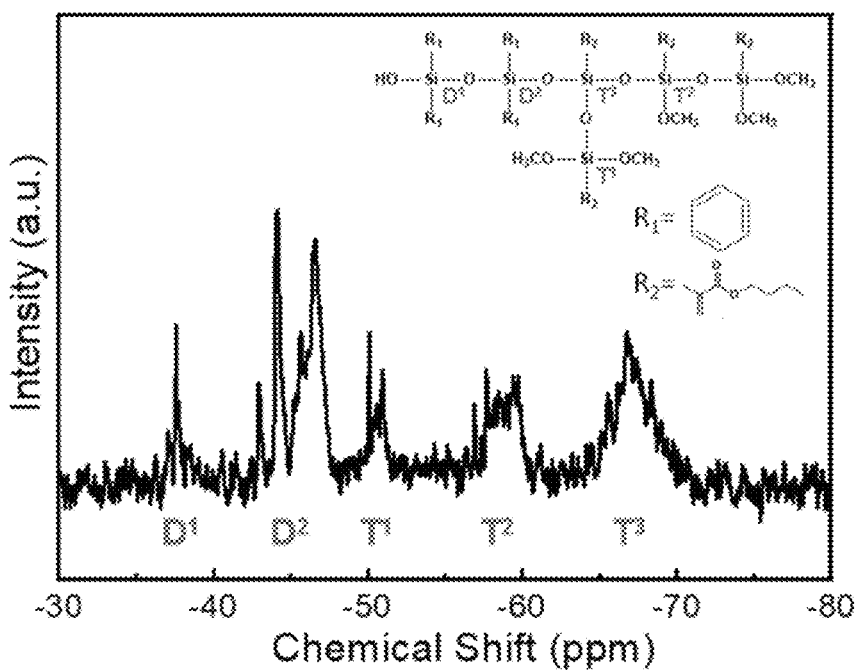
FIG. 4 is a silicon nuclear magnetic resonance analysis (29Si-NMR) data of the siloxane resin in the second dispersion according to Preparation Example 2 of the present inventive concept.

FIG. 4 is a silicon nuclear magnetic resonance analysis (29Si-NMR) data of the siloxane resin in the second dispersion according to Preparation Example 2 of the present inventive concept.

Referring to FIG. 4, in the siloxane resin in the second dispersion, MPTS and DPSD form a Si—O bond through a non-aqueous sol-gel reaction. However, it is necessary to confirm the DPSD that did not participate in the non-aqueous sol-gel reaction during the manufacturing process.

In the graph, D1 and D2 represent Si—O bonds of DPSD, and T1, T2 and T3 represent Si—O bonds of MPTS. If the peak of DO appears, this confirms the presence of DPSD that did not participate in the non-aqueous sol-gel reaction. In addition, when the TO peak appears, it confirms the binding of MPTS that did not participate in the non-aqueous sol-gel reaction.

In FIG. 4, only the siloxane bonds of D1, D2, T1, T2, and T3 are confirmed. That is, it is confirmed that most MPTS and DPSD mixed in a molar ratio of 1:1 participated in the non-aqueous sol-gel reaction.

In FIG. 4, the distribution of D1, D2, T1, T2, and T3 bonds, in which the perovskite nanoparticles are also included in the second dispersion, is confirmed as the peak area of the corresponding region. It is confirmed that the degree of condensation of siloxane bonds is 87% or more by area calculation. The degree of formation of siloxane bonds is preferably 70% or more, and up to 100%. If the degree of formation of siloxane bonds is less than 70%, the stability and dispersibility of the perovskite color converter are deteriorated due to the presence of unreacted MPTS or unreacted DSPD.

Figure 5:
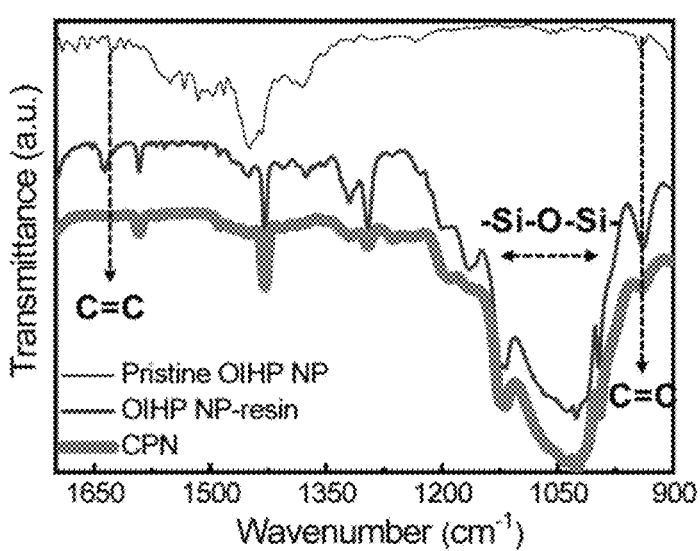
FIG. 5 is a graph showing Fourier transform infrared spectroscopy (FT-IR) of perovskite nanoparticles, a second dispersion, and a perovskite color converter according to preparation examples of the present inventive concept.

FIG. 5 is a graph showing Fourier transform infrared spectroscopy (FT-IR) of perovskite nanoparticles, a second dispersion, and a perovskite color converter according to preparation examples of the present inventive concept.

Referring to FIG. 5, the perovskite nanoparticles are prepared according to Preparation Example 1, the second dispersion is prepared according to Preparation Example 2, and the perovskite color converter is prepared according to Preparation Example 3.

The double bond C═C between carbons exhibits a light absorption peak at a wavenumber of less than about 1650 cm$^{-1}$ and a light absorption peak at a wavenumber of 920 to 950 cm$^{-1}$. In the perovskite nanoparticles, both of the above two types of peaks are confirmed. This is due to the double bond of the carbon in the organic ligand incorporated into the nanoparticles.

In addition, a double bond of carbon is also confirmed in the second dispersion, which is due to the double bond in the organic ligand of the perovskite nanoparticles and double bond of the methacrylate group in the silane precursor MPTS. This can be clearly confirmed by reaction formula 1.

However, in the perovskite color converter, the peak related to carbon double bonds does not appear or appears insignificantly due to cross-linking by UV irradiation. That is, it can be confirmed that a significant amount of double bonds disappears due to cross-linking and is converted to carbon single bonds.

In addition, the siloxane bond can be identified as a bandwidth of the wavenumber centered on the wavenumber of about 1000 to 1100 cm$^{-1}$. When the bandwidth of the wavenumber is broadened, it is interpreted that a large number of siloxane bonds are generated, and when the bandwidth is narrow, it is interpreted that there are relatively few siloxane bonds. It is confirmed that the siloxane bond does not appear in the perovskite nanoparticles of Preparation Example 1, and the siloxane bond is formed in the second dispersion and the perovskite color converter. It is due to the formation of a siloxane resin through the sol-gel reaction of MPTS and DPSD, and it is confirmed that the siloxane bond does not break down due to UV light irradiation.

Figure 6:
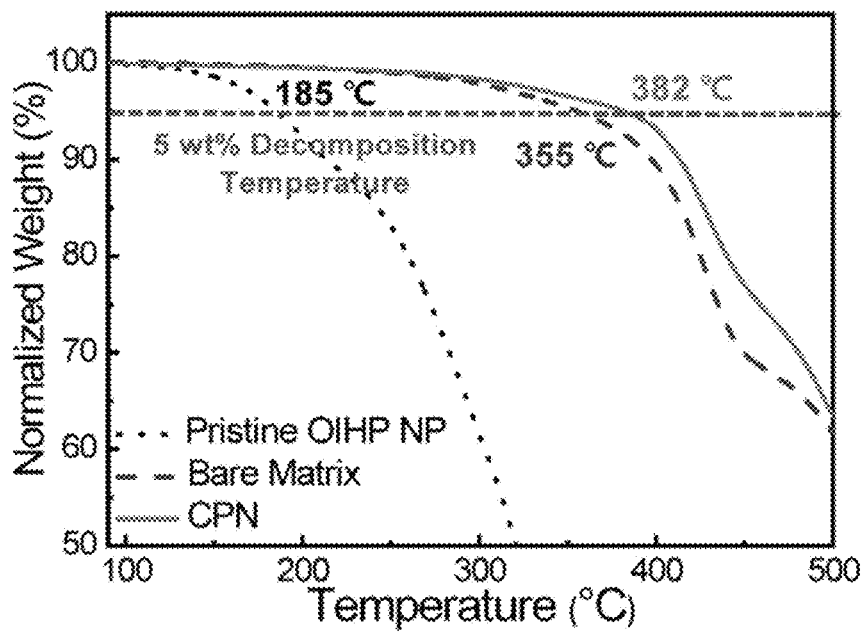
FIG. 6 is a thermogravimetric analysis graph of the perovskite nanoparticles, the second dispersion, and the perovskite color converter according to the preparation examples of the present inventive concept.

FIG. 6 is a thermogravimetric analysis graph of the perovskite nanoparticles, the second dispersion, and the perovskite color converter according to the preparation examples of the present inventive concept.

Referring to FIG. 6, the thermal decomposition temperature of the perovskite color converter of Preparation Example 3 of the present inventive concept is significantly increased compared to the perovskite nanoparticles of Preparation Example 1 and the second dispersion of Preparation Example 2.

In the case of Preparation Example 2, the non-aqueous sol-gel reaction of MPTS and DPDS showed that the thermal decomposition temperature is increased compared to Preparation Example 1. However, in Preparation Example 3, since the crosslinking reaction is performed, a further increased thermal decomposition temperature appears. Through this, it is confirmed that the cross-linked siloxane resin of the perovskite color converter has excellent thermal properties.

Figure 7:
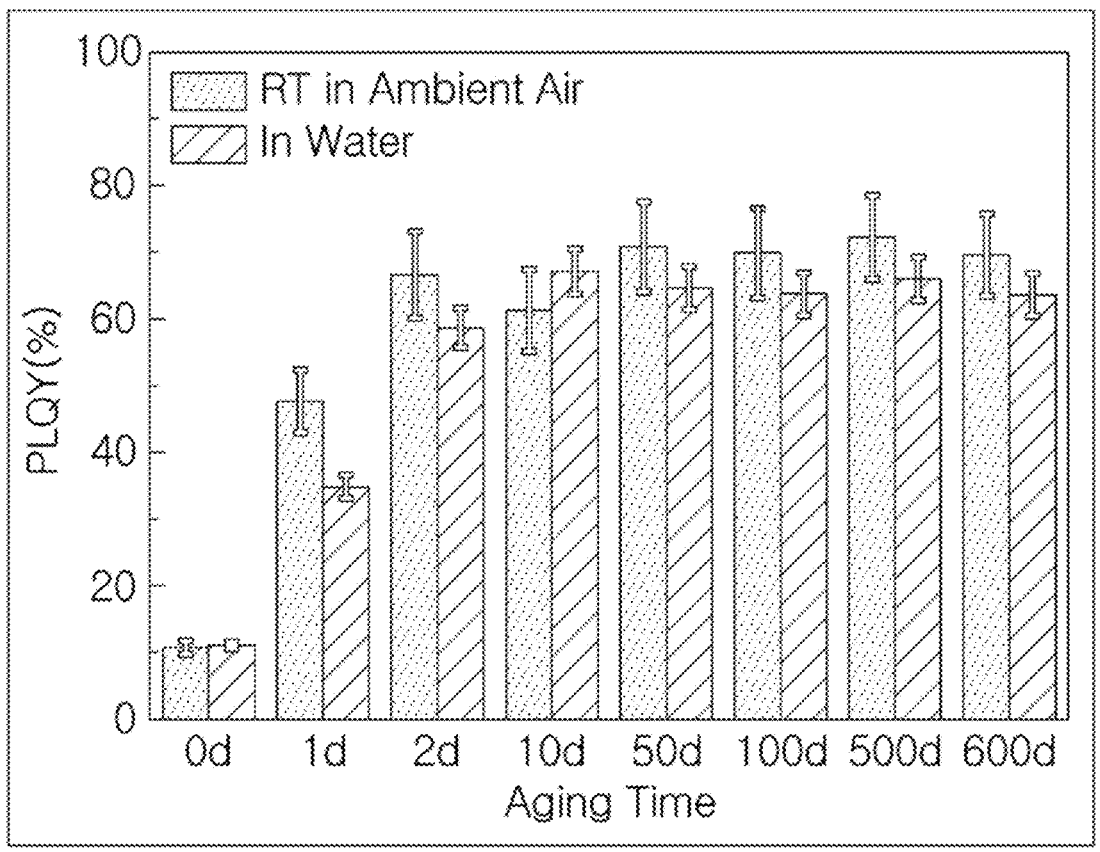
FIG. 7 is a graph measuring the reliability characteristics of the perovskite color converter according to Preparation Example 3 of the present inventive concept.

FIG. 7 is a graph measuring the reliability characteristics of the perovskite color converter according to Preparation Example 3 of the present inventive concept.

Referring to FIG. 7, the X-axis of the graph indicates time and up to 600 days. The Y-axis of the graph represents photoluminescence quantum yield (PLQY). That is, FIG. 7 shows the quantum efficiency of the perovskite color converter for 600 days. The dotted line graph is a value measured at room temperature in the atmosphere, and the solid line graph is a value measured by quantum efficiency by penetrating water.

Looking at the values measured in the air, it appears that there is little change in the luminous efficiency after 600 days. It is confirmed that the perovskite color converter of the present inventive concept maintains stable light-emission characteristics at room temperature and atmospheric conditions.

In addition, a phenomenon occurs in which the initial luminous efficiency of the perovskite color converter of the present inventive concept is increased in a moisture environment. It means that it is chemically stabilized. This means that even if moisture penetrates into the perovskite color converter, the light-emitting structure of the perovskite is chemically stabilized by moisture. This is due to the chemical bonding of the siloxane resin and the perovskite nanoparticles with the organic ligand.

If there is no chemical bond between the siloxane resin and the perovskite nanoparticles, the atoms constituting the perovskite crystal structure are separated due to moisture penetrating into the film, causing the crystal structure to be destroyed and the luminescent properties disappear. Even in a moisture environment, it is possible to maintain the luminous efficiency for more than 600 days in the present inventive concept due to the chemical stabilization of the perovskite nanoparticles.

Figure 8:
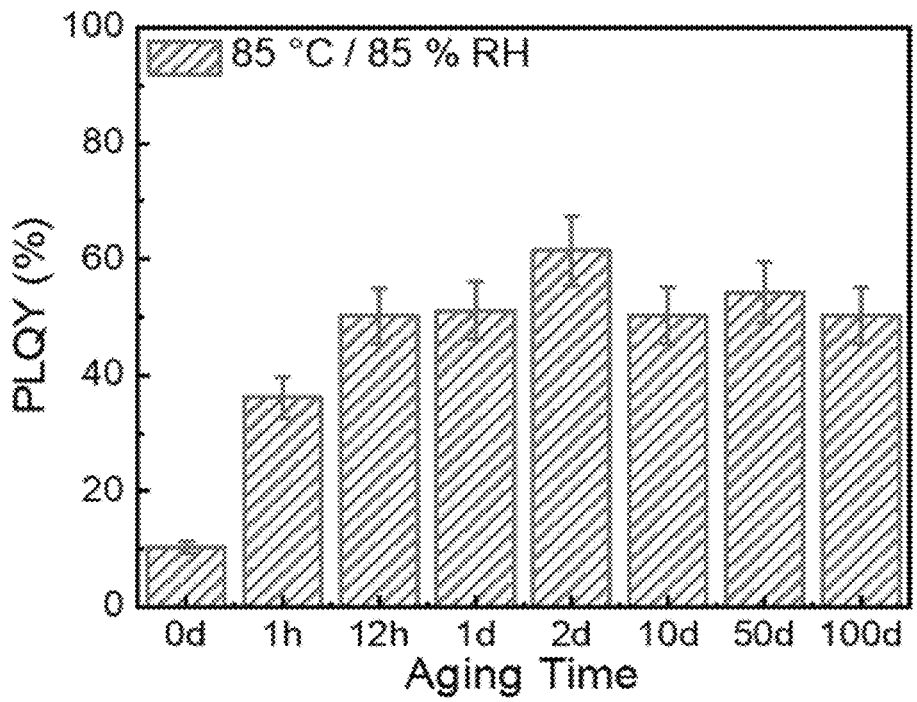
FIG. 8 is a graph showing 85-85 test (i.e. 85° C.-85% RH) results of the perovskite color converter according to Preparation Example 3 of the present inventive concept.

FIG. 8 is a graph showing 85-85 test results of the perovskite color converter according to Preparation Example 3 of the present inventive concept.

Referring to FIG. 8, the 85-85 test is to measure quantum efficiency at 85° C. and 85% relative humidity (RH), and the test is an essential procedure for confirming the reliability of a display product. That is, it is rare that it is carried out in normal R&D, but when a product is developed on the premise of commercialization or commercialization, it is a test process that is necessarily carried out.

In a test for 100 days, it is confirmed that the perovskite color converter of the present inventive concept hardly shows a change in properties in a high temperature and humidity environment, and maintains a constant quantum efficiency.

Figure 9:
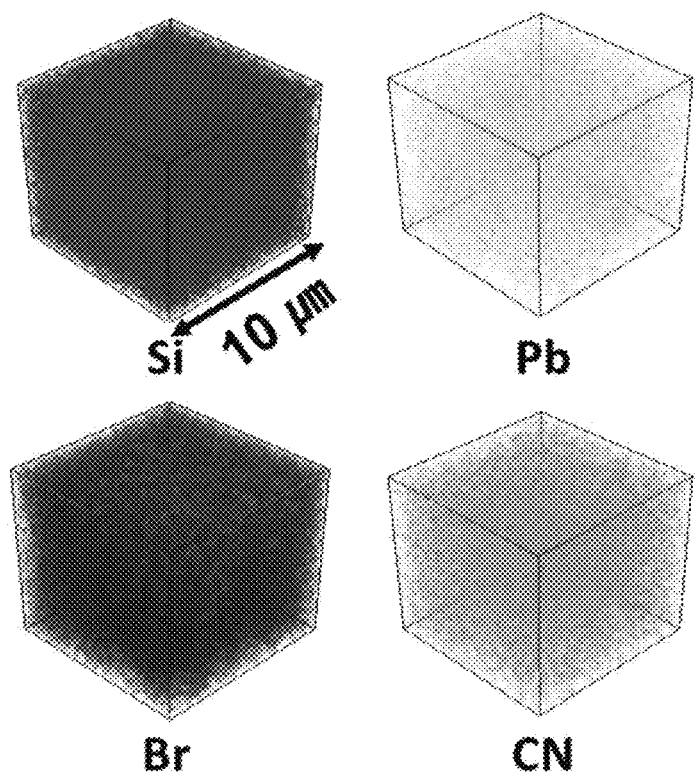
FIG. 9 is an image measured by a time-of-flight secondary ion mass spectrometer (TOF-SIMS) of the perovskite color converter according to Preparation Example 3 of the present inventive concept.

FIG. 9 is an image measured by a time-of-flight secondary ion mass spectrometer (TOF-SIMS) of the perovskite color converter according to Preparation Example 3 of the present inventive concept.

Referring to FIG. 9, a result shows the dispersibility of perovskite nanoparticles in the siloxane resin.

According to FIG. 9, it is confirmed that the elements of lead (Pb), bromine (Br), and cyanide (CN, detected from methylammonium) appearing in perovskite nanoparticles are uniformly distributed compared to silicon (Si), which is an element appearing in the siloxane resin.

Figure 10:
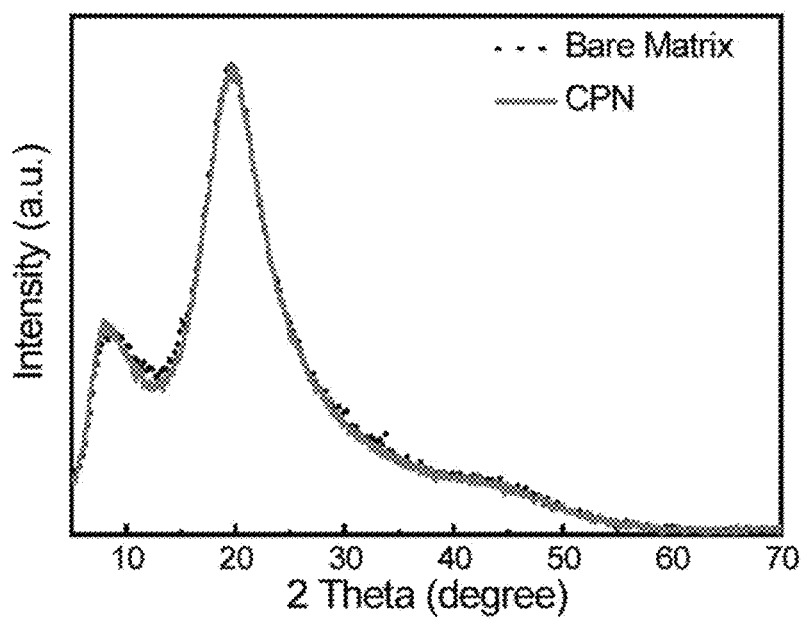
FIG. 10 is a graph showing the results of X-ray diffraction analysis (XRD) of the perovskite color converter and the siloxane in which perovskite nanoparticles do not exist according to Preparation Example 3 of the present inventive concept.

FIG. 10 is a graph showing the results of X-ray diffraction analysis (XRD) of the perovskite color converter and the siloxane in which perovskite nanoparticles do not exist according to Preparation Example 3 of the present inventive concept.

In FIG. 10, there is a result showing the crystal structure of the siloxane material.

According to FIG. 10, the crystal structure of the perovskite color converter and the siloxane material according to Preparation Example 3 of the present inventive concept shows an amorphous structure, and it is confirmed that a trapezoidal siloxane network is formed. Accordingly, it is confirmed that the perovskite nanoparticles do not significantly affect the siloxane network formation, and it is confirmed that the perovskite nanoparticles are dispersed in the amorphous siloxane network.

Figure 11:
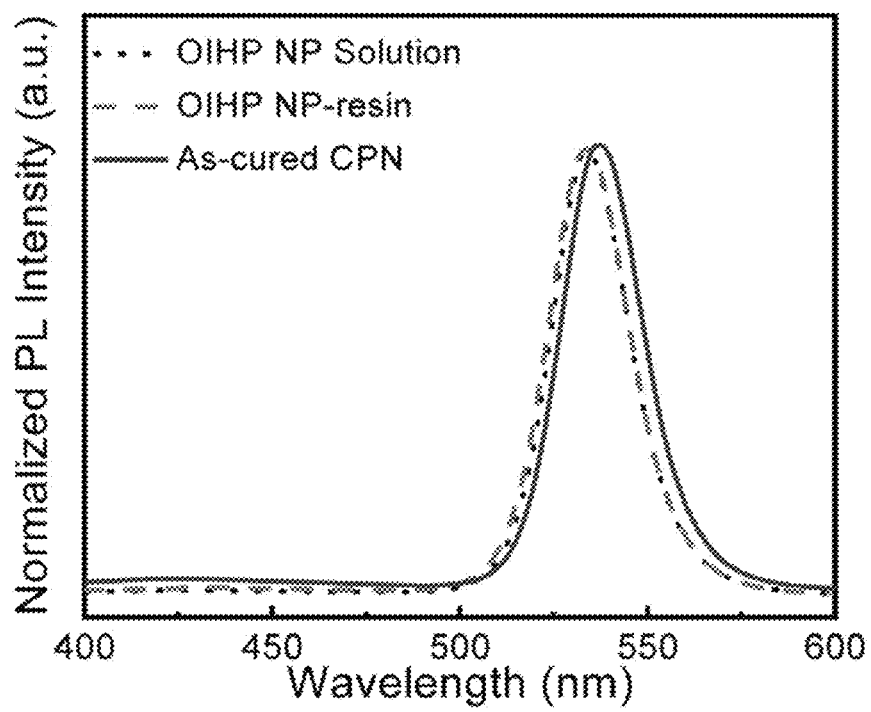
FIG. 11 is a graph showing photoluminescence (PL) spectra of the perovskite nanoparticle solutions, the second dispersion siloxane resin, and the perovskite color converter according to Preparation Examples 1, 2, and 3 of the present inventive concept.

FIG. 11 is a graph showing photoluminescence (PL) spectra of the perovskite nanoparticle solutions, the second dispersion siloxane resin, and the perovskite color converter according to Preparation Examples 1, 2, and 3 of the present inventive concept.

In FIG. 11, result shows the change in luminescent properties after the sol-gel process and UV curing process of perovskite nanoparticles.

According to FIG. 11, it is confirmed that the photoluminescence (PL) characteristics of the perovskite nanoparticles are maintained even after the sol-gel process and the UV curing process. This indicates that the perovskite color converter manufacturing process does not affect the luminescent properties of perovskite nanoparticles.

FIG. 12 is a graph comparing thermogravimetric analysis (TGA) of a perovskite color converter in which organic ligands do not have a carbon double bond.

In FIG. 12, result shows the chemical crosslinking of the perovskite nanoparticles and the siloxane resin in the perovskite color converter according to Preparation Example 3 of the present inventive concept.

FIG. 12a is a graph of thermogravimetric analysis (TGA) results of perovskite color converter using oleic acid and an amine ligand that does not have a carbon double bond.

FIG. 12b is a graph showing the results of thermogravimetric analysis (TGA) of perovskite color converter using oleyamine and a carboxylic acid ligand that does not have a carbon double bond.

FIG. 12c is a graph of thermogravimetric analysis (TGA) results of perovskite color converter using carboxylic acids and amine ligands that do not have carbon double bonds.

According to FIG. 12, the 5% decomposition temperature is increased in the perovskite color converter using oleic acid and oleyamine having a carbon double bond as organic ligands. It is confirmed that all perovskite color converter using organic ligands that do not have carbon double bonds showed reduction in 5% decomposition temperature compared to conventional siloxane materials. Through this, it is confirmed that only in the case of perovskite nanoparticles using oleylamine and oleic acid, crosslinking with the siloxane resin is formed and the effect of increasing the decomposition temperature is shown.

Figure 13:
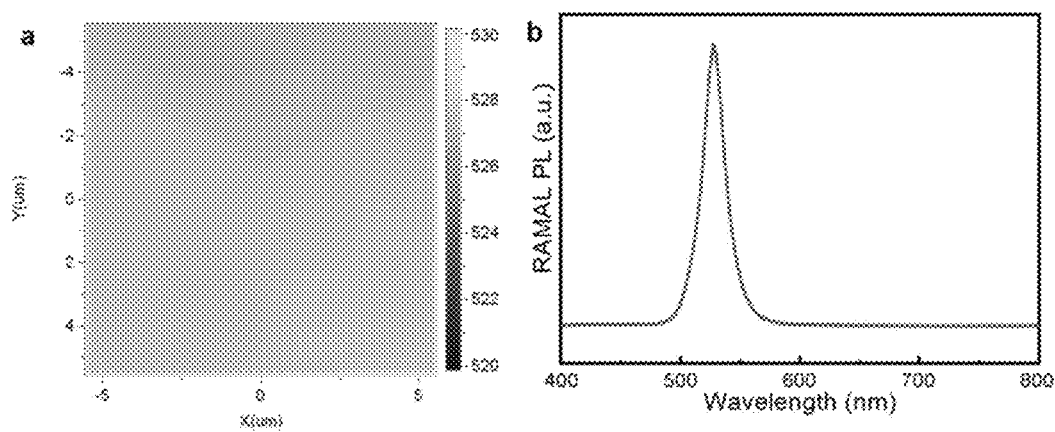
FIG. 13 is a graph showing the results of Dispersive-RAMAN PL of the perovskite color converter according to Preparation Example 3 of the present inventive concept.

FIG. 13 is a graph showing the results of Dispersive-RAMAN PL of the perovskite color converter according to Preparation Example 3 of the present inventive concept.

In FIG. 13, a result shows the light-emission uniformity in the perovskite color converter according to Preparation Example 3 of the present inventive concept.

FIG. 13a is an image showing the light-emission uniformity in the area of 10 um×10 um of the perovskite color converter according to Preparation Example 3 of the present inventive concept.

FIG. 13b is a graph showing the characteristic change of the perovskite color converter according to Preparation Example 3 of the present inventive concept in a 10 um×10 um area of the Dispersive-RAMAN PL.

According to FIG. 13, it is confirmed that a very uniform light-emission characteristic is exhibited with a constant light-emission characteristic in an area of 10 μm×10 μm. Through this, it is confirmed that the perovskite nanoparticles are very uniformly distributed in the siloxane resin without changing the photoluminescence properties.

Figure 14:
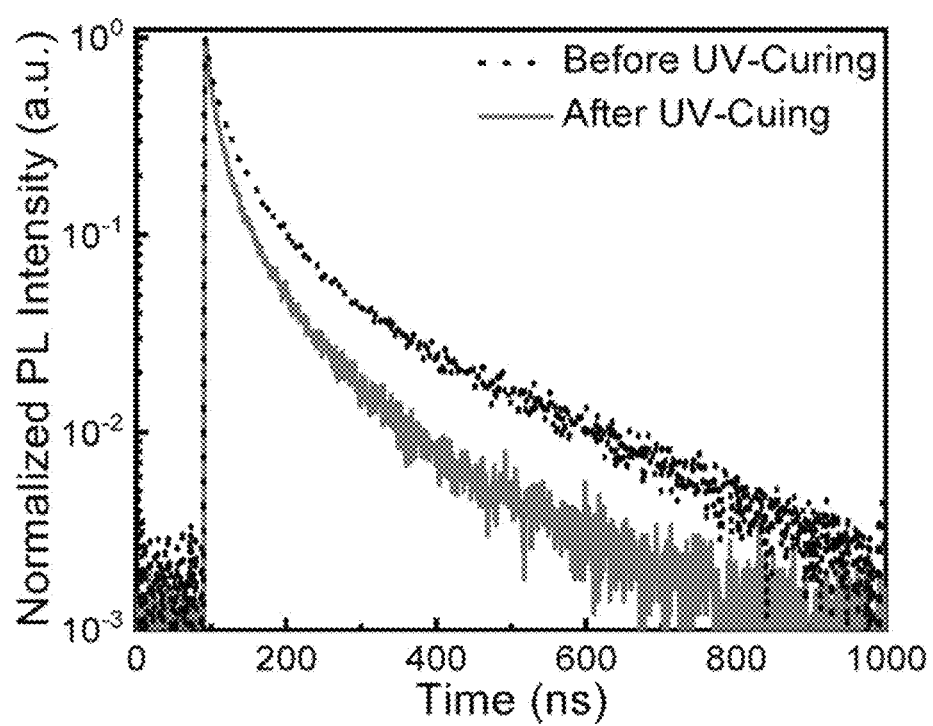
FIG. 14 is a graph showing the result of time-correlated single-photon counting (TCSPC) analysis before and after UV curing of the perovskite color converter according to Preparation Example 3 of the present inventive concept.

FIG. 14 is a graph showing the result of time-correlated single-photon counting (TCSPC) analysis before and after UV curing of the perovskite color converter according to Preparation Example 3 of the present inventive concept.

In FIG. 14, the change in the luminescence lifetime of perovskite nanoparticles by UV irradiation is shown.

According to FIG. 14, it is confirmed that the emission lifetime of the perovskite nanoparticles decreases after UV irradiation. This means that defects that inhibit luminescence properties are formed inside the perovskite nanoparticles by UV irradiation.

Figure 15:
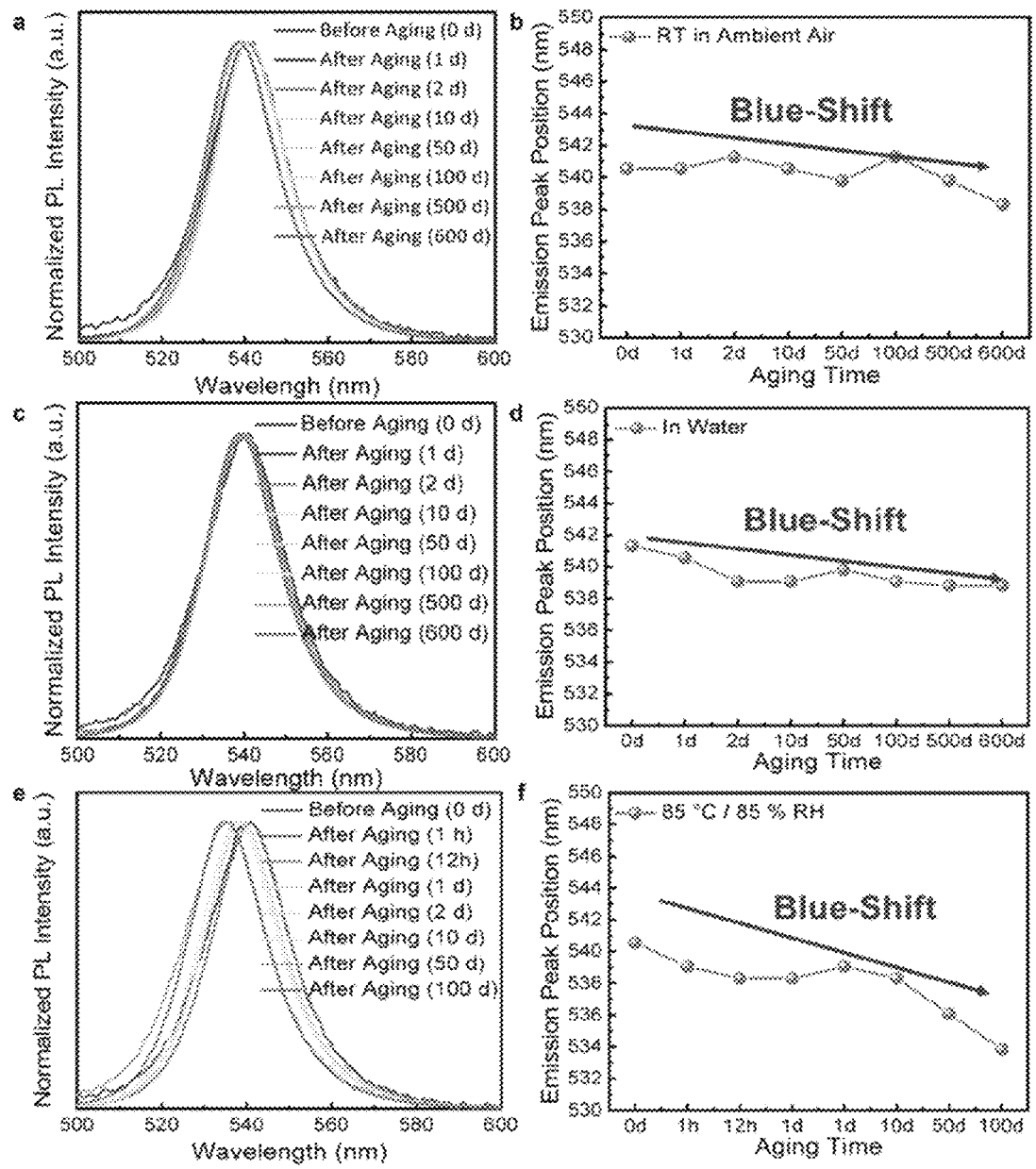
FIG. 15 is a graph showing the luminescence characteristics of the perovskite color converter according to Preparation Example 3 of the present inventive concept before and after reliability measurement in an atmospheric environment, in water, and in an 85-85 environment.

FIG. 15 is a graph showing the luminescence characteristics of the perovskite color converter according to Preparation Example 3 of the present inventive concept before and after reliability measurement in an atmospheric environment, in water, and in an 85-85 environment.

In FIG. 15, the change in photoluminescence characteristics before and after reliability measurement of perovskite nanoparticles in siloxane resin is shown.

FIG. 15a, c, and e are graphs of changes in PL of perovskite color converter in an atmospheric environment, in water, and in an 85-85 environment, respectively.

FIG. 15b, d, and f are graphs of changes in the emission wavelength of the perovskite color converter in an atmospheric environment, in water, and in an 85-85 environment, respectively.

According to FIG. 15, it is confirmed that the photoluminescence characteristics of the perovskite color converter does not change during the reliability measurement period. During the reliability measurement period, it is observed that the emission wavelength of the perovskite color converter is shifted to a shorter wavelength. This indicates that the perovskite nanoparticles in the siloxane resin are stabilized by water and the defects in the perovskite nanoparticles are passivated by water.

FIG. 16 is graph comparing the 85-85 reliability results of perovskite color converter that does not have a carbon double bond.

In FIG. 16, the perovskite color converter that does not have a carbon double bond is manufactured by the Preparation Example. In FIG. 16, chemical crosslinking between perovskite nanoparticles and siloxane resin affects the reliability of the perovskite color converter.

FIG. 16a is a graph of 85-85 reliability results of perovskite color converter using oleic acid and an amine ligand that does not have a carbon double bond.

FIG. 16b is a graph of 85-85 reliability results of perovskite color converter using oleylamine and an amine ligand that does not have a carbon double bond.

FIG. 16c is a graph of 85-85 reliability results of perovskite color converter using carboxylic acids and amine ligands that do not have carbon double bonds.

According to FIG. 16, it is confirmed that the quantum efficiency is greatly reduced in the 85-85 environment when the organic ligand of the perovskite nanoparticles does not have a carbon double bond. This is because chemical crosslinking between perovskite nanoparticles and siloxane resin is a very important factor in the reliability of perovskite color converter, and both carboxylic acid and amine ligands should contain carbon double bonds to achieve excellent stability.

Figure 17:
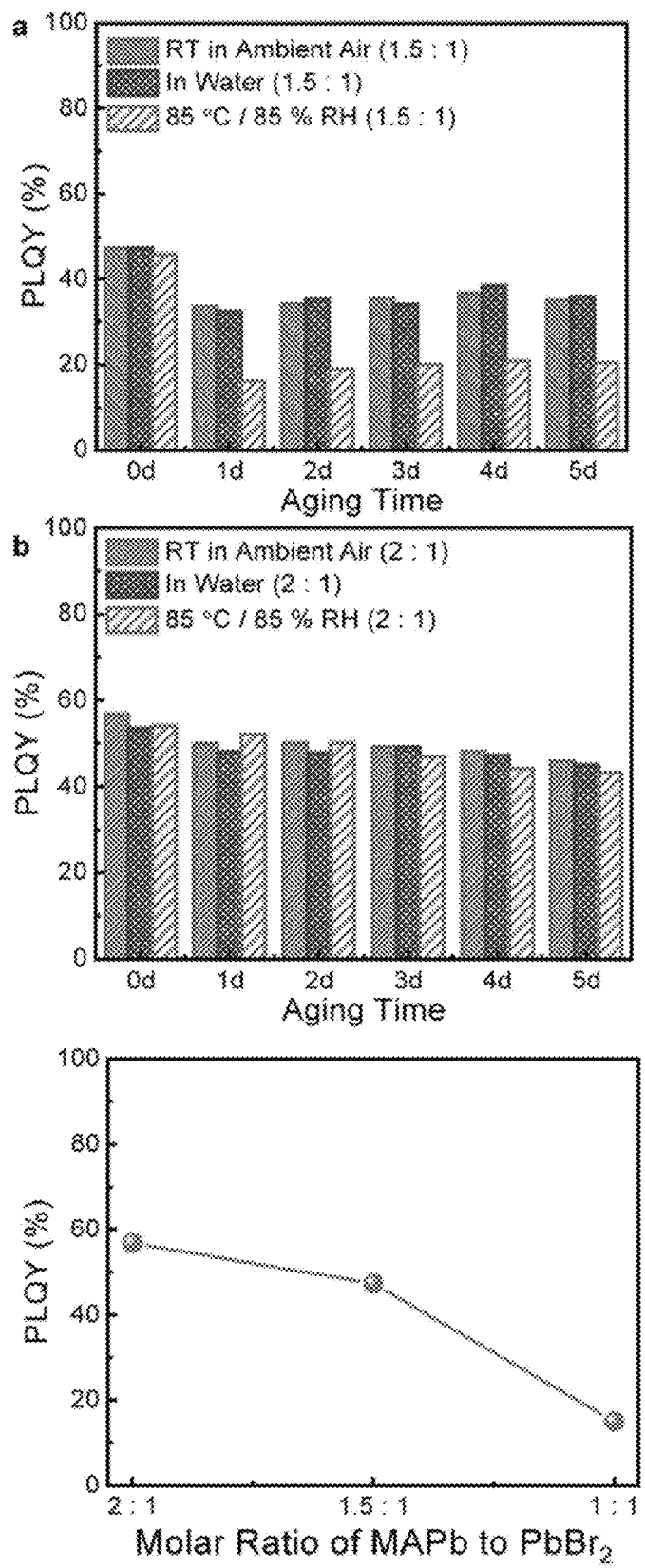
FIG. 17 is a result of comparing the initial quantum efficiency value and stability of the perovskite color converter according to the precursor ratio.

FIG. 17 is a result of comparing the initial quantum efficiency value and stability of the perovskite color converter according to the precursor ratio.

In FIG. 17, perovskite nanoparticles prepared by varying the composition of methylammonium bromide (MABr) and lead bromide ($PbBr_2$), which are precursors in perovskite nanoparticles according to Preparation Example 1 are used. The perovskite color converter is manufactured from the perovskite nanoparticles according to Preparation Example 3, and the reliability in 85-85 environments is compared.

FIG. 17a is reliability result of a perovskite color converter prepared by setting the molar ratio of methylammonium bromide (MABr) to lead bromide ($PbBr_2$) in a ratio of 1.5 to 1 in atmospheric environment, in water, and 85-85 environment.

FIG. 17b shows reliability result of a perovskite color converter prepared by setting the molar ratio of methylammonium bromide (MABr) to lead bromide ($PbBr_2$) in a ratio of 2 to 1 in atmospheric environment, in water, and 85-85 environment.

FIG. 17c is a result of comparing the initial quantum efficiency of the perovskite color converter according to the molar ratio of methylammonium bromide (MABr) to lead bromide ($PbBr_2$).

According to FIG. 17, it is confirmed that the initial quantum efficiency of the perovskite color converter increases as the ratio of methylammonium bromide (MABr) increases. This is because the formation of defects in the perovskite nanoparticles by the UV curing process is reduced. However, as the defects of the perovskite nanoparticles are reduced, the recovery effect by water also decreases, thereby the stability of the perovskite color converter is decreased.

Figure 18:
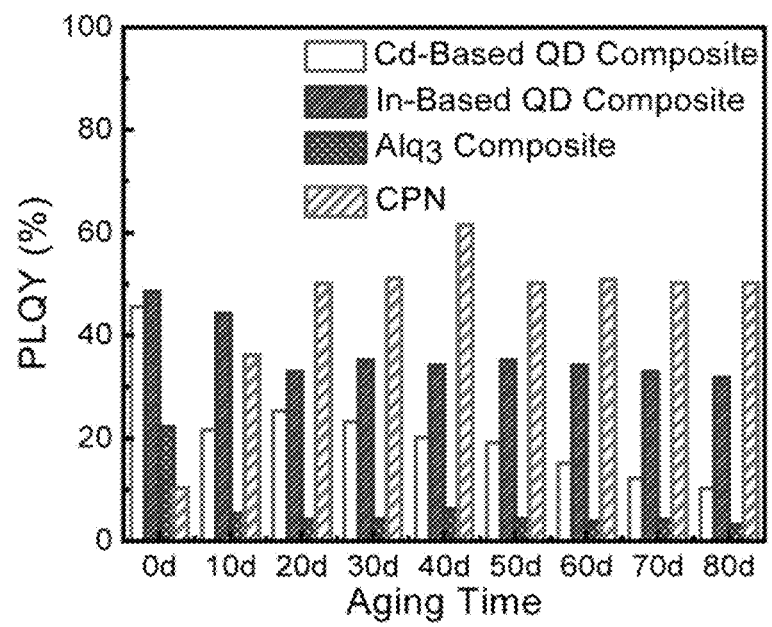
FIG. 18 is a result of evaluation of reliability in the 85-85 environment of a color converter using phosphors and semiconductor nanocrystals (quantum dots), which are various photoluminescent materials other than the present inventive concept.

FIG. 18 is a result of evaluation of reliability in the 85-85 environment of a color converter using phosphors and semiconductor nanocrystals (quantum dots), which are various photoluminescent materials other than the present inventive concept.

In FIG. 18, the excellent stability of the perovskite nanoparticles of the present inventive concept compared to other photoluminescent materials is shown.

The phosphor used as the light-emitting material in FIG. 18 is tris(8-hydroxyquinolinato)aluminum (Alq3).

The semiconductor nanocrystals used as the light-emitting material in FIG. 18 are CdSe/CdZnS core-shell-based quantum dots (organic ligands: oleic acid and trioctylphosphine) and InP/ZnS core-shell-based quantum dots (organic ligand: 3-dodecane thiol) are used.

According to FIG. 18, it is confirmed that the color converter using the perovskite nanoparticles used in the present inventive concept exhibits excellent stability in the 85-85 environment compared to other color converters. It is confirmed that the chemical crosslinking between the light-emitting material and the siloxane resin affects the stability of the color converter.

Figure 19:
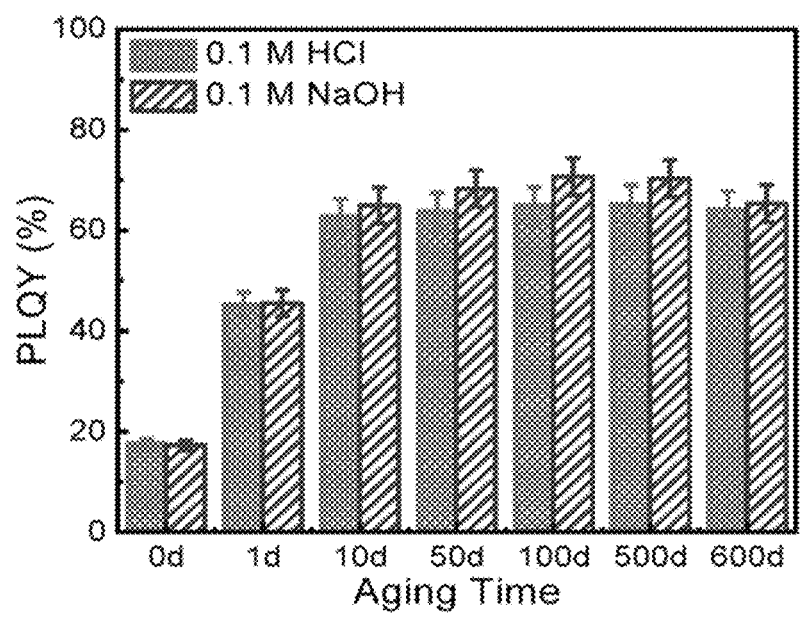
FIG. 19 is a graph showing the chemical stability of the perovskite color converter according to the present inventive concept in strong acid and strong base environments.

FIG. 19 is a graph showing the chemical stability of the perovskite color converter according to the present inventive concept in strong acid and strong base environments.

As the strong acid used in FIG. 19, 0.1 M hydrochloric acid (HCl) is used, and 0.1 M sodium hydroxide (NaOH) is used as the strong base.

The stability in the strong acid and strong base environment used in FIG. 19 is an evaluation confirming the endurance of the perovskite color converter to chemicals used in various ways in the semiconductor process.

According to FIG. 19, it is confirmed that the quantum efficiency of the perovskite color converter does not decrease for 600 days.

Figure 20:
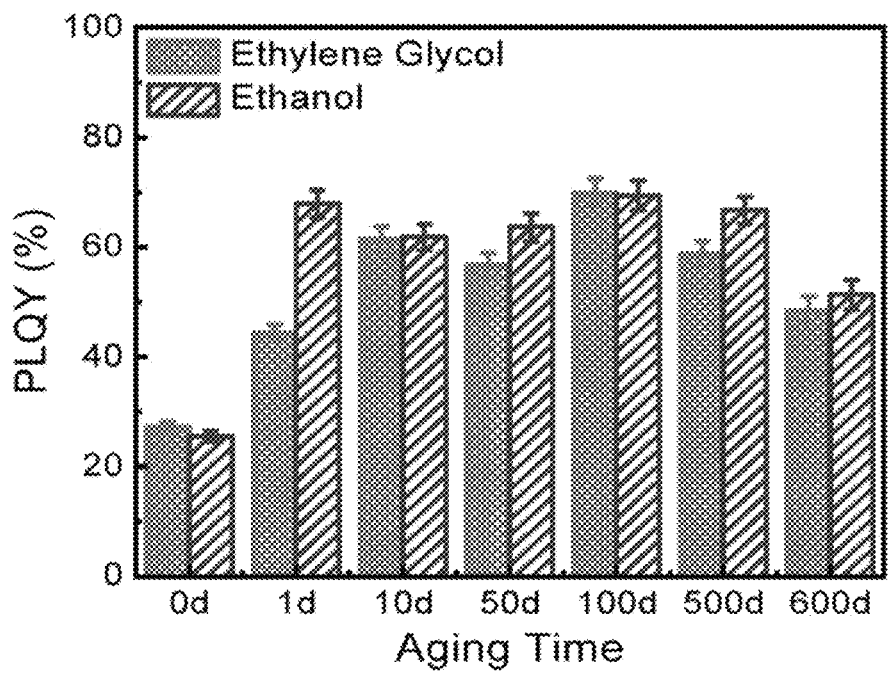
FIG. 20 is a graph showing the chemical stability of the perovskite color converter according to Preparation Example 3 of the present inventive concept to various polar solvents.

Referring to FIG. 20, a graph shows the chemical stability of the perovskite color converter according to Preparation Example 3 of the present inventive concept to various polar solvents.

According to FIG. 20, it is confirmed that the quantum efficiency of the perovskite color converter in various polar solvents does not decrease at all for 600 days.

Figure 21:
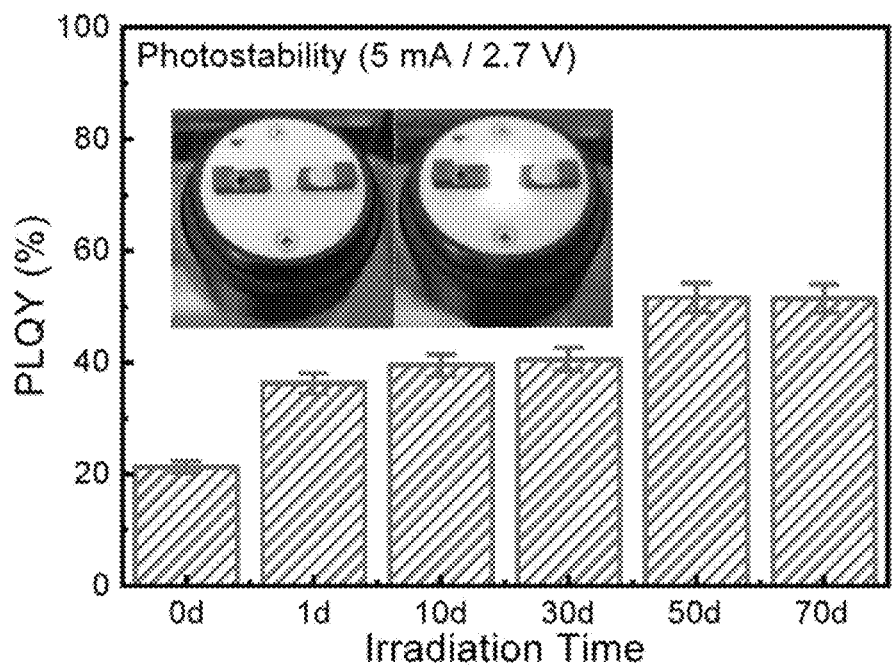
FIG. 21 is a graph showing the photostability of the perovskite color converter of the present inventive concept.

FIG. 21 is a graph showing the photostability of the perovskite color converter of the present inventive concept.

Referring to FIG. 21, the perovskite color converter is directly encapsulated on the blue LED, the change in the light-emitting characteristics of the perovskite color converter by irradiating continuous blue light is shown.

FIG. 21 is to confirm the reliability of the color converter in the actual use environment by confirming the stability in the display driving environment. The test is an essential procedure for confirming the reliability of a display product. That is, it is rare that it is carried out in normal R&D, but when a product is developed on the premise of commercialization or commercialization, it is a test process that is necessarily carried out.

According to FIG. 21, it is confirmed that the quantum efficiency of the perovskite color converter does not change for 70 days during the continuous blue light irradiation process.

Figure 22:
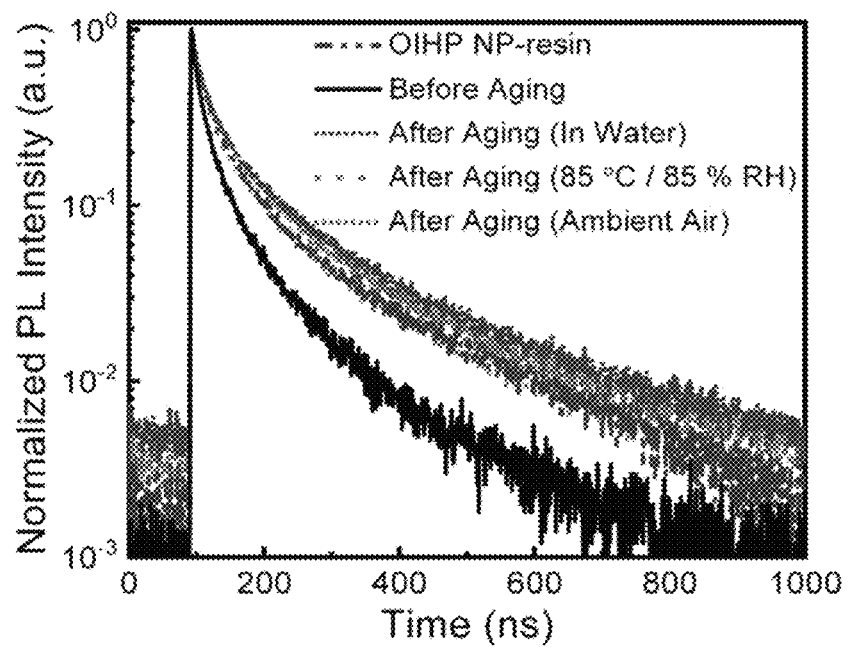
FIG. 22 is a graph of TCSPC results before and after UV curing of the perovskite color converter according to Preparation Example 3 of the present inventive concept, and before and after reliability evaluation in an atmospheric environment, in water, and in an 85-85 environment.

FIG. 22 is a graph of TCSPC results before and after UV curing of the perovskite color converter according to Preparation Example 3 of the present inventive concept, and before and after reliability evaluation in an atmospheric environment, in water, and in an 85-85 environment.

In FIG. 22, the change in the emission lifetime of the perovskite color converter before and after UV curing and reliability evaluation is shown.

According to FIG. 22, it is confirmed that the luminescence lifetime of the perovskite color converter is rapidly decreased after UV curing, and then the luminescence lifetime is increased again in various environments containing moisture. This is a result indicating that the defects formed in the perovskite nanoparticles after UV curing are recovered by moisture. Through this, it is confirmed that the perovskite nanoparticles are stabilized by moisture due to chemical crosslinking between the perovskite nanoparticles and the siloxane resin.

Figure 23:
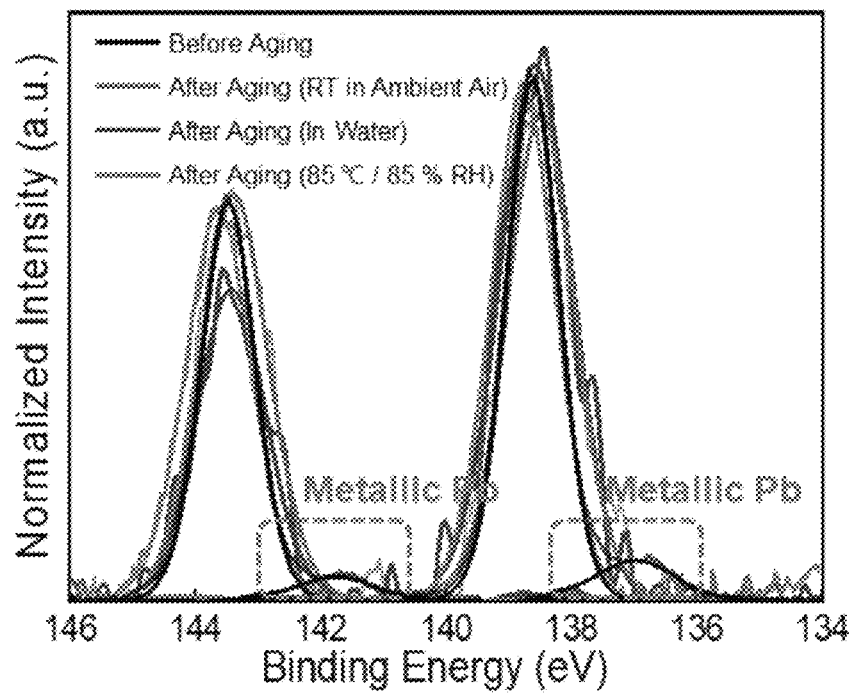
FIG. 23 is a graph showing comparison results of X-ray photoelectron spectroscopy (XPS) before and after stability evaluation of perovskite nanoparticles according to Preparation Example 3 of the present inventive concept in an atmospheric environment, in water, and in an 85-85 environment.

FIG. 23 is a graph showing comparison results of X-ray photoelectron spectroscopy (XPS) before and after stability evaluation of perovskite nanoparticles according to Preparation Example 3 of the present inventive concept in an atmospheric environment, in water, and in an 85-85 environment.

In FIG. 23, the cause of the recovery phenomenon of the light-emitting characteristics before and after the stability evaluation of the perovskite color converter is shown.

According to FIG. 23, it is confirmed that the peak corresponding to lead (metallic Pb) of the metal characteristic corresponding to the defect of the perovskite nanoparticles disappears during the stability evaluation of the perovskite color converter. This means that defects inside the perovskite nanoparticles are passivated by moisture.

Figure 24:
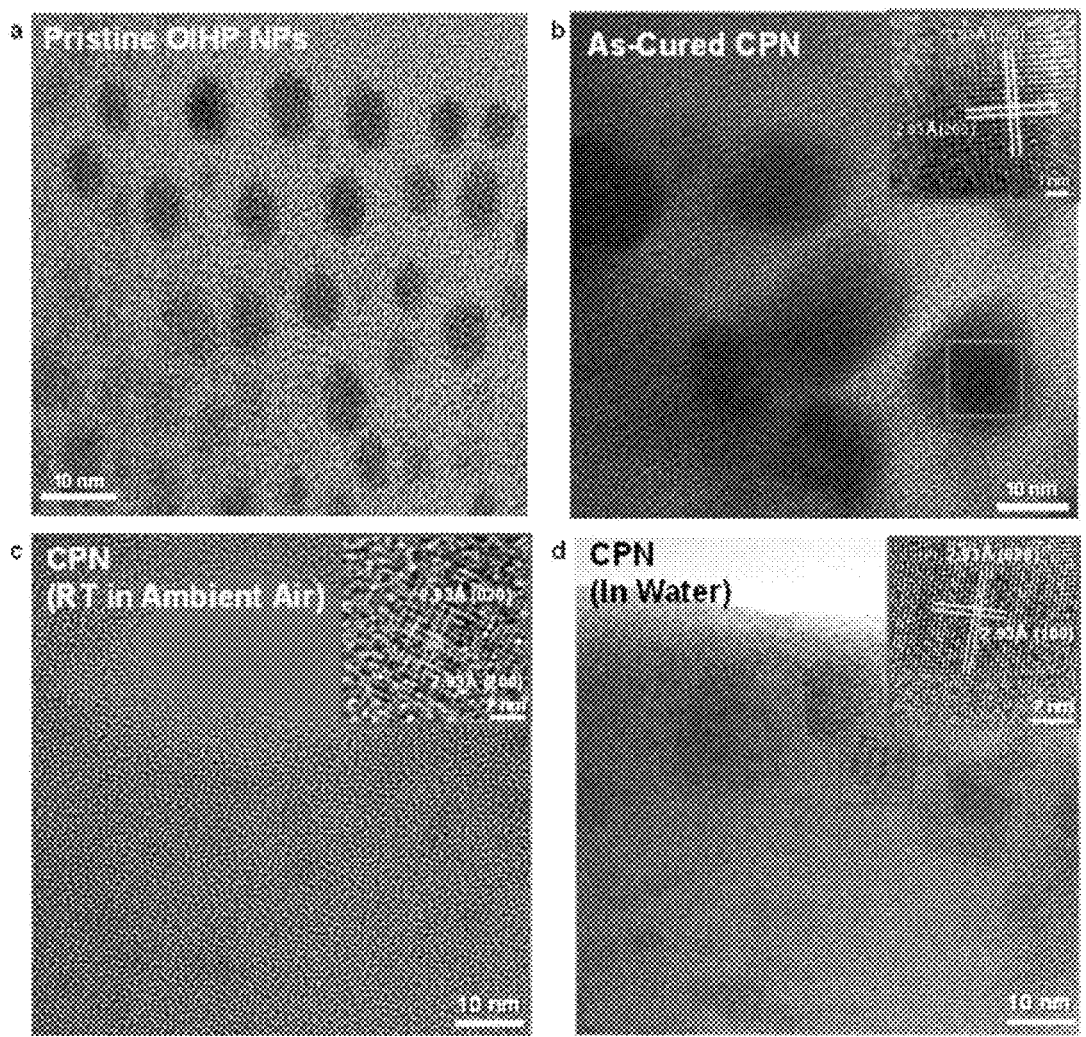
FIG. 24 is a transmission electron microscopy (TEM) image before and after stability evaluation of the perovskite nanoparticles according to Preparation Example 1 and the perovskite color converter according to Preparation Example 3 of the present inventive concept.

FIG. 24 is a TEM image before and after stability evaluation of the perovskite nanoparticles according to Preparation Example 1 and the perovskite color converter according to Preparation Example 3 of the present inventive concept.

In FIG. 24, result of the size change before and after the stability evaluation of the perovskite nanoparticles is shown.

FIG. 24a is an image confirmed through TEM of the perovskite nanoparticles according to Preparation Example 1 of the present inventive concept.

FIG. 24b is TEM image of perovskite nanoparticles before stability evaluation of the perovskite color converter according to Preparation Example 3 of the present inventive concept.

FIG. 24c is TEM image of perovskite nanoparticles after stability evaluation in the atmospheric environment for the perovskite color converter according to Preparation Example 3 of the present inventive concept.

FIG. 24d is TEM image of perovskite nanoparticles after stability evaluation in water of the perovskite color converter according to Preparation Example 3 of the present inventive concept.

According to FIG. 24, it is confirmed that the change in size before and after the stability evaluation of the perovskite nanoparticles is very small. This means that there is no change in the perovskite nanoparticles by moisture or temperature.

Figure 25:
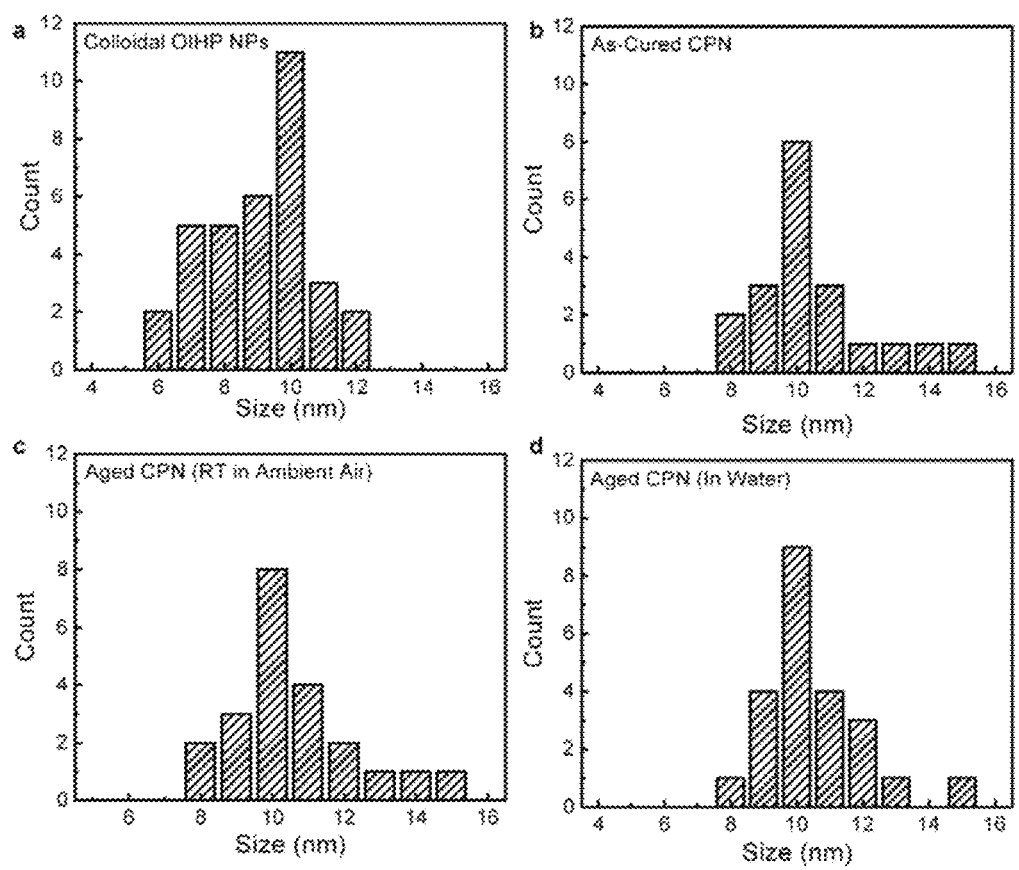
FIG. 25 is a size distribution diagram of perovskite nanoparticles according to Preparation Example 1 of the present inventive concept and perovskite nanoparticles confirmed through TEM before and after stability evaluation of the perovskite color converter according to Preparation Example 3.

FIG. 25 is a size distribution diagram of perovskite nanoparticles according to Preparation Example 1 of the present inventive concept and perovskite nanoparticles confirmed through TEM before and after stability evaluation of the perovskite color converter according to Preparation Example 3.

FIG. 25a is a size distribution diagram confirmed through TEM of the perovskite nanoparticles according to Preparation Example 1 of the present inventive concept. The average size of the perovskite nanoparticles is about 9.06 nm, and the size distribution of the perovskite nanoparticles exists in the order of 6 nm, 7 nm, 8 nm, 9 nm, 10 nm, 11 nm, and 12 nm.

FIG. 25b is a size distribution diagram confirmed through TEM of perovskite nanoparticles before stability evaluation in the perovskite color converter according to Preparation Example 3 of the present inventive concept. The average size of the perovskite nanoparticles is about 10.5 nm, and the size distribution of the perovskite nanoparticles is in the order of 8 μm, 9 nm, 10 nm, 11 nm, 12 nm, 13 nm, 14 nm, and 15 nm.

FIG. 25c is a size distribution diagram confirmed through TEM of perovskite nanoparticles after stability evaluation in the atmospheric environment of the perovskite color converter according to Preparation Example 3 of the present inventive concept. The average size of the perovskite nanoparticles is about 10.59 nm, and the size distribution of the perovskite nanoparticles is in the order of 8 nm, 9 nm, 10 nm, 11 nm, 12 nm, 13 nm, 14 nm, and 15 nm.

FIG. 25d is a size distribution diagram of perovskite nanoparticles confirmed through TEM after stability evaluation in water in the perovskite color converter according to Preparation Example 3 of the present inventive concept. The average size of the perovskite nanoparticles is about 10.52 nm, and the size distribution of the perovskite nanoparticles exists in the order of 8 nm, 9 nm, 10 nm, 11 nm, 12 nm, 13 nm, and 15 nm.

According to FIG. 25, it is confirmed that the change in the size distribution before and after the stability evaluation of the perovskite nanoparticles is very small. In addition, it is confirmed that the change in the average diameter of the perovskite nanoparticles before and after the stability evaluation is very small. This means that there is no change in the perovskite nanoparticles by moisture or temperature.

Figure 26:
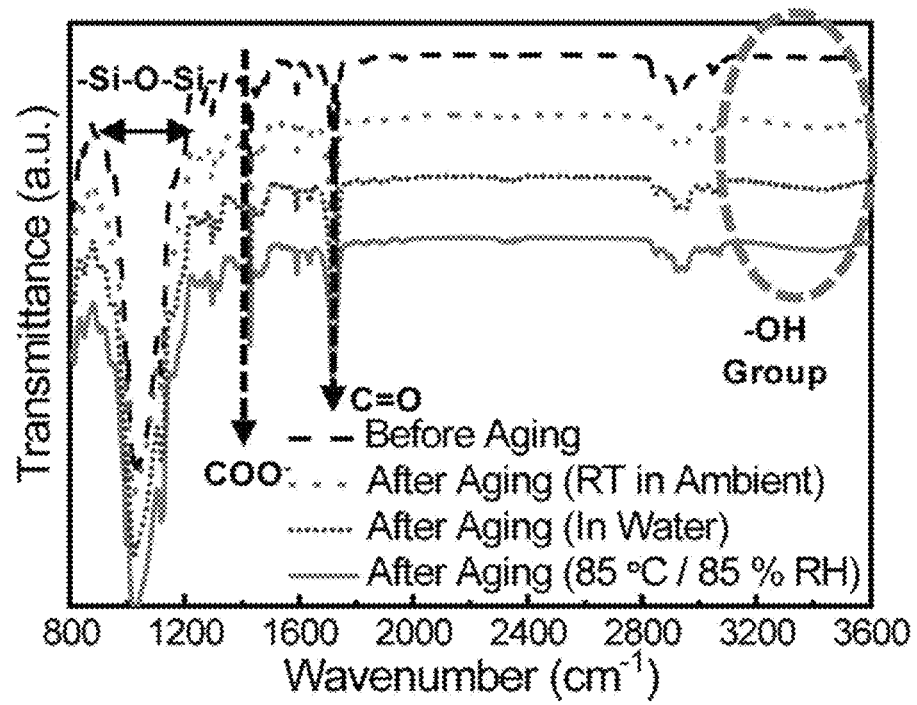
FIG. 26 is a comparison result of Fourier transform infrared spectroscopy (FT-IR) spectra before and after stability evaluation in an atmospheric environment, in water, and in an 85-85 environment of the perovskite color converter according to Preparation Example 3 of the present inventive concept.

FIG. 26 is a comparison result of Fourier transform infrared spectroscopy (FT-IR) spectra before and after stability evaluation in an atmospheric environment, in water, and in an 85-85 environment of the perovskite color converter according to Preparation Example 3 of the present inventive concept.

In FIG. 26, a result confirming the presence or absence of moisture in the perovskite color converter before and after the stability evaluation is shown.

According to FIG. 26, it is confirmed that a peak does not appear at wavenumbers 3700 to 3150 $cm^{-1}$ of the —OH group corresponding to water in the perovskite color converter before stability evaluation. After the stability evaluation, it is confirmed that the peak is found in the perovskite material. This means that moisture remains in the perovskite color converter after stability evaluation.

Figure 27:
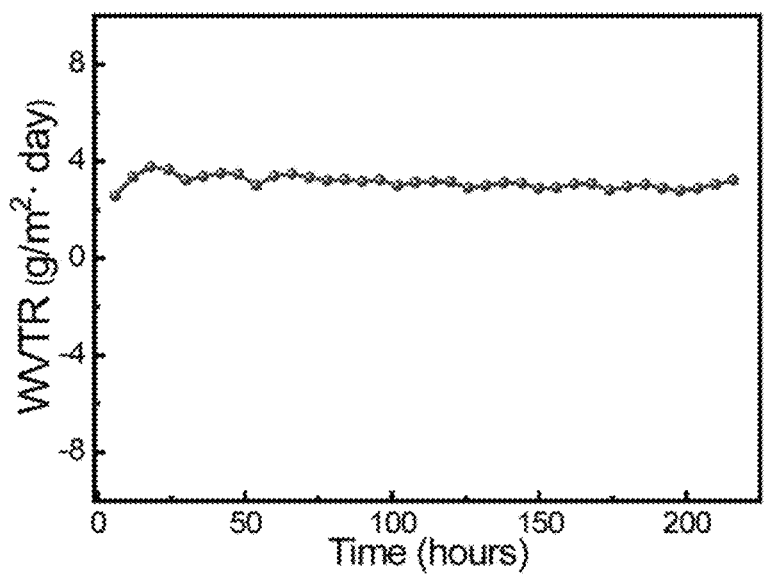
FIG. 27 is a water permeability evaluation result of the perovskite color converter according to Preparation Example 3 of the present inventive concept.

FIG. 27 is a water permeability evaluation result of the perovskite color converter according to Preparation Example 3 of the present inventive concept.

The moisture permeability of FIG. 27 is confirmed through the MOCON Aquatran1 equipment, and the evaluation is performed at 25° C. and at 100% relative humidity.

According to FIG. 27, the water permeability value of the perovskite color converter represents a numerical value of 4 $g/m^2$·day. This confirms that the siloxane material greatly reduces the moisture penetration.

Figure 28:
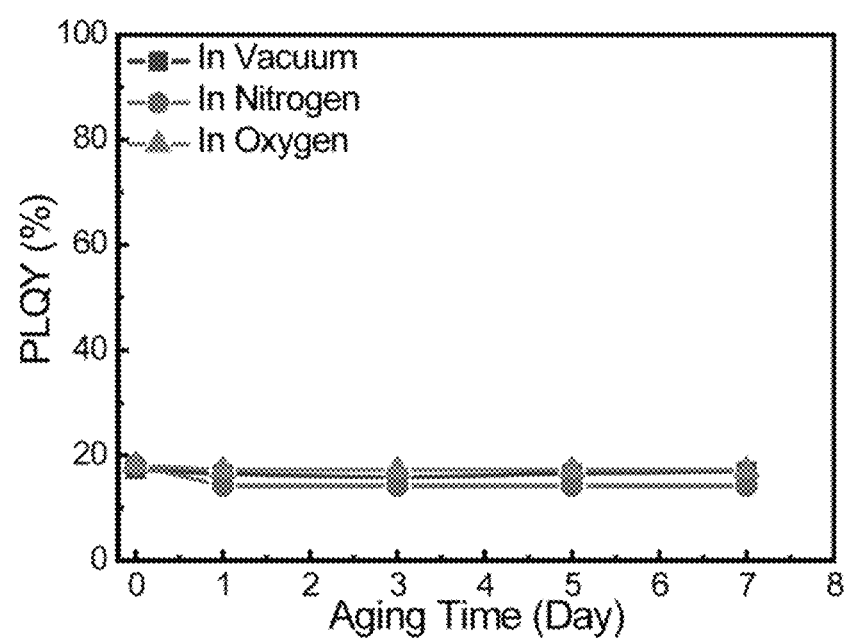
FIG. 28 is a graph of the stability evaluation results in an environment (oxygen, nitrogen, vacuum) without moisture of the perovskite color converter of the present inventive concept.

FIG. 28 is a graph of the stability evaluation results in an environment (oxygen, nitrogen, vacuum) without moisture of the perovskite color converter of the present inventive concept.

In FIG. 28, the change in the light-emitting characteristics of the perovskite color converter by moisture is shown.

According to FIG. 28, it is confirmed that there is no increase in the quantum efficiency value of the perovskite color converter in an environment without moisture. Through this, it is confirmed that moisture affects the luminous properties of the perovskite color converter.

Figure 29:
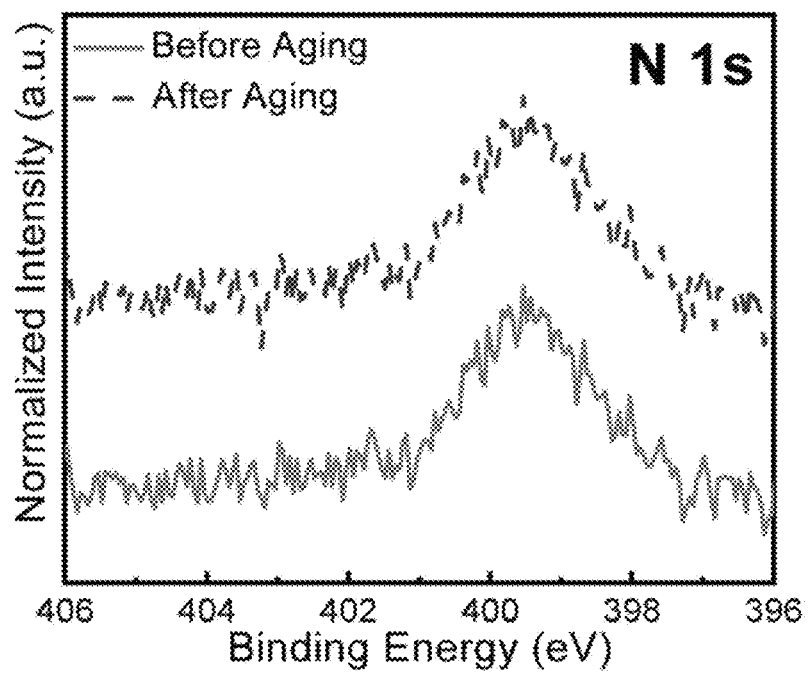
FIG. 29 is a graph showing changes in the nitrogen peak of X-ray photoelectron spectroscopy (XPS) before and after stability evaluation of the perovskite color converter of the present inventive concept.

FIG. 29 is a graph showing changes in the nitrogen peak of X-ray photoelectron spectroscopy (XPS) before and after stability evaluation of the perovskite color converter of the present inventive concept.

In FIG. 29, the composition of perovskite nanoparticles in the perovskite color converter is shown.

According to FIG. 29, it is confirmed that the shape of the nitrogen peak does not change before and after the stability evaluation of the perovskite color converter. This means that the composition of the perovskite nanoparticles does not change after stability evaluation.

Figure 30:
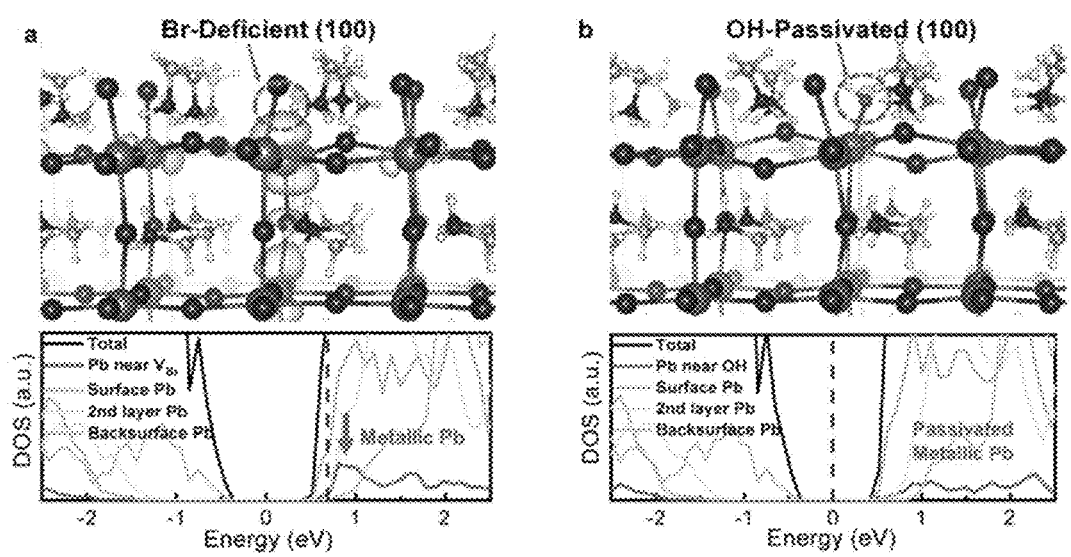
FIGS. 30a and 30b are graphs showing the structural change and density of states through the calculation results of the first-principle density theory function before and after moisture adsorption on the (100) plane of the perovskite structure.

FIGS. 30a and b are graphs showing the structural change and density of states through the calculation results of the first-principle density theory function before and after moisture adsorption on the (100) plane of the perovskite structure.

In FIGS. 30a and b, a result confirming the structural change of the perovskite before and after moisture penetration is shown.

The calculation of FIGS. 30a and b is performed under the condition that MA is chemically crosslinked with the siloxane material and does not decompose.

FIG. 30a is a graph showing the chemical structure and density of states confirmed through first-principle density theoretical function calculation for the perovskite (100) plane before moisture adsorption.

FIG. 30b is a graph showing the chemical structure and density of states confirmed through first-principle density theoretical function calculation for the perovskite (100) plane after moisture adsorption.

According to FIGS. 30a and b, it is confirmed that the graph of density of states of defects and metallic forms in the perovskite that existed before moisture adsorption is completely passivated without a change in chemical structure after moisture adsorption, graph of the density of states shows semiconductor characteristics. This is the result of confirming through theoretical calculations that perovskite nanoparticles and siloxane materials exhibit resistance to moisture penetration through chemical cross-linking and that luminescence properties can be improved by water.

Figure 31:
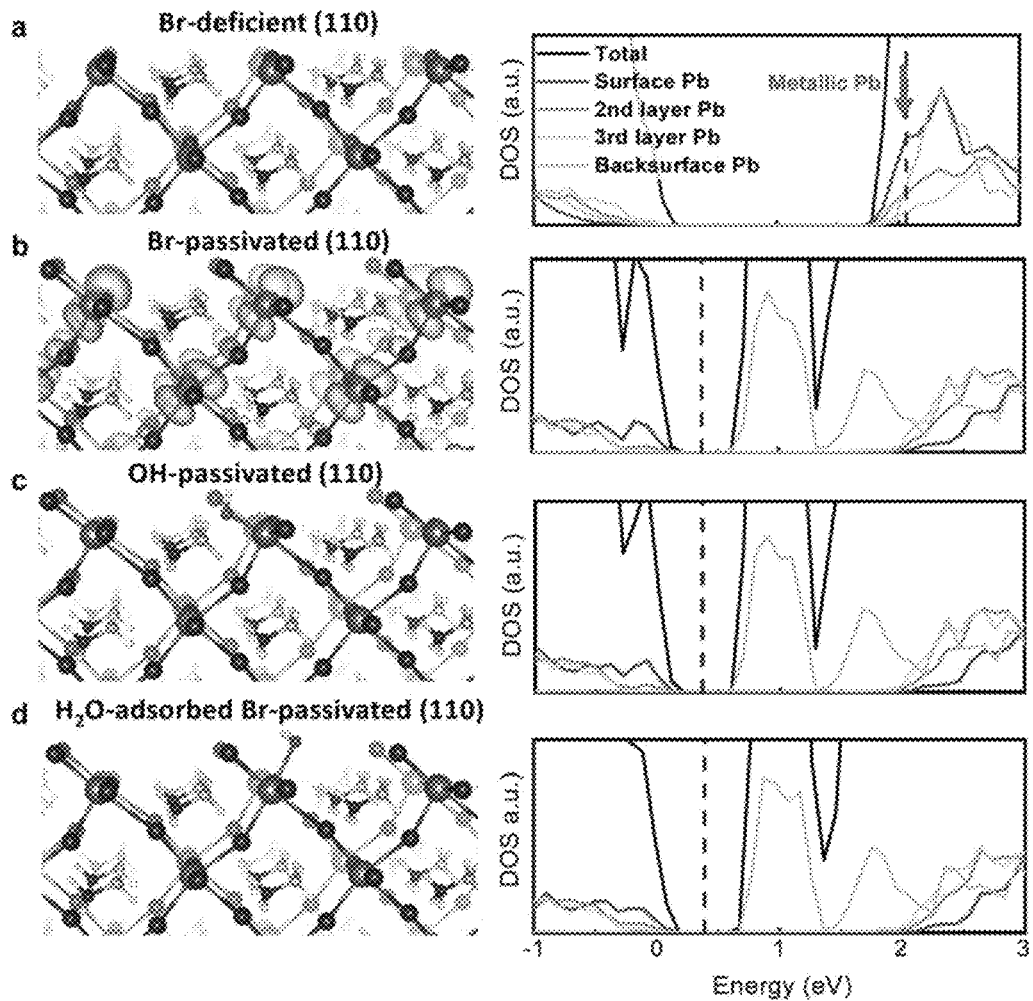
FIGS. 31a, b, c and d are graphs showing the structural change and density of states through the calculation results of the first-principle density theory function before and after moisture adsorption on the (110) plane of the perovskite structure.

FIGS. 31a, b, c and d are graphs showing the structural change and density of states through the calculation results of the first-principle density theory function before and after moisture adsorption on the (110) plane of the perovskite structure.

In FIGS. 31a, b, c and d, a result confirming the structural change of the perovskite before and after moisture penetration is shown.

The calculation of FIGS. 31a, b, c and d is performed under the condition that MA is chemically crosslinked with the siloxane material and does not decompose.

FIG. 31a is a graph showing the chemical structure and density of states through first-principle density theoretical function calculation for the perovskite (110) plane before moisture adsorption.

FIG. 31b is a graph showing the chemical structure and density of states through first-principle density theoretical function calculation for the perovskite (110) plane after bonding with bromine.

FIG. 31c is a graph showing the chemical structure and density of states through first-principle density theoretical function calculation for the perovskite (110) plane after bonding with hydroxyl group.

FIG. 31d is a graph showing the chemical structure and density of states through first-principle density theoretical function calculation for the perovskite (110) plane after bonding with water molecule.

According to FIGS. 31a, b, c and d, it is confirmed that graph of the density of states of defects and metallic forms in the perovskite that existed before moisture adsorption is completely passivated without a change in chemical structure after moisture adsorption, and graph of the density of states shows semiconductor characteristics. In particular, defects that existed even when bound with bromine (Br) completely disappeared after adsorption of moisture or water. This is the result of confirming through theoretical calculations that perovskite nanoparticles and siloxane materials exhibit resistance to moisture penetration through chemical cross-linking and that luminescence properties can be improved by water.

Figure 32:
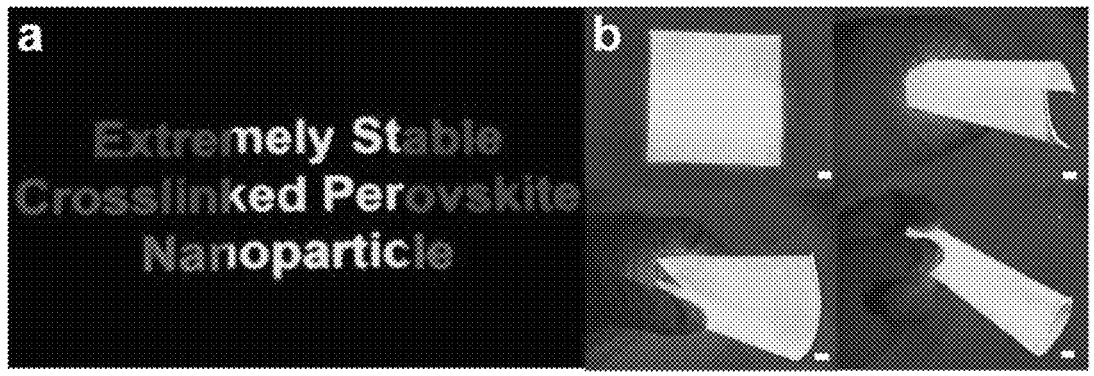
FIGS. 32a and b are images showing the color conversion characteristics of the perovskite color converter of the present inventive concept.

FIGS. 32a and b are images showing the color conversion characteristics of the perovskite color converter of the present inventive concept.

FIG. 32a is an image of a perovskite color converter placed on the screen of a commercial mobile phone.

FIG. 32b is an image of various mechanical deformations performed by fabricating a perovskite color converter into a large-area film.

According to FIGS. 32a and b, it is confirmed that the perovskite color converter exhibits very good color conversion properties, and it is confirmed that the light-emitting properties are very stable even in various mechanical deformations when manufactured as a large area film.

Figure 33:
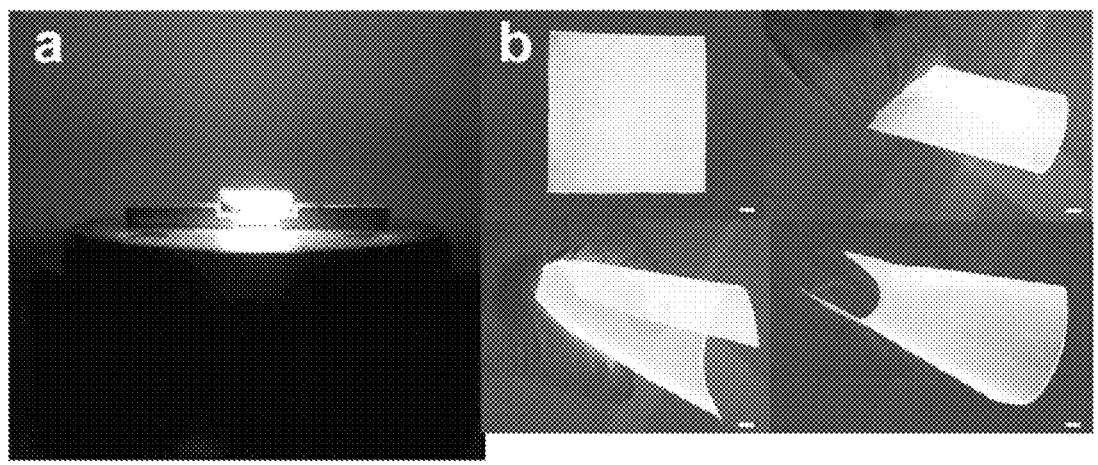
FIGS. 33 a and b are images of a white LED and a white light-emitting film using the perovskite color converter according to Preparation Example 3 of the present inventive concept.

FIGS. 33a and b are images of a white LED and a white light-emitting film using the perovskite color converter according to Preparation Example 3 of the present inventive concept.

In FIGS. 33a and b, a CdSe/CdZnS core-shell based inorganic quantum dot is used as a red light-emitting material.

In FIGS. 33a and b, a color converter is prepared by mixing perovskite nanoparticles and red quantum dots in a weight ratio of 1 to 2 in a siloxane resin to realize white light-emission.

FIG. 33a is an image of a white color conversion film placed on a blue LED.

FIG. 33b is an image of various mechanical deformations performed by fabricating a white color converter into a large area film.

According to FIGS. 33a and b, it is confirmed that the blue LED exhibits very good white light-emission, and it is confirmed that the white light-emission is very stable even in various mechanical deformations when manufactured as a large area film.

Figure 34:
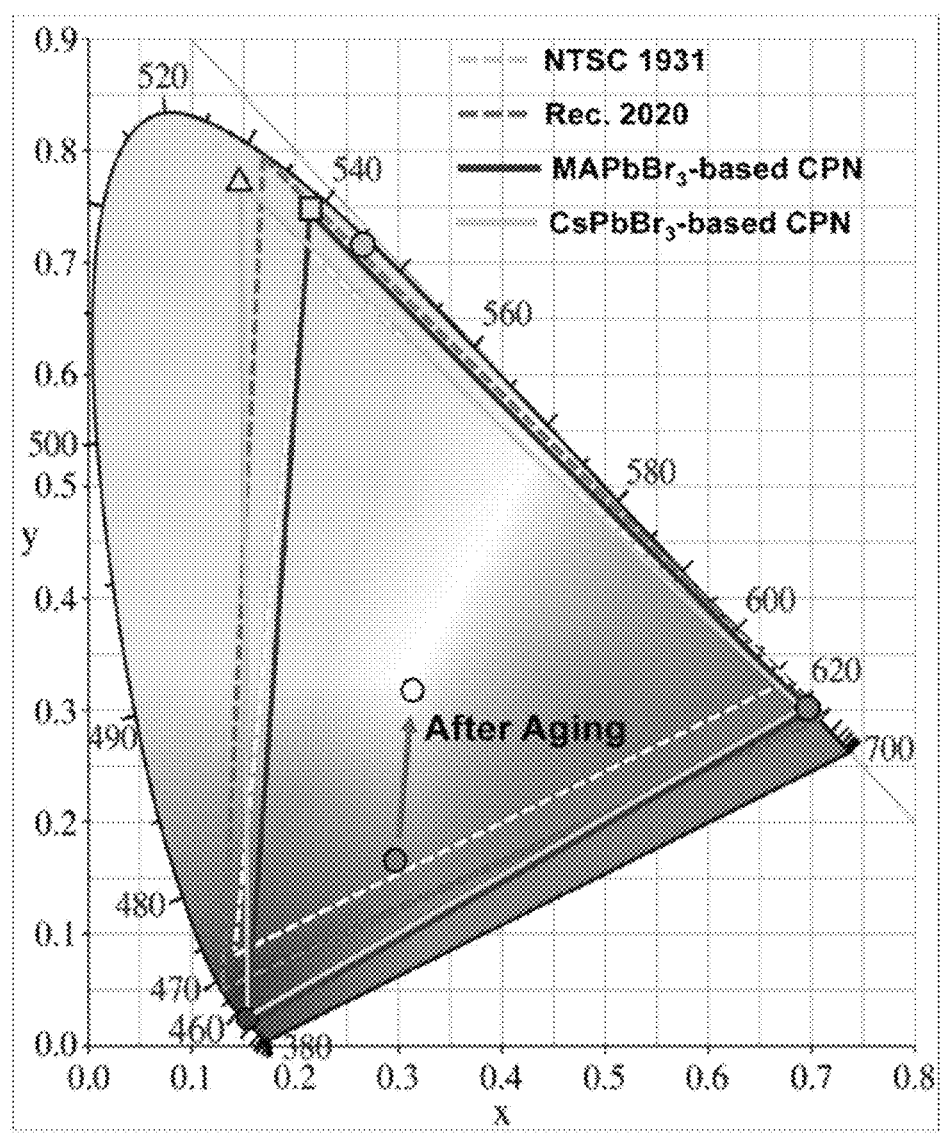
FIG. 34 is a graph confirming the color coordinates of the perovskite color converter according to Preparation Example 3 of the present inventive concept.

FIG. 34 is a graph confirming the color coordinates of the perovskite color converter according to Preparation Example 3 of the present inventive concept.

In FIG. 34, a result confirming the light-emitting performance of the perovskite color converter is shown.

In FIG. 34, a green-emitting CdSe/CdZnS core-shell-based inorganic quantum dot is used for comparison.

In FIG. 34, $CsPbBr_3$ and $MAPbBr_3$ are used as perovskite nanoparticles in the perovskite color converter.

In FIG. 34, CdSe/CdZnS core-shell based inorganic quantum dots are used as red light-emitting materials.

In FIG. 34, a blue LED is used as a blue color.

According to FIG. 34, it is confirmed that the perovskite color converter exhibits higher luminescence compared to the existing inorganic quantum dots, and it is confirmed that the luminous performance of the inorganic perovskite is superior to that of the organic-inorganic hybrid perovskite. When manufactured with a white color converter, the initial color coordinates are displayed in the blue/red mixed area, but when exposed to an environment containing moisture, the initial color coordinates are displayed in the white area coordinates. This is due to the recovery of the luminescent properties due to moisture of the perovskite color converter. Perovskite color converter has a very wide color gamut compared to conventional inorganic quantum dots ($MAPbBr_3$: 120% compared to NTSC (National Television System Committee) 1931, 89% compared to Rec. 2020 (International Telecommunication Union-R Recommendation BT.2020)/$CsPbBr_3$: 130% compared to NTSC1931, 97% compared to Rec.2020).

Figure 35:
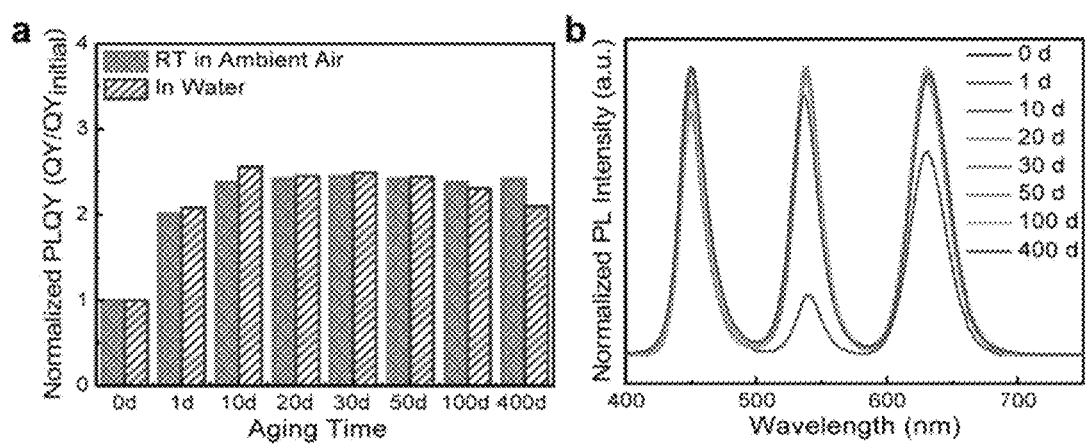
FIGS. 35a and b are graphs evaluating the stability to atmospheric environment and water of the white LED using the perovskite color converter according to Preparation Example 3 of the present inventive concept.

FIGS. 35a and b are graphs evaluating the stability to atmospheric environment and water of the white LED using the perovskite color converter according to Preparation Example 3 of the present inventive concept.

In FIGS. 35a and b, a result of evaluation of stability when manufacturing a white LED of a perovskite color converter is shown.

The red light-emitting material used in FIGS. 35a and b is CdSe/CdZnS core-shell inorganic quantum dots.

FIG. 35a is a graph showing changes in quantum efficiency of a white LED in an atmospheric environment and in water.

FIG. 35b is a graph of photoluminescence (PL) conversion of a white LED in an atmospheric environment and in water.

Referring to FIGS. 35a and b, it is confirmed that the manufactured white LED has excellent stability in an atmospheric environment and in water. The phenomenon that the initial low quantum efficiency increases after 1 day in the atmospheric environment and in water is due to water stabilization of the perovskite nanoparticles chemically crosslinked by the siloxane material. This is confirmed through the PL change graph.

Figure 36:
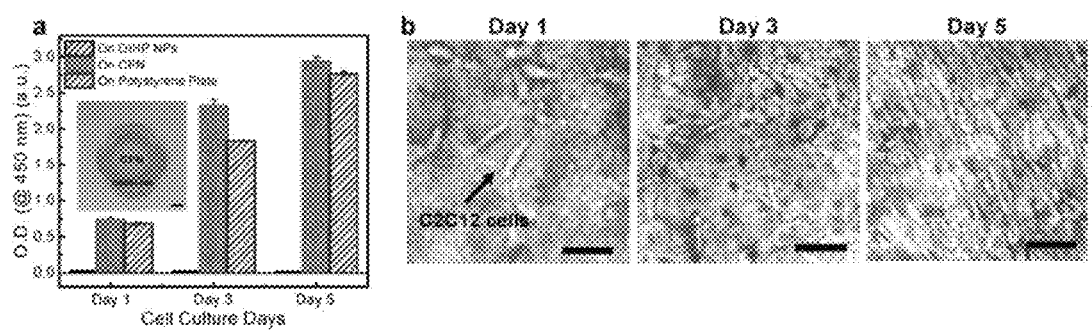
FIGS. 36 a and b are graphs and an image evaluating the biocompatibility of the perovskite color converter according to Preparation Example 3 of the present inventive concept.

FIGS. 36a and b are graphs and an image evaluating the biocompatibility of the perovskite color converter according to Preparation Example 3 of the present inventive concept.

In FIGS. 36a and b, a result confirming the biocompatible properties of the perovskite color converter is shown.

As cells used in FIGS. 36a and b, rat skeletal cells are used.

For the environment evaluated in FIGS. 36a and b, the perovskite color converter is immersed in a water-based cell growth solution (a solution in which Dulbecco's modified Eagle medium and Fetal bovine serum are mixed) and then carried out at 37° C. and 5% carbon dioxide concentration.

FIG. 36a is a graph of the absorption results at a wavelength of 450 nm during the evaluation period of the biocompatibility of the perovskite color converter.

FIG. 36b is an image of cell growth observed with an optical microscope during the evaluation period of the biocompatibility of the perovskite color converter.

According to FIGS. 36a and b, it is confirmed that the growth of mouse skeletal cells is good even in the presence of toxic lead (Pb) in the perovskite color converter. This means that the siloxane material effectively blocks lead toxicity.

FIG. 37 is a schematic diagram of a photopatterning process using ultraviolet curing of the perovskite color converter according to Preparation Example 3 of the present inventive concept.

A patterning is formed by using a photolithography process using a photocuring method of a perovskite color converter.

According to FIG. 37, the perovskite color converter of the present inventive concept is the same as a kind of negative type photoresist to produce a cured product through UV curing. Therefore, when UV irradiation is performed using a photomask, a desired pattern can be formed as shown in the schematic diagram.

In the perovskite color converter according to Preparation Example 3 of the present inventive concept, dispersion and encapsulation may be performed by additionally using a polymer resin as a main chain.

FIG. 39 is a schematic diagram for dispersion and encapsulation using a polymer resin as a main chain in addition to the perovskite color converter according to Preparation Example 3 of the present inventive concept.

FIG. 40 is a schematic diagram of the perovskite nanoparticles according to Preparation Example 1 and the perovskite color converter according to Preparation Example 3 of the present inventive concept.

According to FIGS. 39 and 40, the introduction of an additional polymer resin can increase the light conversion efficiency by dispersing the perovskite color conversion resin with a high concentration, and it prevents penetration of moisture or oxygen due to the resin encapsulating the perovskite color converter from the outside, so that perovskite color converter has excellent optical transmittance and the stability can be improved.

According to the present inventive concept described above, the perovskite nanoparticles having an organic ligand including an unsaturated hydrocarbon bond are uniformly dispersed in the precursor solution before the synthesis step of the siloxane resin. This is due to the hydrophobic interaction between the silane precursor solution and the organic ligand. In addition, even when the siloxane resin is synthesized, a meaningful chemical bond is not formed between the siloxane resin and the organic ligand, and uniform dispersion is maintained in the synthesized siloxane resin. Finally, the organic ligand containing unsaturated hydrocarbon bonds in the dense network structure is cross-linked with siloxane resin by the induced cross-linking reaction. Therefore, the perovskite nanoparticles bonded to the cross-linked siloxane resin are firmly bonded to the resin, thereby preventing the elements from being separated from the crystal structure. In addition, the cross-linked siloxane resin exhibits excellent resistance to penetration of moisture, which deteriorates physical properties. In addition, it is possible to form a pattern using a photolithography process by having the characteristics of a negative photoresist using the UV curable feature.

The invention claimed is:

1. A perovskite color converter comprising:
    a siloxane resin having a siloxane bond by a sol-gel reaction and a cross-linking reaction between silane precursors;
    perovskite nanoparticles that perform a light-emitting operation; and
    organic ligands surrounding the perovskite nanoparticle,
    wherein the organic ligands are chemically cross-linked with the siloxane resin,
    wherein the perovskite nanoparticles are dispersed in the cross-linked siloxane resin,
    wherein the silane precursors are an organic alkoxysilane or an organic silanediol, and
    wherein the organic ligand has an unsaturated carbon bond.

2. The perovskite color converter of claim 1, wherein the perovskite nanoparticle is inorganic halide perovskite or organic-inorganic hybrid halide perovskite.

3. The perovskite color converter of claim 1, wherein the perovskite nanoparticle is larger than exciton Bohr's diameter.

4. The perovskite color converter of claim 1, wherein the perovskite nanoparticle is larger than 7 nm.

5. The perovskite color converter of claim 1, wherein the silane precursors are (3-methacryloxypropyl) trimethoxysilane (MPTS) and diphenylsilanediol (DPSD).

6. The perovskite color converter of claim 5, wherein the cross-linked siloxane resin forms a network structure by bonding between the methacrylate groups in MPTS as shown in Reaction Formula 2.

[Reaction Formula 2]

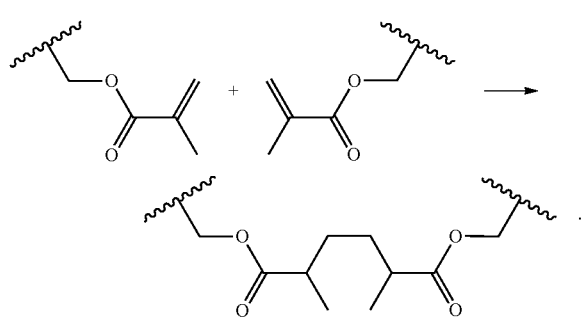

7. The perovskite color converter of claim 1, wherein the sol-gel reaction is performed through a non-aqueous sol-gel reaction by Reaction Formula 1.

[Reaction Formula 1]

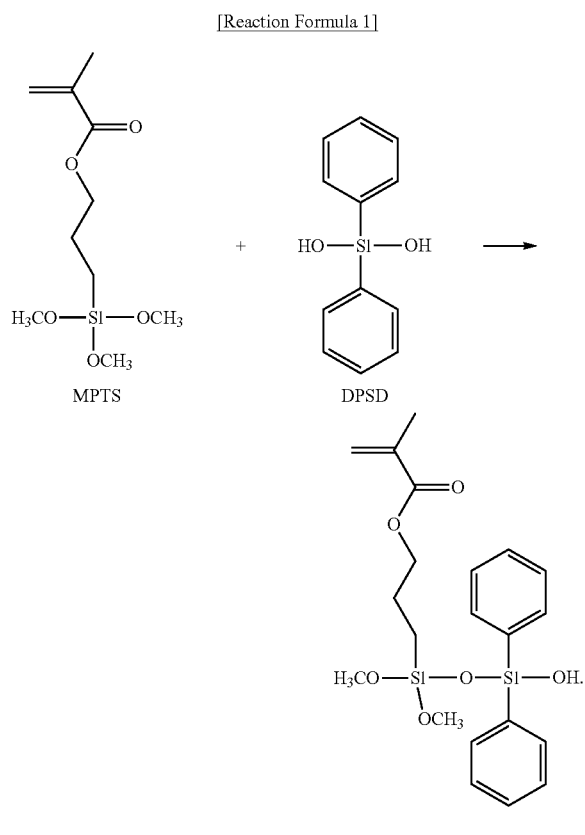

8. The perovskite color converter of claim 1, wherein the perovskite nanoparticles are encapsulated by cross-linked siloxane resin.

9. The perovskite color converter of claim 1, wherein the cross-linked siloxane resin has more than 87% of degree of condensation in 29Si-NMR data.

10. The perovskite color converter of claim 1, wherein the perovskite color converter is in the form of a film.

11. A manufacturing method of a perovskite color converter comprising:
forming a first dispersion in which perovskite nanoparticles and silane precursor are mixed;
forming a second dispersion in which a siloxane resin having a siloxane bond is formed through a non-aqueous sol-gel reaction in the first dispersion; and
inducing a crosslinking reaction between silane precursors in the second dispersion to form a cross-linked siloxane resin; and
inducing chemical bonding between organic ligands of the perovskite nanoparticles and the cross-linked siloxane resin.

12. The manufacturing method of claim 11, wherein the silane precursors are an organic alkoxysilane or an organic silanediol.

13. The manufacturing method of claim 12, wherein the silane precursors are (3-methacryloxypropyl) trimethoxysilane (MPTS) and diphenylsilanediol (DPSD).

14. The manufacturing method of claim 13, wherein the perovskite nanoparticles are uniformly dispersed in the silane precursor by hydrophobic interaction between the methacrylate group of MPTS and the phenyl group of DPSD, and the organic ligand.

15. The manufacturing method of claim 14, wherein the barium hydroxide is added while the first dispersion is stirred.

16. The manufacturing method of claim 13, wherein the non-aqueous sol-gel reaction is performed by Reaction Formula 1.

[Reaction Formula 1]

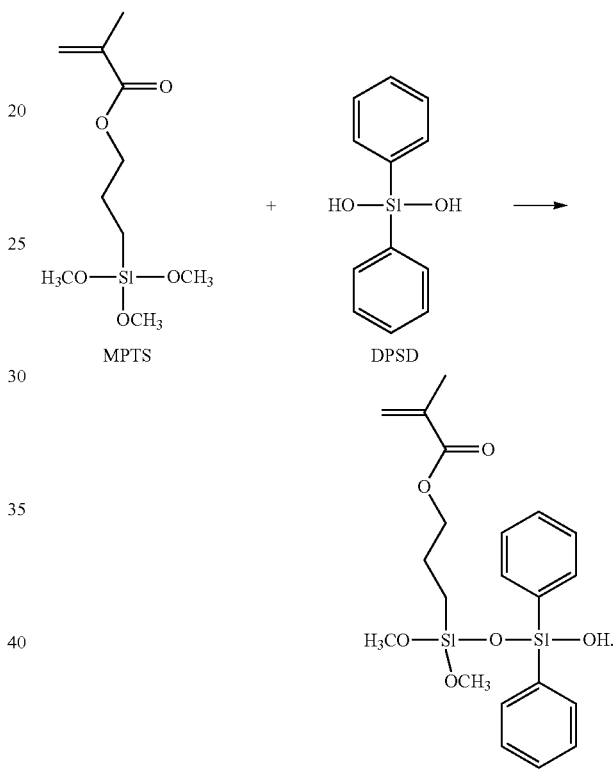

17. The manufacturing method of claim 13, wherein the cross-linked siloxane resin forms a network structure by bonding between the methacrylate groups of in MPTS as shown in Reaction Formula 2.

[Reaction Formula 2]

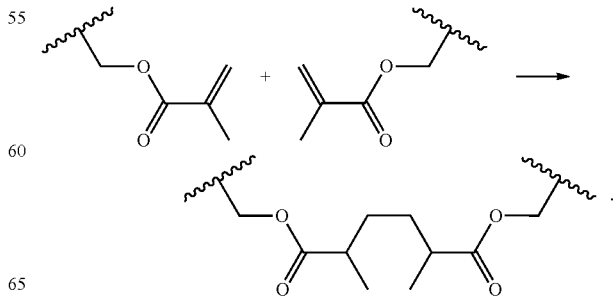

18. The manufacturing method of claim 13, wherein ultraviolet light is irradiated to the second dispersion for the crosslinking reaction, and a photocatalyst is introduced into the second dispersion.

19. The manufacturing method of claim 18, wherein the photocatalyst is 2,2-dimethoxy-2-phenylacetophenone (BDK).

20. The manufacturing method of claim 11, wherein barium hydroxide is used as a basic catalyst for the non-aqueous sol-gel reaction.

21. The manufacturing method of claim 11, wherein the crosslinking reaction and the chemical bonding are induced during a photolithography process to make the perovskite color converter patterned.

22. The manufacturing method of claim 11, wherein the perovskite color converter is encapsulated by an additional polymer resin through mechanical processing or chemical treatment.

* * * * *